US010021401B2

(12) United States Patent
McCarthy et al.

(10) Patent No.: US 10,021,401 B2
(45) Date of Patent: Jul. 10, 2018

(54) ANALYTIC TOOL FOR MANAGING DISTRIBUTED STATISTICALLY MULTIPLEXED SYSTEMS AND METHOD FOR USING SAME

(71) Applicant: ARRIS Enterprises LLC, Suwanee, GA (US)

(72) Inventors: Sean T. McCarthy, San Francisco, CA (US); Sanjeev Mishra, Sunnyvale, CA (US); Robert E. Titus, Foster City, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 276 days.

(21) Appl. No.: 15/095,874

(22) Filed: Apr. 11, 2016

(65) Prior Publication Data

US 2016/0301957 A1   Oct. 13, 2016

Related U.S. Application Data

(60) Provisional application No. 62/145,481, filed on Apr. 9, 2015, provisional application No. 62/145,487, filed
(Continued)

(51) Int. Cl.
H04N 7/12 (2006.01)
H04N 19/149 (2014.01)
(Continued)

(52) U.S. Cl.
CPC ....... *H04N 19/149* (2014.11); *H04L 65/4076* (2013.01); *H04L 65/607* (2013.01);
(Continued)

(58) Field of Classification Search
CPC . H04L 65/4076; H04L 65/607; H04N 19/115; H04N 19/149; H04N 19/154;
(Continued)

(56) References Cited

U.S. PATENT DOCUMENTS 6,055,270 A * 4/2000 Ozkan ................ H04N 21/2365
                                          375/240.03
6,959,042 B1 * 10/2005 Liu .................. H04N 21/23608
                                          375/240.02

(Continued)

OTHER PUBLICATIONS

PCT Search Report & Written Opinion, RE: Application No. PCT/US2016/026959, dated Aug. 8, 2016.
(Continued)

*Primary Examiner* — Francis G Geroleo
(74) *Attorney, Agent, or Firm* — Thomas A. Ward

(57) ABSTRACT

A method and system is provided for managing the encoding of a plurality of video streams, each of the plurality of video streams encoded by an associated one of a plurality of encoders, each of the plurality of encoders being a member of one of a plurality of encoder pools. In one embodiment, the apparatus comprises a parser, for capturing data of a plurality of encoded video streams from the plurality of encoders, an encoding analysis module, for determining, using a user-selectable temporal portion of the captured data, a video quality stress factor for each of the plurality of encoder pools, and a dashboard generator, for generating a user interface for managing the encoding of the plurality of data streams at least in part according to the determined statistical multiplexing weighting factor video quality stress factor.

16 Claims, 41 Drawing Sheets

Related U.S. Application Data on Apr. 9, 2015, provisional application No. 62/194,597, filed on Jul. 20, 2015, provisional application No. 62/216,555, filed on Sep. 10, 2015.

(51) Int. Cl.

| | | |
|---|---|---|
| *H04N 19/184* | (2014.01) | |
| *H04N 19/154* | (2014.01) | |
| *H04N 19/115* | (2014.01) | |
| *H04N 19/436* | (2014.01) | |
| *H04N 19/70* | (2014.01) | |
| *H04N 19/85* | (2014.01) | |
| *H04N 21/2365* | (2011.01) | |
| *H04L 29/06* | (2006.01) | |
| *H04N 21/234* | (2011.01) | |
| *H04N 21/235* | (2011.01) | |
| *H04N 21/61* | (2011.01) | |
| *H04N 21/6405* | (2011.01) | |
| *H04N 21/643* | (2011.01) | |

(52) U.S. Cl.
CPC ......... *H04N 19/115* (2014.11); *H04N 19/154* (2014.11); *H04N 19/184* (2014.11); *H04N 19/436* (2014.11); *H04N 19/70* (2014.11); *H04N 19/85* (2014.11); *H04N 21/2353* (2013.01); *H04N 21/23406* (2013.01); *H04N 21/23655* (2013.01); *H04N 21/6125* (2013.01); *H04N 21/6405* (2013.01); *H04N 21/64322* (2013.01)

(58) Field of Classification Search
CPC .... H04N 19/184; H04N 19/436; H04N 19/70; H04N 19/85; H04N 21/23406; H04N 21/2353; H04N 21/23655; H04N 21/6125; H04N 21/6405; H04N 21/64322
See application file for complete search history.

(56) References Cited

U.S. PATENT DOCUMENTS

| | | | |
|---|---|---|---|
| 2004/0090996 A1 | 5/2004 | Wu et al. | |
| 2008/0075163 A1* | 3/2008 | Brydon | H04N 19/196 |
| | | | 375/240.02 |
| 2009/0249421 A1* | 10/2009 | Liu | H04L 12/2801 |
| | | | 725/116 |
| 2012/0249869 A1* | 10/2012 | Tian | H04N 21/23655 |
| | | | 348/388.1 |
| 2012/0300688 A1 | 11/2012 | Gholmieh et al. | |

OTHER PUBLICATIONS

I. Trow, "Video Distribution Networks Using Remote Statistical Multiplexing", SMPTE—Motion Imaging Journal, Society of Motion Picture and Television Engineers, vol. 117, No. 1, Jan. 1, 2008., pp. 37-41.
U.S. Appl. No. 15/095,845, filed Apr. 11, 2016.
U.S. Appl. No. 15/095,810, filed Apr. 11, 2016.
T. Cloonan, et al., "Predictions on the Evolution of Access Networks to the Year 2030 and Beyond", ARRIS Whitepaper. 2014.
Data-Over-Cable Service Interface Specifications, (DOCSIS) 3.1, "Midsplit Migration Implications on the HFC Network Technical Report", CM-TR-MID-SPLIT_V01-150223, Feb. 23, 2015, 23 pgs.
Data-Over-Cable Service Interface Specifications (DOCSIS) 3.1, "CCAP Operations Support System Interface Specification", CM-SP-CCAP-OSSIv3.11-I07-160602, Jun. 2, 2016, 699 pgs.
Data-Over-Cable Service Interface Specificatoins (DOCSIS) 3.1, "Cable Modem Operations Support Systems Interface Specificaiton", CM-SP-CM-OSSIv3.1-I07-160602, Jun. 2, 2016, 299 pgs.
Data-Over-Cable Service Interface Specifications (DOCSIS) 3.1, "MAC and Upper Layer Protocols Interface Specification", CM-SP-MULPIv3.1-I09-160602, Jun. 2, 2016, 815 pgs.
Data-Over-Cable Service Interface Specifications (DOCSIS) 3.1, "Physical Layer Specification", CM-SP-PHYv3.1-I09-160602, Jun. 2, 2016, 245 pgs.
Data-Over-Cable Service Interface Specifications (DOCSIS) 3.1, "Security Specification", CM-SP-SECv3.1-I06-160602, Jun. 2, 2016, 201 pgs.

* cited by examiner

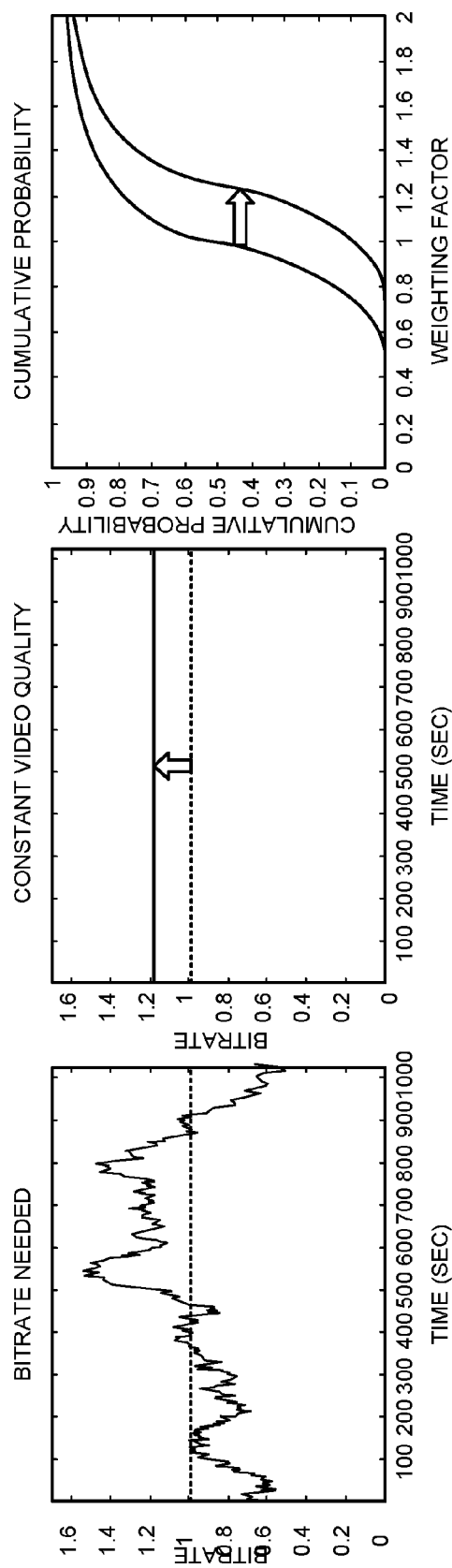

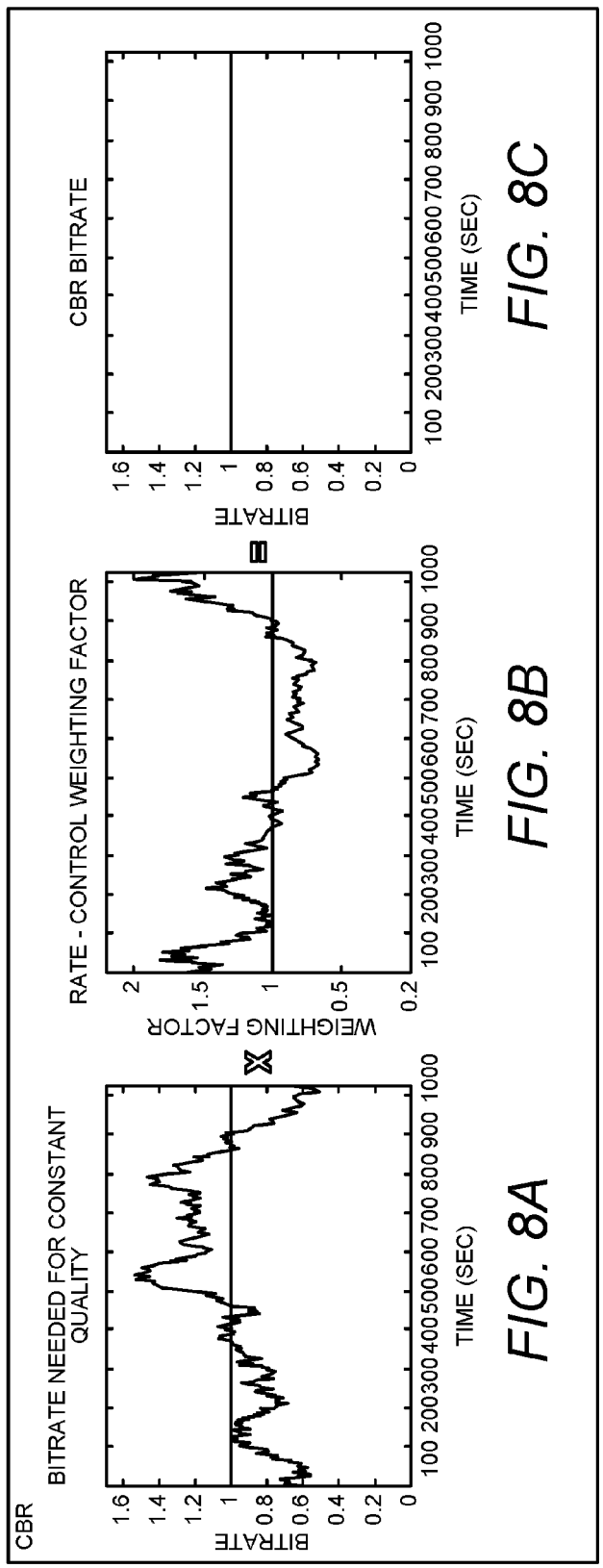

SETTING STATMUX TOTAL OPERATIONAL BANDWIDTH
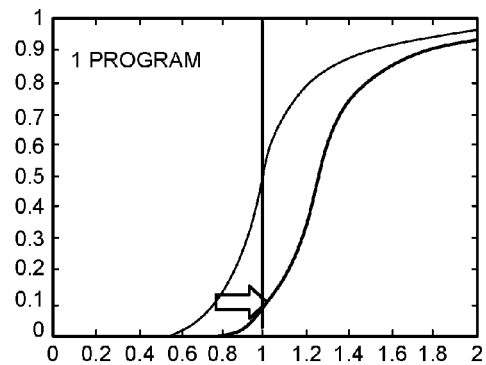
FIG. 10B
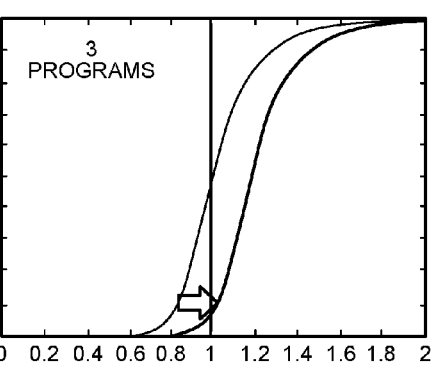
FIG. 10C
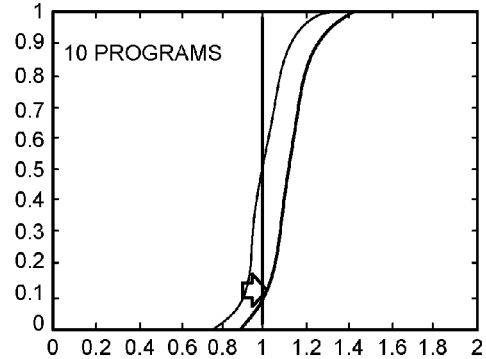
FIG. 10D
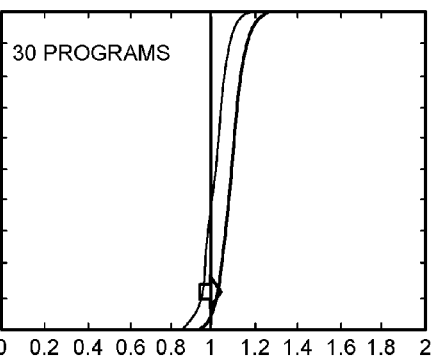
FIG. 10E
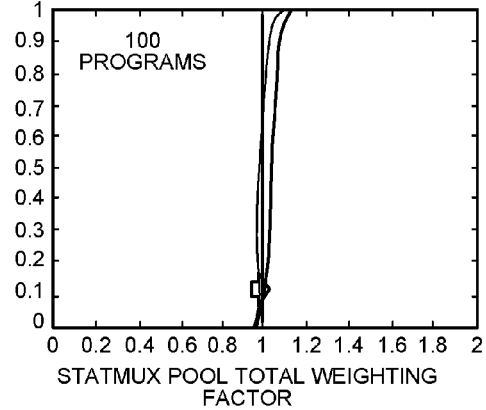
STATMUX POOL TOTAL WEIGHTING FACTOR
FIG. 10F
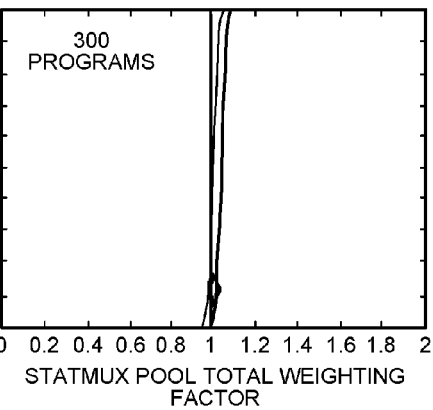
STATMUX POOL TOTAL WEIGHTING FACTOR
FIG. 10G

| POOLS 1422A | | BITRATES 1422B | | COMPLEXITY 1422C | 1514A BANDWIDTH (MBPS) 1514B | | | CORRELATION 1422E | STRESS FACTOR 1422F | |
|---|---|---|---|---|---|---|---|---|---|---|
| STATUS 1502 | IP ADDRESS 1508 | PROGRAM DESCRIPTION 1510 | FORMAT 1512 | | MEAN | MIN | MAX 1514C | 1514 | 1516 STRESS FACTOR INTRISIC | ACTUAL |
| ● | 192.168.9.212 | NAT GEO HD | HD | | 100 | 100 | 100 | 100 | 1.07 | 1.18 |
| ● | 192.168.9.204 | EUROSPORT 1 HD | HD | | 100 | 100 | 100 | 100 | 0.99 | 1.09 |
| ● | 192.168.9.227 | FX | | | 100 | 100 | 100 | 100 | 1.07 | 1.18 |
| ● | 192.168.9.222 | BIG BUCK BUNNY | | | 100 | 100 | 100 | 100 | 0.98 | 1.09 |
| ● | 192.168.9.201 | BBC THREE HD | HD | | 100 | 100 | 100 | 100 | 0.99 | 1.27 |
| ● | 192.168.9.213 | BT SPORT 1 HD | HD | | 100 | 100 | 100 | 100 | 1.15 | 1.25 |
| ● | 192.168.9.223 | BBC HD | HD | | 100 | 100 | 100 | 100 | 1.14 | 1.25 |
| ● | 192.168.9.209 | ESPN | | | 100 | 100 | 100 | 100 | 1.14 | 1.25 |
| ● | 192.168.9.202 | FOX HD | HD | | 100 | 100 | 100 | 100 | 1.07 | 1.18 |
| ● | 192.168.9.203 | SYFY HD | HD | | 100 | 100 | 100 | 100 | 0.88 | 0.97 |
| ● | 192.168.9.214 | BARKER CHANNEL | | | 100 | 100 | 100 | 100 | 1.07 | 1.18 |
| ● | 192.168.9.211 | BBC ONE HD | HD | | 100 | 100 | 100 | 100 | 1.16 | 1.27 |
| ● | 192.168.9.220 | BT SPORT 2 | | | 100 | 100 | 100 | 100 | 1.07 | 1.18 |
| ● | 192.168.9.215 | NATGEO | | | 100 | 100 | 100 | 100 | 0.99 | 1.09 |
| ● | 192.168.9.221 | SKY SPORTS 2 | | | 100 | 100 | 100 | 100 | 1.07 | 1.18 |
| ● | 192.168.9.229 | BBC LONDON | | | 100 | 100 | 100 | 100 | 0.98 | 1.09 |
| ● | 192.168.9.216 | NICK TOONS | | | 100 | 100 | 100 | 100 | 0.99 | 1.27 |
| ● | 192.168.9.217 | SYFY | | | 100 | 100 | 100 | 100 | 1.15 | 1.25 |
| ● | 192.168.9.208 | SKY MOVIES CRIME & THRILLER | | | 100 | 100 | 100 | 100 | 1.14 | 1.25 |
| ● | 192.168.9.206 | E! | | | 100 | 100 | 100 | 100 | 1.14 | 1.25 |
| ● | 192.168.9.205 | DISNEY | | | 100 | 100 | 100 | 100 | 1.07 | 1.18 |
| ● | 192.168.9.219 | SKY MOVIES GREAT | | | 100 | 100 | 100 | 100 | 0.88 | 0.97 |
| ● | 192.168.9.218 | SKY MOVIES-DISNEY | | | 100 | 100 | 100 | 100 | 1.07 | 1.18 |
| ● | 192.168.9.210 | EUROSPORT 2 | | | 100 | 100 | 100 | 100 | 1.16 | 1.27 |
| ● | 192.168.9.207 | NAT GEO WILD | | | 100 | 100 | 100 | 100 | 1.16 | 1.27 |

JUNE 15, 2015. 3:00:00 P.M. TO 3:29:59 P.M — SELECT DATE 1416A — SELECT TIME 1416B — NOW 1416C — GET RECOMMENDATIONS 1418 — SELECT ENCODER 1520

FIG. 15

ANALYTIC TOOL FOR MANAGING DISTRIBUTED STATISTICALLY MULTIPLEXED SYSTEMS AND METHOD FOR USING SAME

CROSS-REFERENCE TO RELATED APPLICATIONS

This application claims benefit of the following U.S. Provisional Patent Applications, each of which are hereby incorporated by reference herein:

U.S. Provisional Patent Application No. 62/145,481 entitled "STATISTICAL MULTIPLEXING ANALYTICS SYSTEMS AND METHODS," by Sean T. McCarthy and Frederic Turmel, filed Apr. 9, 2015;

U.S. Provisional Patent Application No. 62/145,487 entitled "SYSTEMS AND METHODS TO CHARACTERIZE AND OPTIMIZE STATISTICAL MULTIPLEXING," by Sean T. McCarthy, filed Apr. 9, 2015;

U.S. Provisional Patent Application No. 62/194,597 entitled "MODELING THE OPERATIONAL EFFICIENCY OF HIGH DENSITY STATISTICAL MULTIPLEXING FOR DOCSIS 3.1," by Sean T McCarthy, filed Jul. 20, 2015; and U.S. Provisional Patent Application No. 62/216,555 entitled "SYSTEMS AND METHODS FOR EXAMINING AND ANALYZING OPERATIONAL DATA FOR MULTI-PROGRAM MEDIA SERVICES," by Sean T. McCarthy, Sanjeev Mishra, and Robert E. Titus, filed Sep. 10, 2015.

BACKGROUND

1. Field of the Invention

The present invention relates to systems and methods for transmitting, and in particular to a system and method for analyzing and managing the encoding of multiple data streams.

2. Description of the Related Art

Managing video quality and bandwidth efficiency have always been critical with regard to the distribution of video data streams. Yet, today we are entering a new more complex era that will allow distribution of massive numbers of programs to consumers when, where, and how they choose. New technologies such as DOCSIS (Data over Cable Service Interface Specification) Version 3.1 and IP-based distribution protocols will make managing bandwidth to ensure a high quality of experience even more challenging.

For example, the cable industry is migrating from the broadcasting of media programs using quadrature amplitude modulation (QAM) to delivering video services over the Internet using Internet Protocol (IP). DOCSIS 3.1, which is an international standard for transferring data over cable television systems and Hybrid Fiber-Coaxial (HFC) are expected to be the workhorses of this new paradigm. DOCSIS 3.1 provides raw bandwidth and huge gigaspeed data pipes, each of which could allow distribution of tens or even hundreds of individual IP-video programs at the same time. The question then arises as to how many channels (each transmitting one of the IP-video programs) of information should be carried in each pipe. The question is made complex by the fact that the unconstrained bit rate of a video program varies with both time and content, and to assure that a pipe has sufficient bandwidth to permit the peak bit rate to pass unconstrained would mean that the pipe is larger than required at all other times. This problem can be resolved by converting the unconstrained video stream into one that has a constant bit rate. This is accomplished by controlling the encoder to vary the quantization parameter over time so as to keep the bit rate of the encoded stream constant, a process known as constant bit rate encoding. Of course, when the quantization parameter is adjusted to reduce the bit rate, the resulting encoded video stream is of reduced quality. The problem can also be solved by statistically multiplexing the encoded data stream from multiple encoders. Since the bit stream from each such encoder is not likely to peak at the same time as the bit stream from other encoders, the averaging of the required bit rates smooths out the peak bit rate requirements considerably.

Until recently, typically only a handful of simultaneous programs would share common bandwidth. Statistical multiplexing was used to dynamically allocate bandwidth to the various programs so as to equalize video quality across all channels and over time. Typically, channels that are difficult to encode are allocated more bandwidth, while channels having information that is easy to encode are allocated less bandwidth. An operator could—and usually did—construct statmux pools by hand strategically by choosing a balanced mix of hard-to-encode and easy-to-encode programs. With the very large number of programs enabled by DOCSIS 3.1 and IP protocols, assignment by hand becomes much more difficult, especially since optimal assignments can and do change over time.

Despite the widespread use of statistical multiplexing, there remains the problem of how a system operator can determine how to optimize the allocation of channels of video information to pipes. This disclosure describes a system and method for allocating programs and bandwidth to statmux pools for commercial programming. Further, the techniques and systems presented herein can also be useful in evaluating the video quality and compression efficiency for any system in which video programs share bandwidth with other video or non-video services such as voice and data, particularly the evaluation of and planning for distribution of multiple programs over shared bandwidth using adaptive bitrate protocols such as MPEGDASH, HLS, and Smooth Streaming.

SUMMARY

To address the requirements described above, the present invention discloses a method, apparatus, article of manufacture, and a memory structure for managing the encoding of a plurality of video streams, each of the plurality of video streams encoded by an associated one of a plurality of encoders, each of the plurality of encoders being a member of one of a plurality of encoder pools. In one embodiment, the apparatus comprises a parser, for capturing data of a plurality of encoded video streams from the plurality of encoders, an encoding analysis module, for determining, using a user-selectable temporal portion of the captured data, a video quality stress factor for each of the plurality of encoder pools, each video quality stress factor corresponding to an identified target video quality measure for a temporal portion of the plurality of encoded video streams from each of the plurality of encoder pools, the video quality measure identified as a probability that a bit rate of an unconstrained variable bit rate (VBR) version of the temporal portion of the plurality of encoded video streams from the plurality of encoders in each encoder pool is less than a bit rate of an encoded and statistically multiplexed version of the temporal portion of the plurality of encoded video streams from the plurality of encoders in each encoder pool, and a dashboard generator, for generating a user interface for managing the encoding of the plurality of data streams at least in part according to the determined statistical multiplexing weighting factor video quality stress factor. In another embodiment, a method for managing the encoding of a plurality of video streams comprises capturing data of a user-selectable temporal portion of a plurality of encoded video streams from the plurality of encoders in the one of the plurality of encoder pools, determining, using the captured data, a video quality stress factor for each of the plurality of encoder pools, each video quality stress factor corresponding to an identified target video quality measure for a temporal portion of the plurality of encoded video streams from each of the plurality of encoder pools, the video quality measure identified as a probability that a bit rate of an unconstrained variable bit rate (VBR) version of the temporal portion of the plurality of encoded video streams from the plurality of encoders in each encoder pool is less than a bit rate of an encoded and statistically multiplexed version of the temporal portion of the plurality of encoded video streams from the plurality of encoders in each encoder pool, generating a presentation comprising the video quality stress factor for the one of the plurality of encoder pools, and managing the encoding of the plurality of video streams at least in part according to the determined video quality stress factor using the presentation.

BRIEF DESCRIPTION OF THE DRAWINGS

Referring now to the drawings in which like reference numbers represent corresponding parts throughout:

FIGS. 5A-5C are diagrams illustrating a relationship between video data stream encoded according to a constant bit rate bitrate and a variable bit rate;

FIGS. 8A-8F are diagrams illustrating similarities between constant bit rate encoding and statistical multiplexing;

FIGS. 10A-10G are diagrams illustrating a visualization of the impact of program density on the variability of accumulated bit rate requirements;

FIGS. 14-21 present diagrams illustrating exemplary embodiments of a user interface generated by the dashboard generator to support analysis and management of the operation of the encoders and statmux controller(s);

DETAILED DESCRIPTION

Figure 1:
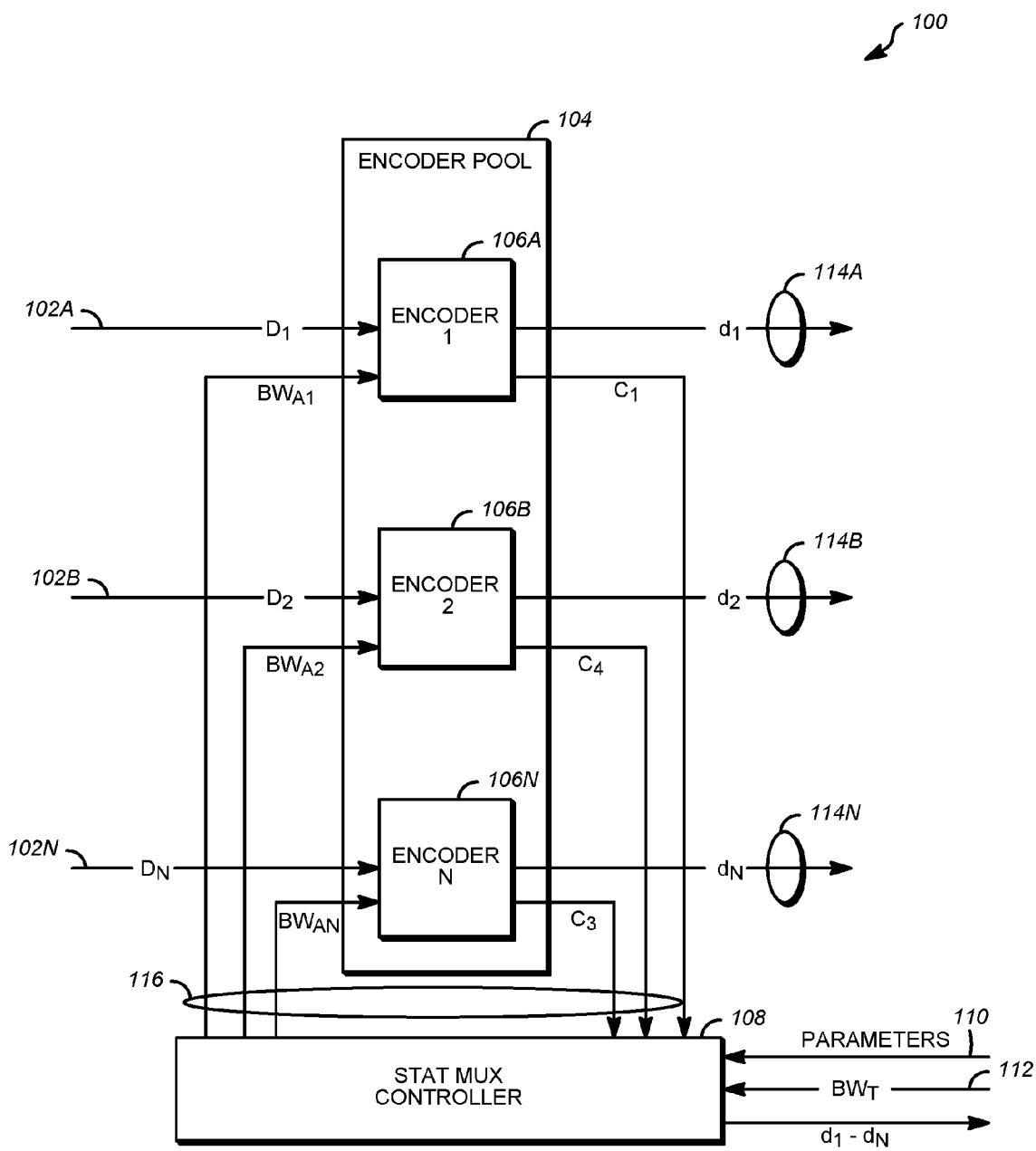
FIG. 1 is a diagram illustrating a statistical multiplexing encoding system.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

This disclosure presents a systematic and quantitative approach to understanding how bandwidth efficiency and video quality is impacted by IP-program density, particularly when a large number of individual video programs share a fixed bandwidth. This includes a stochastic model and in-depth analysis of statistical multiplexing (statmux)—a method of dynamically allocating bandwidth to individual channels to jointly optimize video quality and satisfy the total bandwidth constraints. This permits three key operational questions to be answered: (1) how the bitrate and compression efficiency of one large statmux pool compare to several smaller statmux pools; (2) how often the video quality of statmuxed programs might drop below any given level; and (3) what is the efficiency of IP-based statistical multiplexing compared to allocating simply a constant bitrate to each video program. The model, data, and analysis presented herein are intended to provide information that can be used to optimize bandwidth allocation and design DOCSIS 3.1 video service offerings.

In addition to the abbreviations and acronyms discussed above, the following also apply:

CBR: Constant Bit Rate (variable quality). CBR encoding results in an encoded bit stream having a constant bit rate over time, however, the video quality is temporally variant. The constant bit rate is achieved by means of a rate-control system that determines and applies a time varying weighting factor. As discussed further below, CBR encoding can be thought of as a special case of statistical multiplexing in which there is only one channel.

VBR: Variable Bit Rate (constant quality). An unconstrained VBR encoded video stream serves as a benchmark for constant video quality (i.e., it represents the best possible video quality)

HTTP: Hypertext Transfer Protocol

Statmux: Statistical multiplexing of a group of channels sharing a fixed CBR bandwidth. As used herein, "statmux" may refer to multi-program transport stream (MPTS) (e.g. a transport stream statistically multiplexing a plurality of video data streams into a single transport stream) and actively managed single protocol transport stream (SPTS) sharing a fixed CBR allocation.

Rate Control (or Statmux) Weighting Factor: The rate control or statmux weighting factor is a time-varying value that is proportional to the inverse of the bit rate that would have been required to produce in an unconstrained VBR (constant quality) encoded video stream. In a statmux, the weighting factor may be thought of as being applied by a statmux controller 108 to all channels in a pool in the form of bit allocation messages.

Statistical Multiplexing

FIG. 1 is a diagram illustrating a statistical multiplexing encoding system (SMES) 100 that accepts a plurality of uncompressed video data streams $D_1, D_2, \ldots D_N$ 102A-102N (hereinafter alternatively referred to as uncompressed or unencoded video data streams 102) and produces a one or more encoded data streams $d_1$-$d_N$ 114A-114N (hereinafter alternatively referred to as encoded video data streams 114). The SMES 100 comprises an encoder pool 104 having a plurality of encoders 106A-106N communicatively coupled with one or more statmux controllers 108.

Each encoder 106A-106N accepts as input an associated uncompressed video data stream $D_1, D_2, \ldots D_N$ 102A-102N, and analyzes a temporal portion of the input video data stream $D_1, D_2, \ldots D_N$ to determine a measure of the bit rate required to produce an encoded video stream $d_1$-$d_N$ of a particular constant (and typically high) bit rate. This measure may comprise a value associated with the scene complexity or temporal variation of the uncompressed video data stream $D_1, D_2, \ldots D_N$ or other factors, and are indicated in FIG. 1 as $C_1$-$C_N$. The measure of the required bit rate can be considered as a bit rate or bandwidth request transmitted from the respective encoder 102A-102N to the statmux controller 108, as described further below.

The required bit rate measures from each of the encoders 106A-106N are provided to the statmux controller 108. The statmux controller 108 balances the required bit rate measures from each of the encoders 106A-106B and allocates a portion of the total bandwidth available for transmission $BW_T$ 112 to each of the encoders 106A-106N according to a statmux equation defined by one or more parameters 110 that are provided to the statmux controller 108. Each allocated portion of the transmission bandwidth $BW_T$ 112 is expressed as a value representing a maximum bit rate $BW_{A1}$-$BW_{AN}$ allocated to each of the encoders 106A-106N. The maximum bit rate $BW_{A1}$-$BW_{AN}$ allocated to each of the encoders 106A-106N is then transmitted to each respective encoder 106A-106N.

Each of the encoders 106A-106N encode the portion of the uncompressed video data streams $D_1, D_2, \ldots D_N$ 102 in accordance with the allocated maximum bit rate $BW_{A1}$-$BW_{AN}$, and provide those encoded data streams $d_1$-$d_N$ 114 for output. In the illustrated embodiment, each of the encoded data streams $d_1$-$d_N$ 114 is provided separately, however, the encoded data streams $d_1$-$d_N$ 114 may be provided to a multiplexer (which may be included within the statmux controller 108, which multiplexes each of the encoded data stream $d_1$-$d_N$ into one or more data streams for later transmission.

Statistical Multiplexing Over IP with
Geographically Distributed Elements

In one embodiment, the elements of the SMES 100 communicate with one another according to an internet protocol (IP), thus permitting the elements of the SMES 100 to be configured and reconfigured by readdressing messages rather than rerouting wires and the like. Further, the elements of the SMES 100 may communicate with one another using IP multicasting techniques. IP multicasting permits the transmission of IP datagrams from a source to interested receivers in with a single transmission. This is accomplished by the source transmitting the data to a node of the network to an IP multicast address, where interested receivers may later retrieve the data by subscription to the IP multicast address.

For example, consider the transmission of the video data (compressed and uncompressed) itself. Turning to the exemplary SMES 100 of FIG. 1, the uncompressed video data streams $D_1, D_2, \ldots D_N$ 102 may be provided from the video sources (not shown) to each encoder 106 by each video source transmitting its associated uncompressed video data stream 102 to a particular IP multicast address. Each encoder 106A-106N that is to encode the uncompressed video data stream 102 subscribes to that multicast address to receive the stream 102. Likewise, each encoder 106A-106N may transmit the encoded video streams $d_1$-$d_N$ 114 to a respective multicast address, where they can be retrieved by the interested receivers of the encoded video streams $d_1$-$d_N$ 114 (including the statmux controller 108).

The transmission of the bit rate requests $C_1$-$C_3$ from each encoder 106A-106N and the allocated bit rate $BW_{A1}$-$BW_{AN}$ granted to each encoder 106A-106N can also be transmitted via a multicast IP address. This information (which may be referred to as metadata or control data) can be transmitted from the source of the information to a dedicated multicast address for each element (e.g. encoder 1 106A may transmit bit rate requests $C_1$ to a first multicast address, while encoder 2 106B transmits bit rate requests $C_2$ to a second and different multicast address, with the statmux controller 108 subscribing to receive messages at both multicast addresses. Similarly, statmux controller 108 may transmit bit rate allocations $BW_{A1}$-$BW_{AN}$ to a different multicast address for each encoder 106 (to which each encoder 106 subscribes) or to a single multicast address for all encoders (to which each encoder 106 subscribes).

Likewise, a single multicast address can be used for all bit rate requests transmitted from all encoders 106A-106N to the statmux controller 108 and all allocated bit rates transmitted from the statmux encoder 108 to all encoders 106. The use of a single "metadata" or "control" multicast IP address permits an entity monitoring that single multicast address to obtain access to all non-data communications within the SMES 100, even when encoders 106 or statmux controllers 108 join or leave the SMES 100, as further discussed below. This embodiment is illustrated in FIG. 1, wherein each encoded data stream is transmitted via a dedicated channel or multicast address 114A-114N, while the control data or metadata is transmitted on a single dedicated multicast address 116 for all encoders 106 which might become a member of the encoder pool 104, even if not currently a member.

Statistical Multiplexing Over a DOCSIS Pipe

Figure 2:
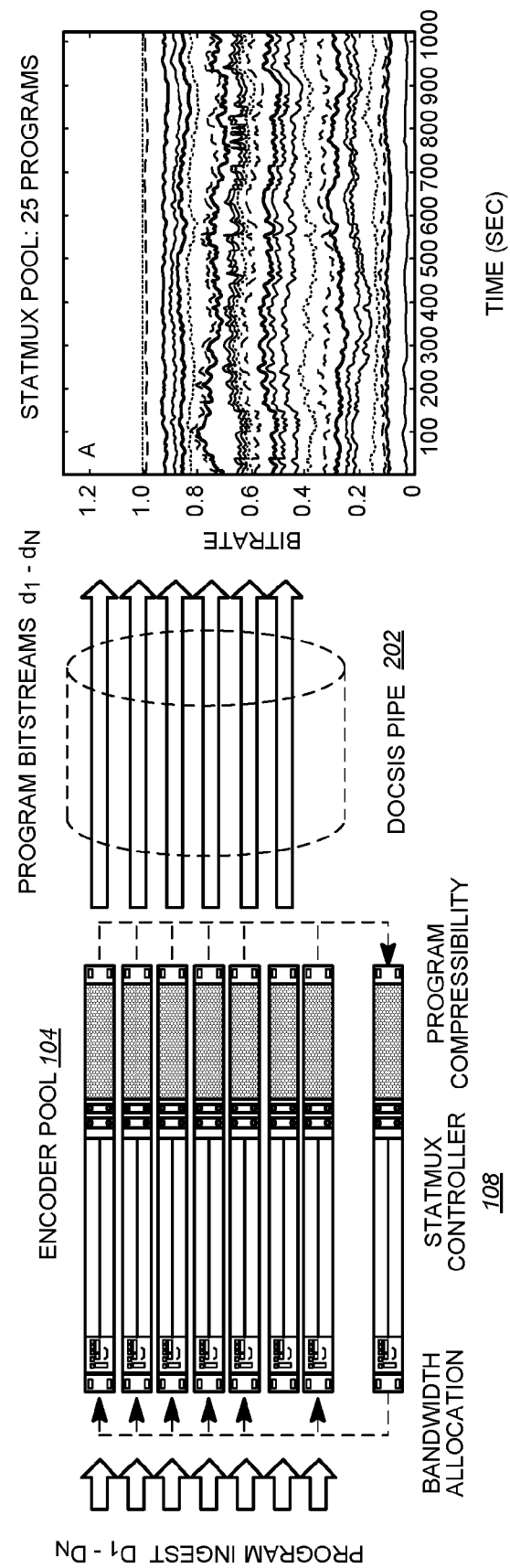
FIG. 2 is a diagram depicting a statistical multiplexing encoding system used with a pipe compliant with the data over cable service interface specification.

FIG. 2 is a diagram depicting an SMES 200 used with a pipe 202 compliant with the data over cable service interface specification (DOCSIS). The system 200 comprises a plurality of encoders 106 in an encoder pool 104, each of which typically ingests one or more video program streams $D_1$-$D_N$ 102. The statmux system 200 also comprises a statmux controller 108, which could be implemented via a stand-alone device or a process within one of the encoders 106. Each encoder 106 analyzes the video data 102 input to the encoder 106 to determine how compressible the video data 102 would be to encode at any point in time for a particular target video quality. Each encoder 106 then sends metadata to the statmux controller 108, including a measure indicating the complexity or compressibility of each input video data stream 102. The statmux controller 108 compares all of the compressibility metadata for all of the video program streams $D_1$-$D_N$ 102 participating in the statmuxed encoder pool 104 and allocates a portion of the total statmux encoder pool 104 bandwidth $B_T$ to each of the encoded video program streams $d_1$-$d_N$ 114. Bandwidth allocations are updated on a regular basis to adapt to the changing mix of program compressibility. The objective of statmux controller 108 is to maintain consistent video quality across all the video program streams $D_1$-$D_N$ 102 over time.

Some statmux systems are more complex than the basic system illustrated in FIG. 2. Such systems might enforce minimum and maximum bitrates for each program, and might assign priorities to certain encoded video program streams $D_1$-$D_N$ 102 so that they receive a greater bandwidth allocation than would otherwise be the case.

Video Quality and Probability

Strictly speaking, statistical multiplexing is about simultaneous management of multiple programs sharing a common communications channel. It is useful, however, to use single-program constant bitrate (CBR) encoding to motivate and explain the principles of our multi-program statmux model.

Figure 3A:
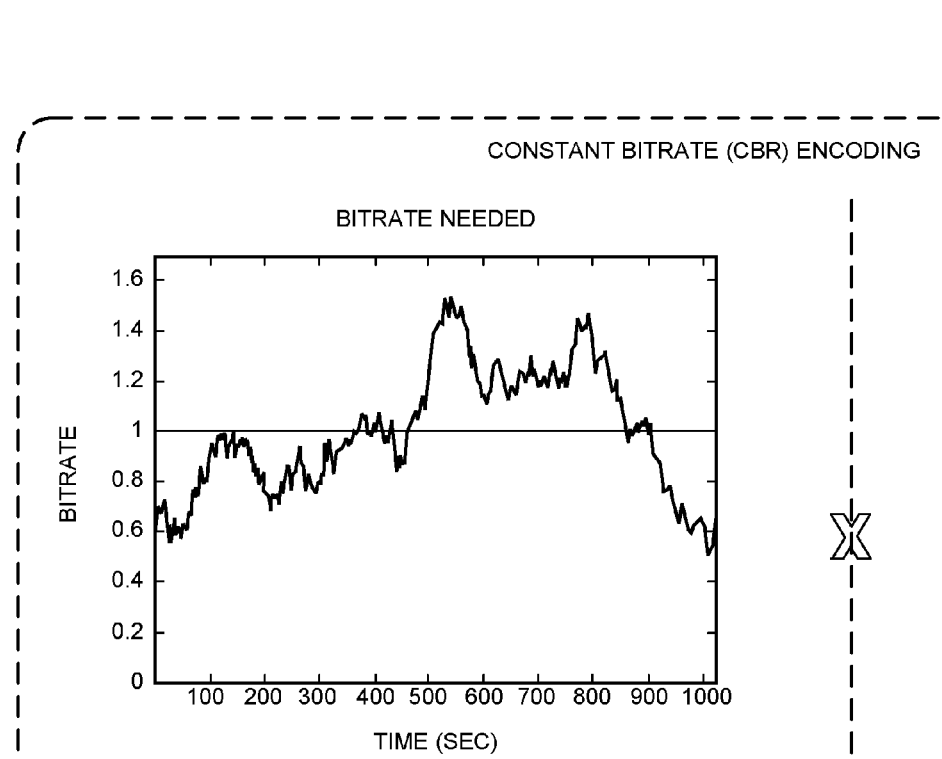
FIGS. 3A-3E are diagrams illustrating constant bit rate encoding of a single video program stream.
Figure 3B:
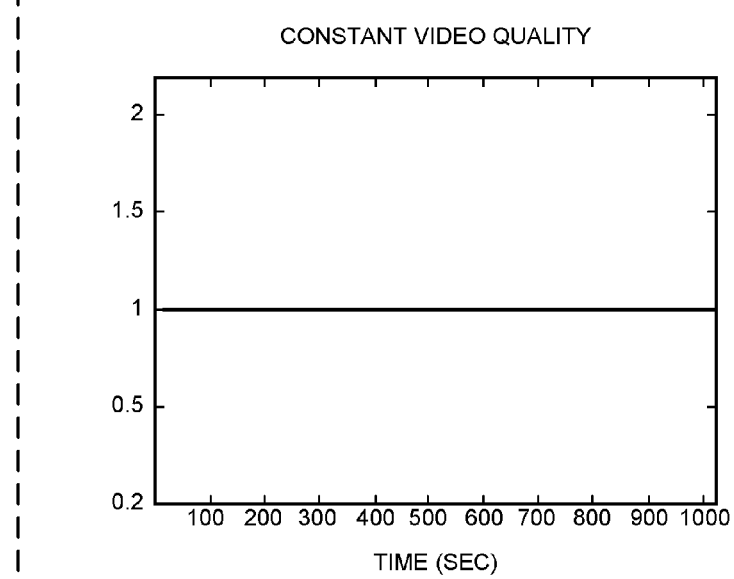
Figure 3C:
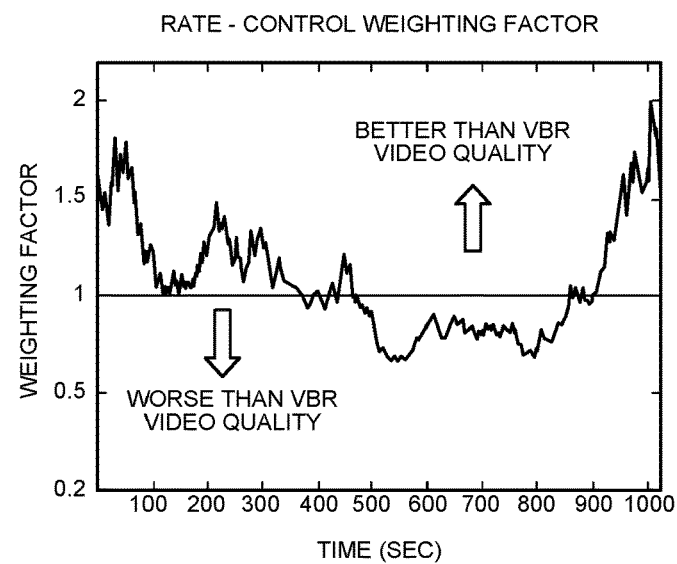
Figure 3D:
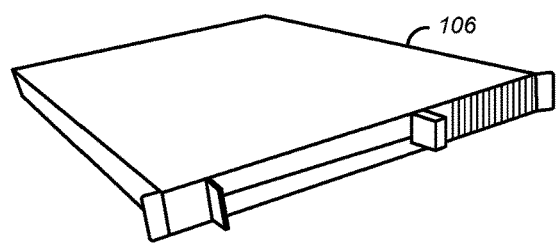
Figure 3E:
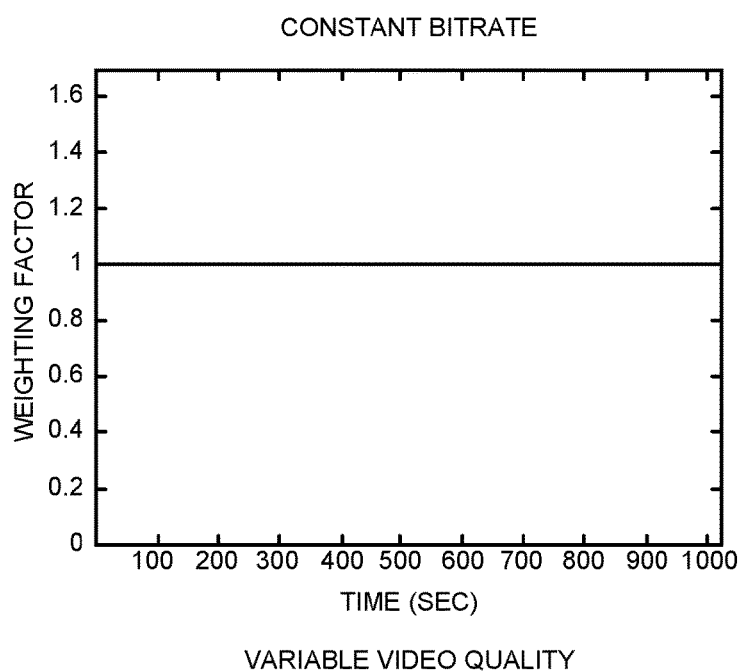

FIGS. 3A-3E are diagrams illustrating the CBR encoding of a single video program stream. FIGS. 3A and 3B illustrate constant quality variable bitrate (VBR) encoding. FIG. 3A illustrates the bitrate over time that would be needed to produce an encoded video program stream of constant video quality over time (illustrated in FIG. 3B). FIG. 3D illustrates an exemplary encoder 106 that uses sophisticated data processing and buffer management techniques to control the encoding process, with a result that can be thought of and modeled as applying a time varying rate-control weighting factor (depicted in FIG. 3C) to the intrinsic bitrate needed to produce a constant quality encoded video stream 114. By necessity, the encoded data stream 114 outputted by CBR encoding has variable video quality, but a constant bit rate, as shown in FIG. 3E. In this instance, it would be expected that about half the time, the CBR video quality would be better than the VBR video quality because the program compressibility is high (the rate-control weighting factor is greater than 1) and thus the CBR encoder 106 uses a higher bitrate than would have been the case for VBR encoding. The other half of the time, the CBR video quality would be expected to be worse than VBR video quality because program compressibility is low (the rate-control weighting factor is less than 1).

Figure 4A:
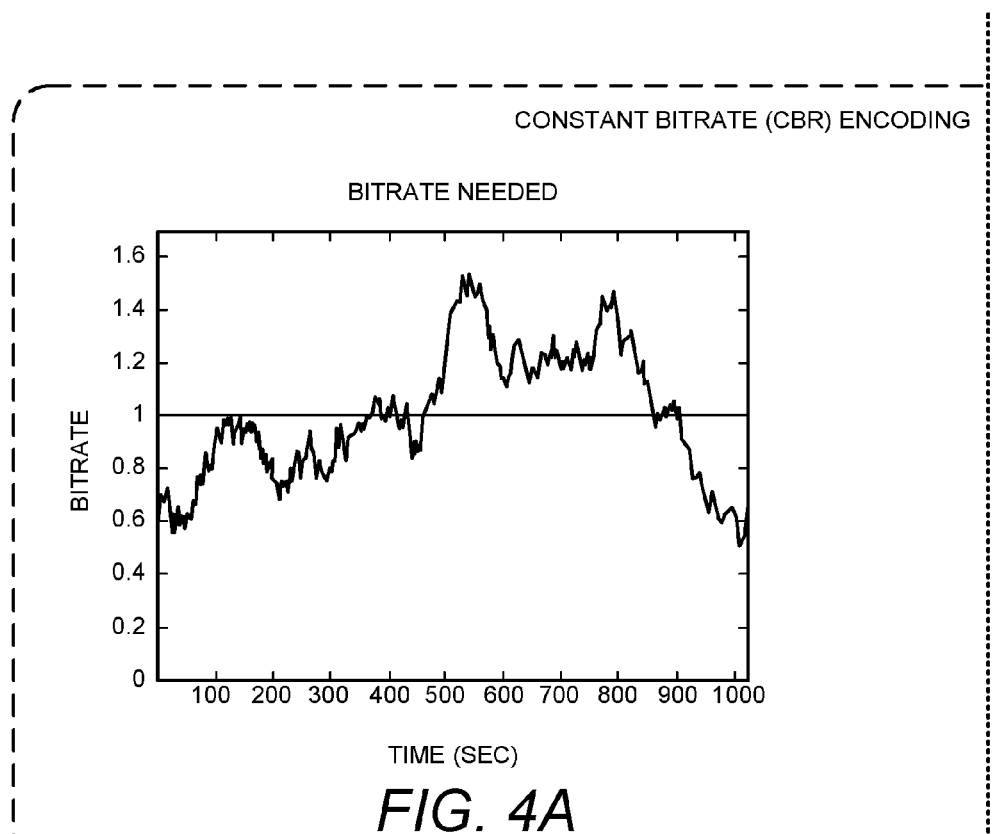
FIG. 4A-4G are diagrams presenting a quantitative view of the variability of constant bit rate video quality can be obtained in the case depicted in FIGS. 3A-3E.
Figure 4B:
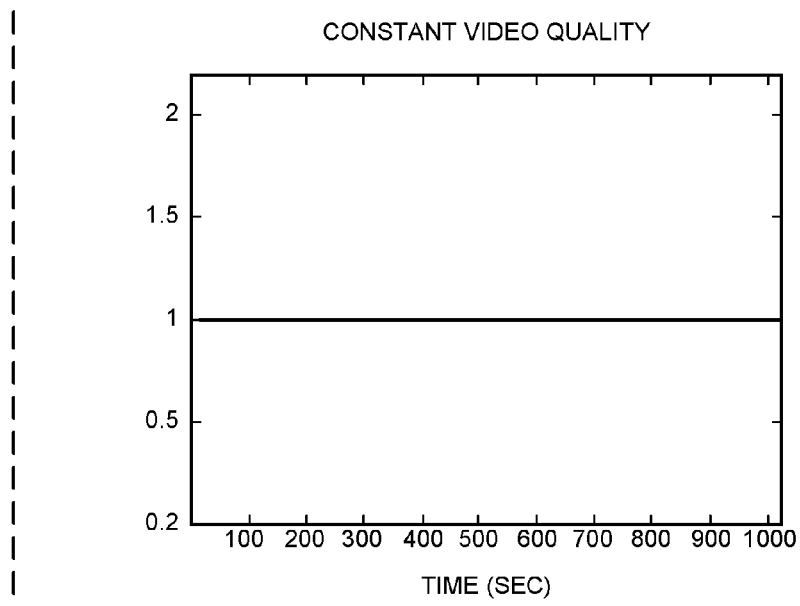
Figure 4C:
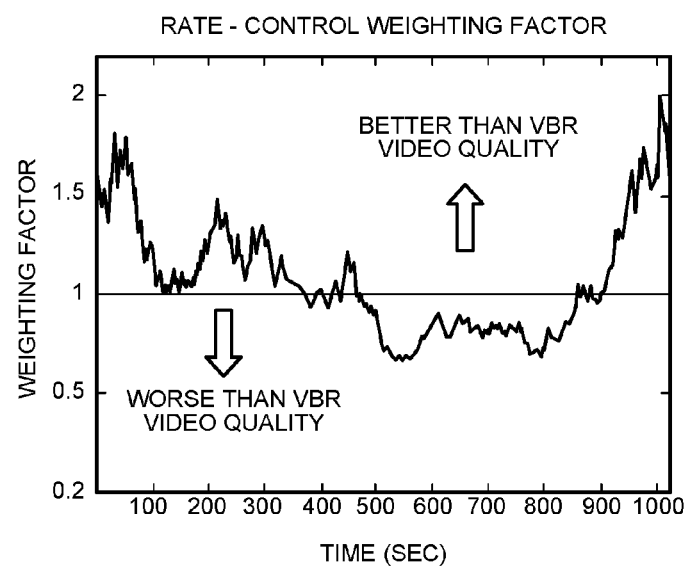
Figure 4D:
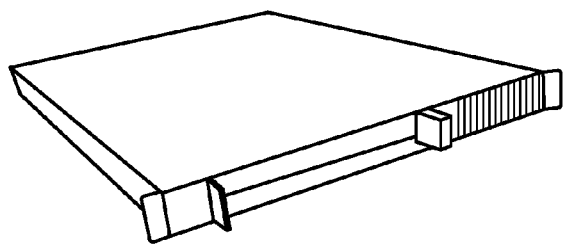
Figure 4E:
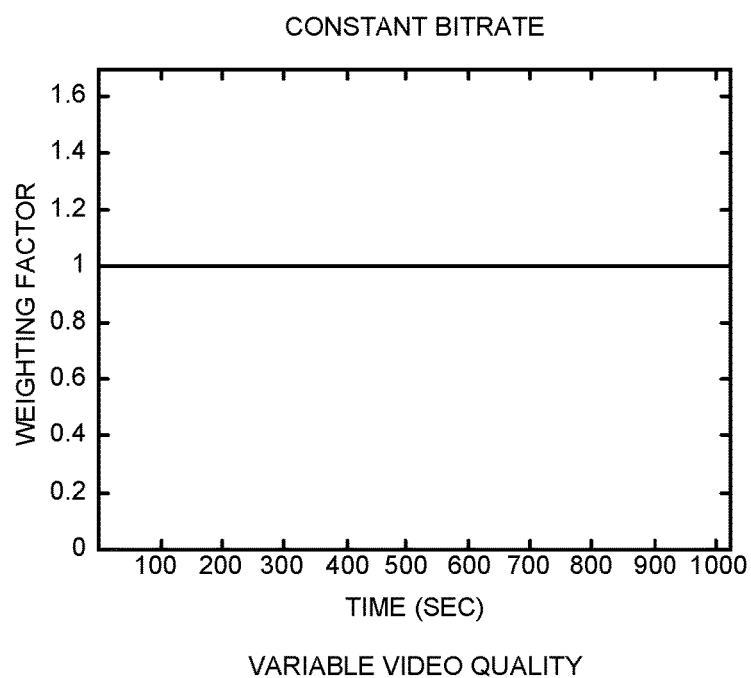
Figures 4F, 4G:
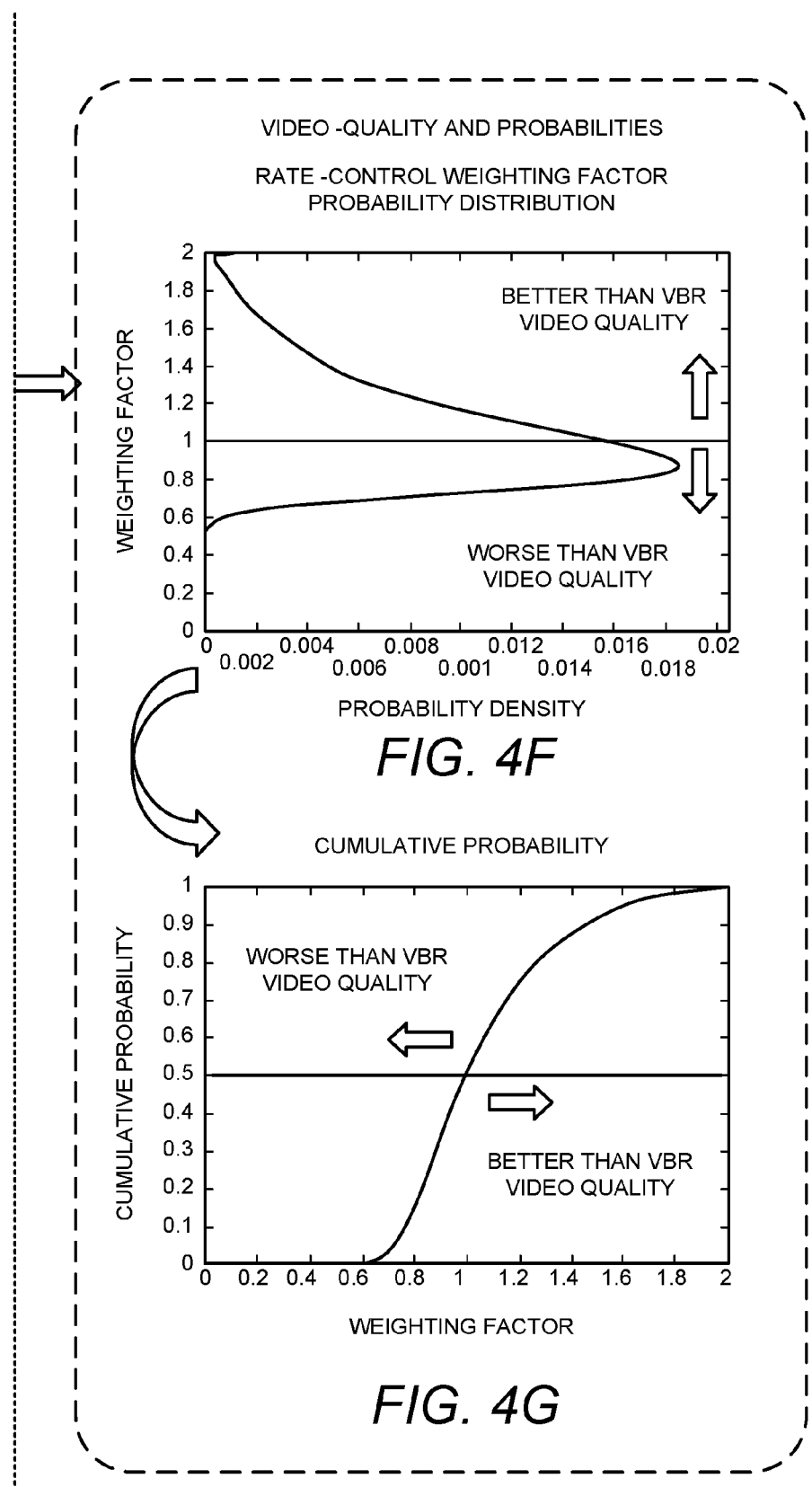

FIG. 4A-4G are diagrams presenting a quantitative view of the variability of CBR video quality can be obtained in the case depicted in FIGS. 3A-3E. (FIGS. 4A, 4C, and 4D depict the same information as FIGS. 3A, 3C and 3D, while FIG. 4F illustrates the probability density distribution of the rate-control weighting factor (FIG. 4C) over the indicated time period. The probability density relates to how often the weighting factor is a specific value. The cumulative probability distribution, shown in FIG. 4G, provides a measure of how often the weighting function exceeds a specific value. (The cumulative probability distribution is the integral of the probability density. The axes of FIG. 4F are orientated in a slightly atypical manner so as to highlight the relationship with FIG. 4C.)

The cumulative probability curve in depicted in FIG. 4G provides a quantitative basis of determining, for example, how often the rate-control weighting factor exceed a certain value. For example, the curve presented in FIG. 4G indicates that the weighting factor is greater than 0.8 approximately 80% of the time (80% corresponds to 0.2 on the vertical access; i.e. 80%=100%-20%).

The CBR-to-VBR Factor

In FIGS. 3A-3E and 4A-4G, the CBR bitrate and the average VBR bitrate (average of the needed bitrate) are equal. FIGS. 5A-5C are diagrams illustrating a case where the CBR bitrate is increased so as to be greater than the VBR bitrate. As illustrated, increasing the CBR bitrate, as shown in FIG. 5B, moves the cumulative probability curve shown in FIG. 5C, to the right because the rate-control weighting factor increases. The CBR video quality is thus equal or better than the original VBR video quality shown in FIG. 5A, more than half the time. If the original average VBR bitrate is used as a video-quality benchmark, a quantitative method for managing video-quality probabilities can be developed.

Figure 6:
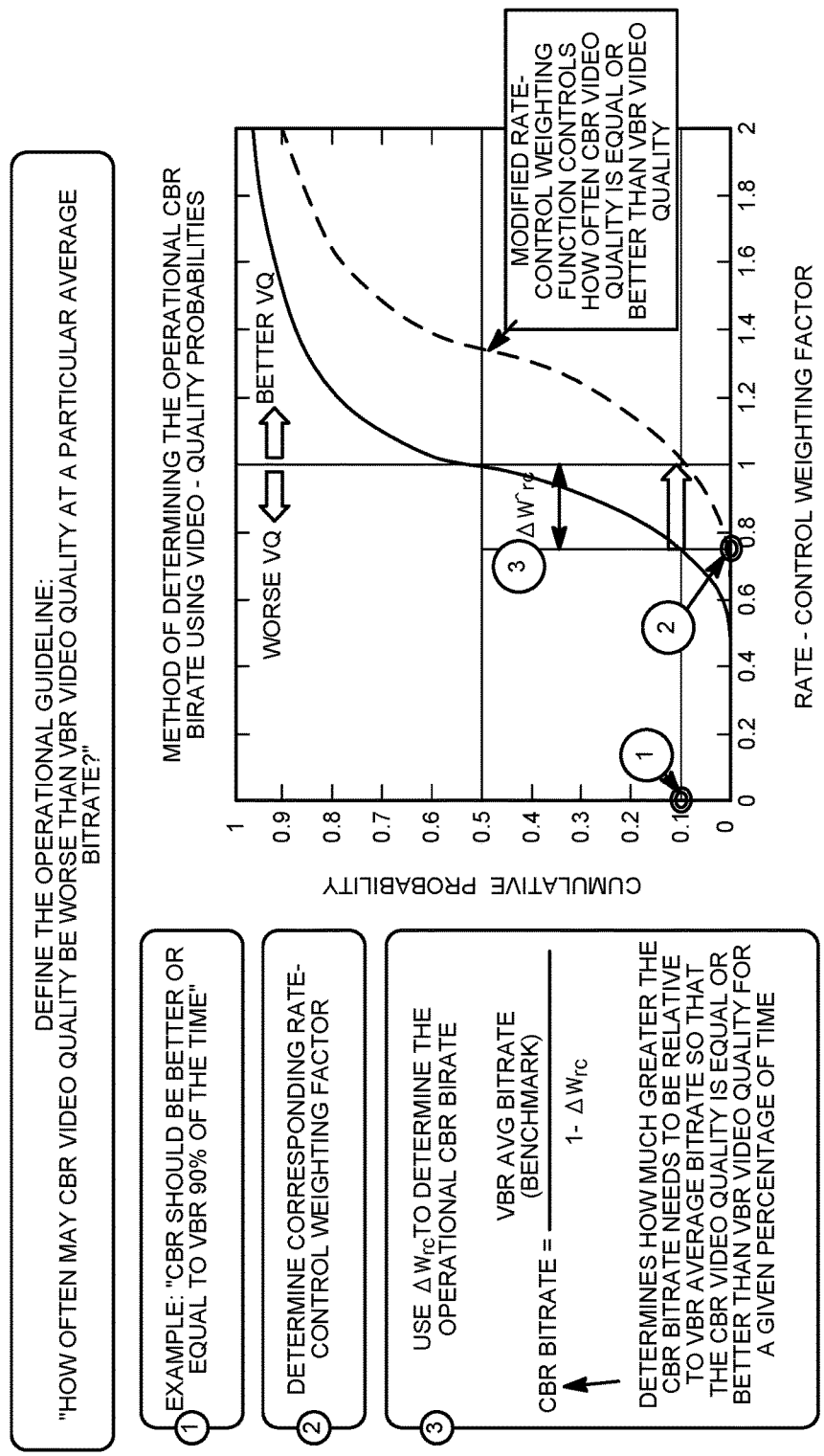
FIG. 6 illustrates a method that can be used to allocate a bandwidth for constant bit rate services.

FIG. 6 illustrates a method that can be used to plan bandwidth for CBR services. A service operator of a data transmission system can use this method to set an operational target in terms of how often a program's video quality is likely to meet or exceed a benchmark video-quality target.

First, the operator defines the operational video quality target. In the exemplary case illustrated in item ① of FIG. 6, the operational video quality target is defined in terms of particular video quality of the CBR encoded stream that should be equal to or better than the benchmark video quality (VBR) a certain percent of the time. The second step illustrated by item ②, is to determine a corresponding rate-control weighting factor W to achieve that CBR statistical video quality target. In the illustrated embodiment, this is accomplished by finding a cumulative probability value associated with the statistical video quality target on the vertical axis of the cumulative probability plot, and finding the rate control constant bit rate weighting factor W along the horizontal axis. In the illustrated example, a 90% threshold (0.1 on the vertical axis) corresponds to a weighting factor of approximately 0.75 (horizontal axis).

The third step ③ is to move the cumulative probability curve a distance $\Delta W_{rc}$ until the 90%-threshold intersection point occurs at 1.0 along the horizontal axis, which is the point at which CBR and benchmark average VBR video quality are equal. The CBR bitrate that achieves the video-quality probability objective is calculated as follows:

$$CBR \text{ bitrate} = \frac{VBR \text{ avg unconstrained bitrate (benchmark)}}{1 - \Delta W_{rc}} \quad \text{Equation (1)}$$

In one embodiment, several CBR bitrates are calculated using the technique shown in FIG. 6 and a "CBR-to-VBR" factor is used to quantify how much greater the CBR bitrate needs to be relative to the benchmark VBR bitrate so that the CBR video quality is equal or better than the benchmark video quality for a given percentage of the time. Throughout this disclosure, this CBR-to-VBR factor is alternatively referred to as a video quality (VQ) stress factor, and may be expressed simply as 1/W.

Figures 7A, 7B:
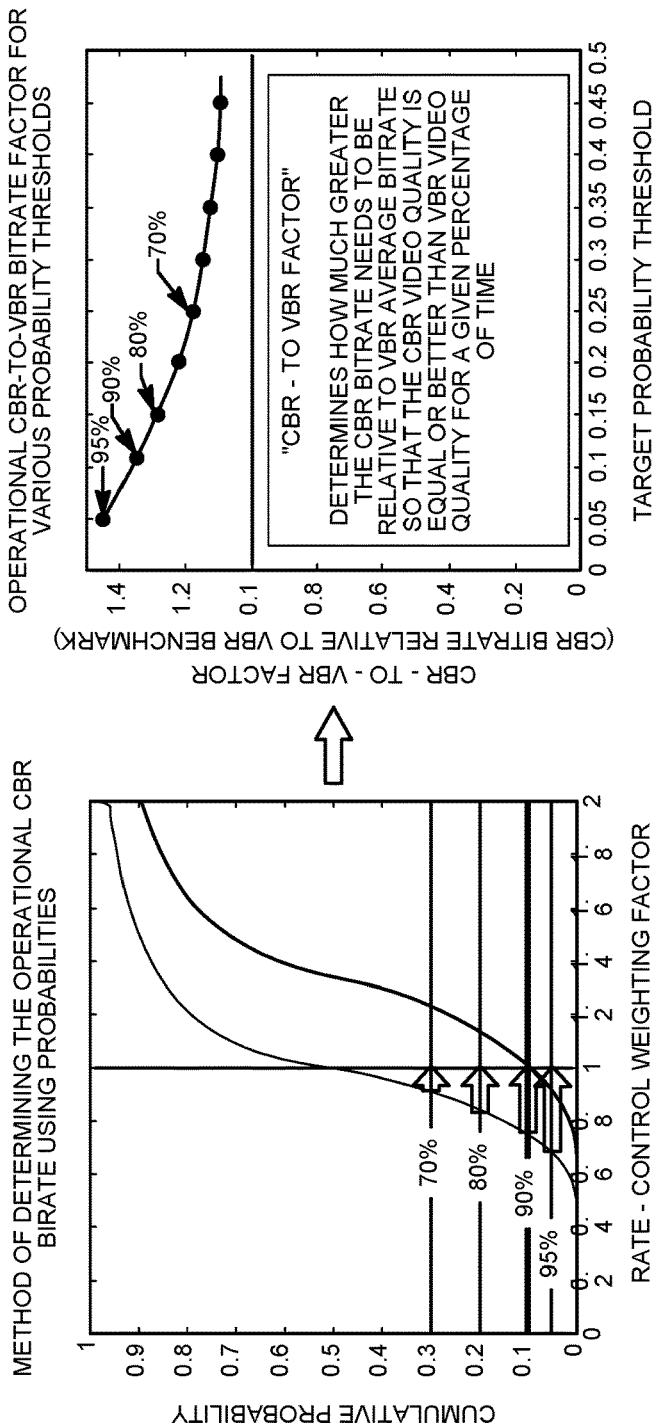
FIGS. 7A and 7B are diagrams illustrating the generation of a CBR-to-VBR or stress factor.

FIGS. 7A and 7B are diagrams illustrating the generation and use of the CBR-to-VBR factor. FIG. 7A shows the amount by which the cumulative probability curve computed above would need to move horizontally to achieve video-quality probability thresholds of 95%, 90%, 80%, and 70%. The corresponding "CBR-to-VBR factors" are plotted in FIG. 7B. A 90% threshold produces a rate control constant bit rate weighting factor of about 0.75, and this results in a "CBR-to-VBR factor" of approximately 1.33, which means that a CBR bitrate of 1.33 times the benchmark VBR average bitrate should be expected to produce video quality that is equal or better than the benchmark video quality 90% of the time. Relaxing the target video-quality probability threshold reduces the "CBR-to-VBR factor" and thus the corresponding CBR bitrates would be less.

CBR-to-VBR Factor (Stress) Applied to Statistical Multiplexing

Figures 8D, 8E, 8F:
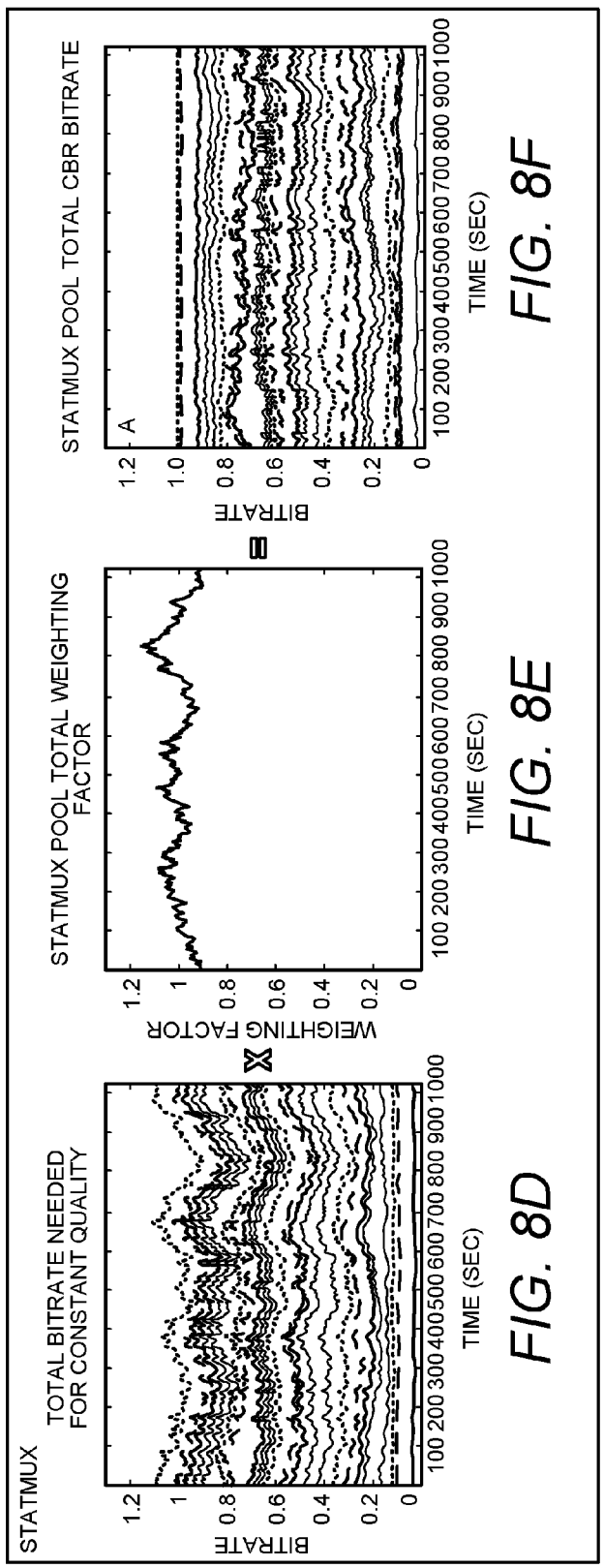

Multi-program statistical multiplexing can be thought of as an extension of single-program CBR encoding. FIGS. 8A-8F are diagrams illustrating the similarities between CBR encoding and statistical multiplexing. FIGS. 8A-8C illustrate the CBR case, while FIGS. 8D-8F illustrate the statistical multiplexing case. FIG. 8D illustrates the bitrates needed by each of the video data streams 102 in the statmux pool 104 for constant video quality. The required constant quality bit rate for the pool 104 of video data streams 102 is the sum of the required constant quality bit rate for each video data stream at each particular time. This sum of the bitrates needed by each video data stream in the statmux pool 104 is analogous to the single-program bitrate illustrated in FIG. 8A needed to achieve constant video quality. Similarly, as shown in FIG. 8E, a statistically multiplexed pool 104 of video streams 102 (statmux pool 104) can be considered to have a total statistical multiplexing weighting factor $W_{SM}$ as shown in FIG. 8E, which is analogous to the CBR rate-control weighting factor W shown in FIG. 8B. And like CBR, statmux allocates bandwidth to individual programs over time so that the total bandwidth used is constant, as shown in FIG. 8F.

A key advantage of statistical multiplexing is that it is more efficient than CBR. Statistical multiplexing leverages the fact that the compressibility of the data streams 102 at any particular time is largely uncorrelated. When one data stream might require a larger than average bitrate to maintain video quality, it is likely that another program in the statistical multiplexer pool 104 would simultaneously need a lower than average bitrate to maintain the same level of video quality. Statistical multiplexing allocates more bandwidth to the needy program and less to the charitable program.

Figures 9A, 9B, 9C:
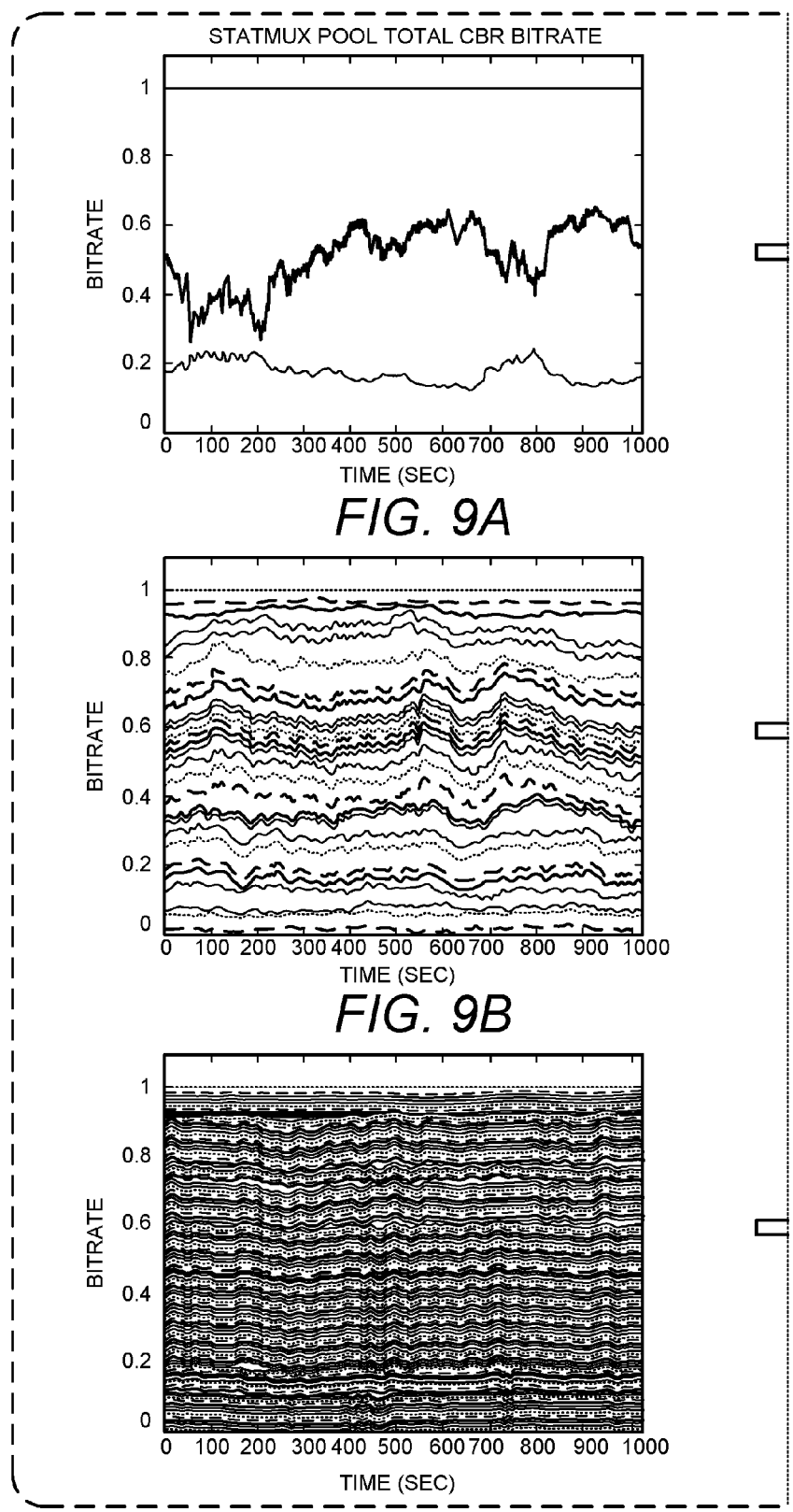
FIGS. 9A-9H are diagrams illustrating a relationship between the statmux pool weighting function variability and the number of programs in the statmux pool.
Figures 9D, 9E, 9F:
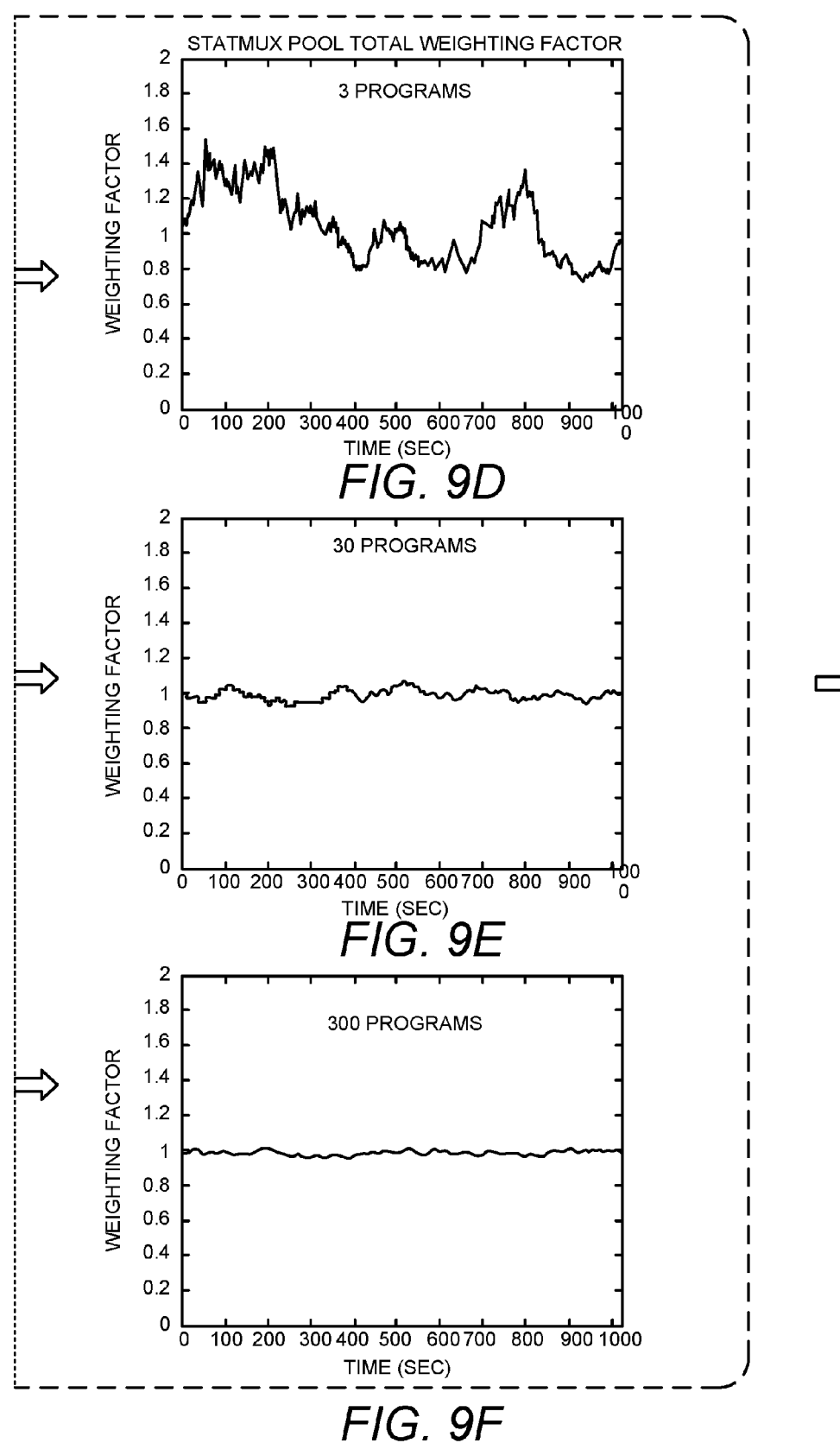
Figures 9G, 9H:
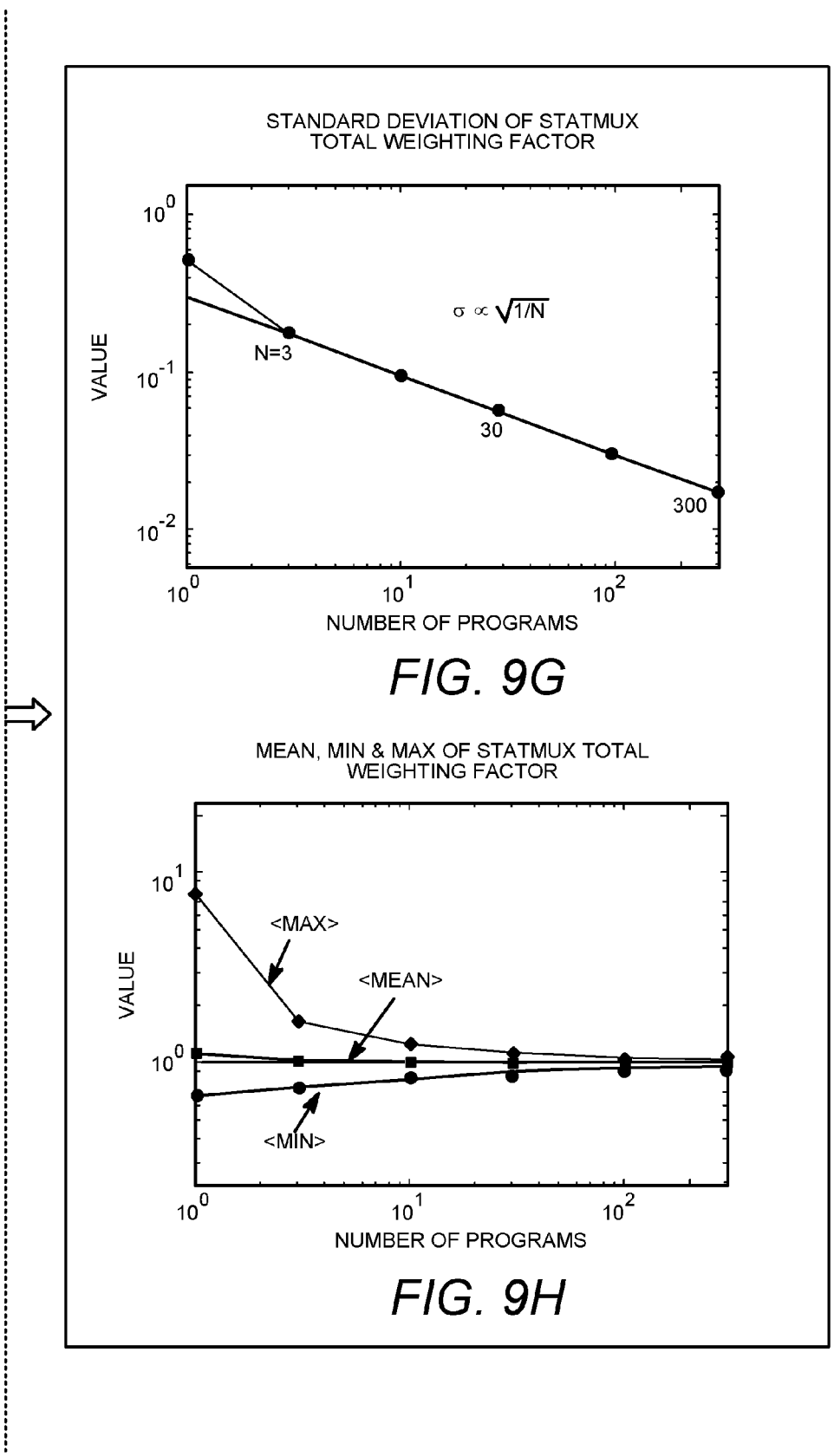

Statistically, the accumulated bit rate requirements of all of the data streams 102 in the statmux pool 104 varies over time. Consequently, the statmux pool 104 total weighting function varies over time. The amount of that variability depends of the number of programs in the pool 104, as shown in FIGS. 9A-9H. FIGS. 9A, 9B, and 9C represent statmux pools 104 of 3, 30, and 300 programs, respectively. FIGS. 9D, 9E, and 9F illustrate the corresponding statmux pools 104 total weighting factors over time. Note that the variability of the weighting factors decreases with increasing program density. FIG. 9G shows that the standard deviation of the statmux weighting factor can be expected to decrease in inverse proportion to the square-root of the number of programs in the stream. Similarly, the range between the maximum and minimum values of the statmux weighting factor over any period of time can be expected to decrease with increasing program density, as shown in FIG. 9D.

Figure 10A:
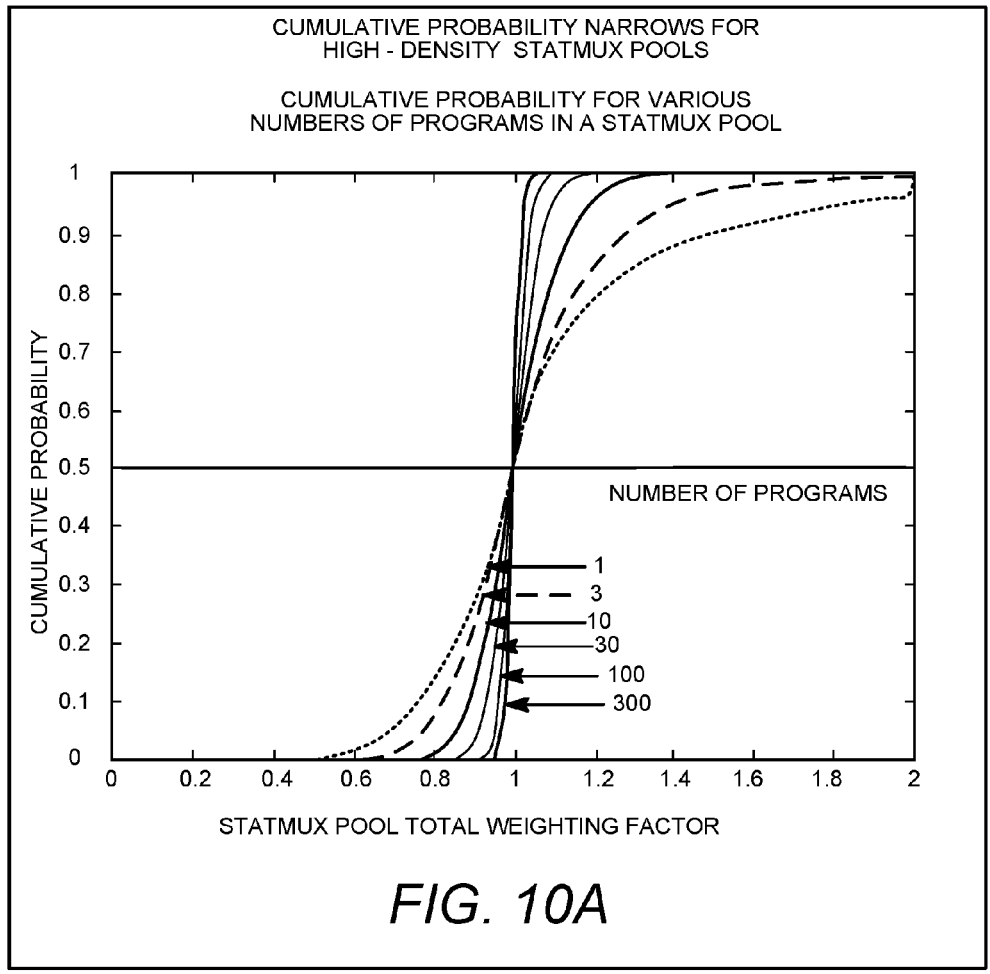

FIGS. 10A-10G are diagrams illustrating another way to visualize the impact of program density on the variability of accumulated bit rate requirements. FIG. 10A shows cumulative probability distributions for statmux pool total weighting factors for program counts of 1, 3, 10, 30, 100, and 300. Note that as the number of programs in the statmux pool 104 increases, the cumulative probability curve narrows and becomes steeper, indicating less variance in the accumulated bit rate requirements. FIGS. 10B-10G depict statmux equivalents of the shifted cumulative probability curves shown in FIGS. 5A-7B. Note that as the number of programs in the statmux pool 104 increases, the amount by which the cumulative probability curve needs to shift decreases.

Figure 11A:
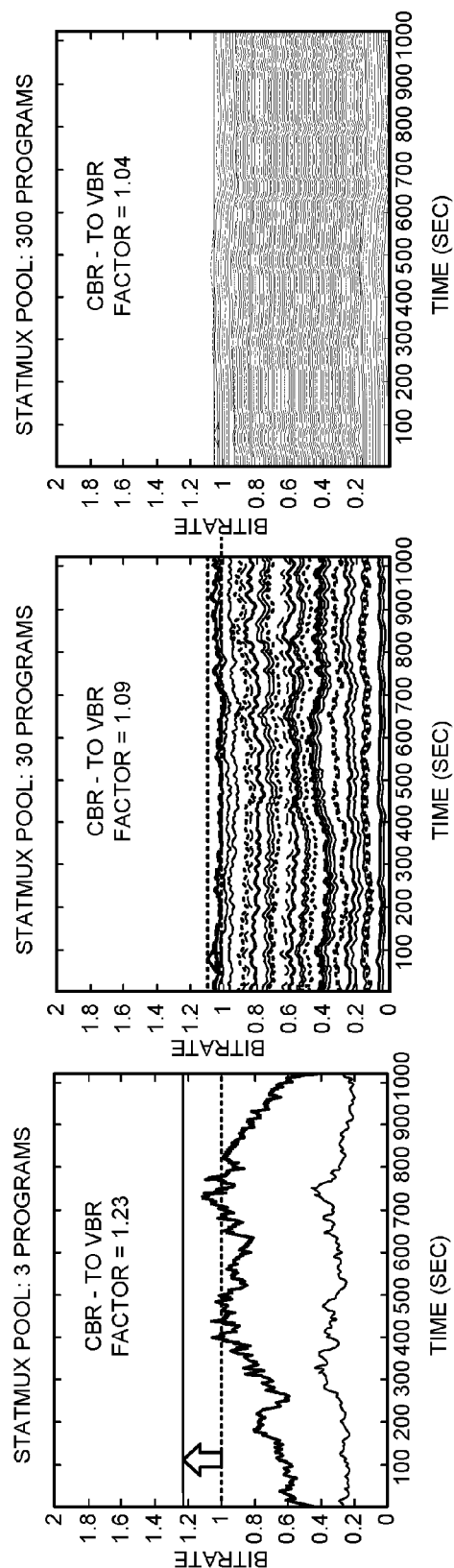
FIGS. 11AA-11AD are diagrams further quantifying the relationship between the number of programs sharing a statmux pool and the video quality stress factor.
Figure 11A:
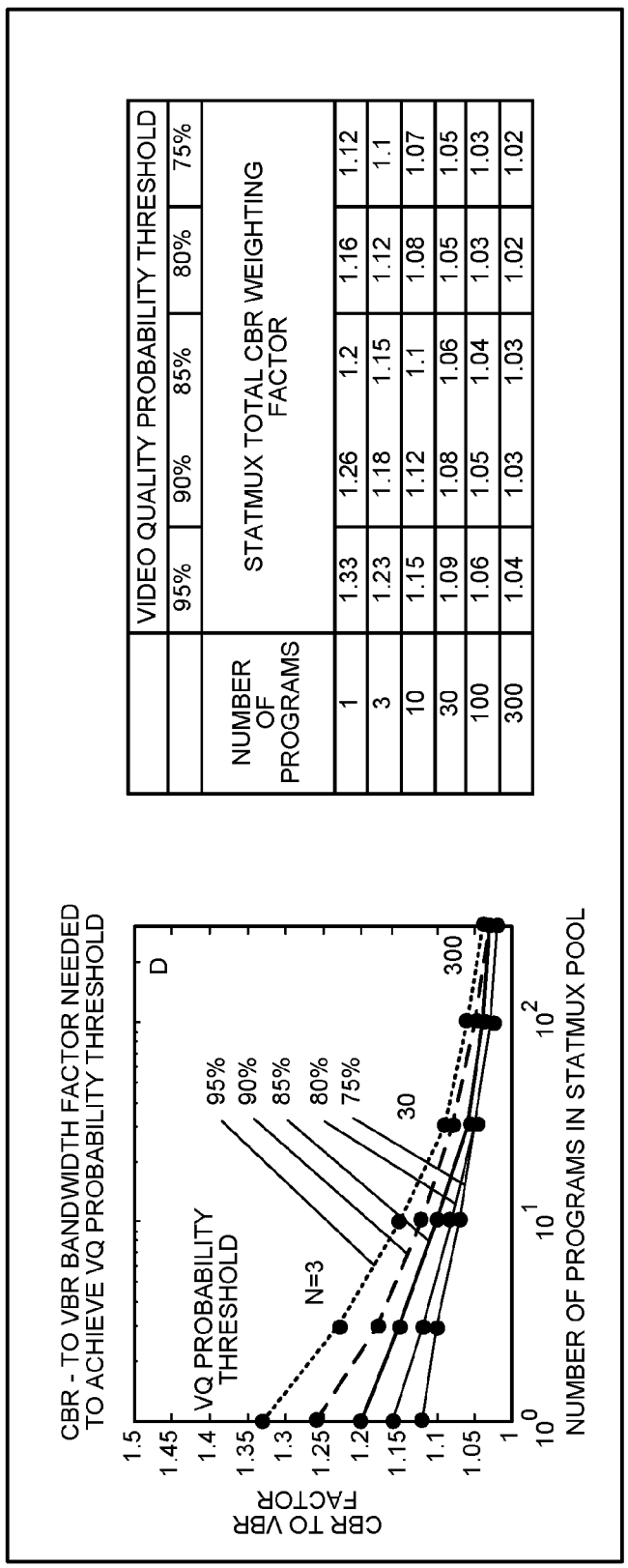

FIGS. 11AA-11AD are diagrams further quantifying the relationship between the number of programs sharing a statmux pool 104 and the "CBR-to-VBR factor" (i.e. the amount by which the total statmux bitrate would need to exceed the aggregate of the VBR bitrates needed by the constituent programs). As stated above, the "CBR-to-VBR" factor is also alternatively referred to herein as the video quality (VQ) stress factor, because it provides an indication of the how much the statmux controller 108 must reduce the bit rates allocated to the controllers 108 to assure the maximum bit rate is not exceed.

FIG. 11AA illustrates the CBR-to-VBR factor (equivalent to a statmux weighting or VQ stress factor) required to achieve a 95% video quality probability threshold with a statmux pool 104 of three programs. FIG. 11AB illustrates the CBR-to-VBR factor required to achieve a 95% video quality probability threshold with a statmux pool 104 of 30 programs. FIG. 11AC illustrates the CBR-to-VBR factor required to achieve a 95% video quality probability threshold with a statmux pool 104 of 300 programs. Note that the CBR-to-VBR bandwidth factor required to achieve a given probability threshold is significantly less as the number of encoded video streams 114 (e.g. programs) in the statmux pool 104 increases. For example, for the video streams 114 illustrated in FIG. 11AA, a CBR-to-VBR factor of 1.23 is required to achieve the desired video quality probability threshold for three data streams 114, while a reduced CBR-to-VBR factor of 1.09 s required to achieve the same video quality probability threshold, and an even less CBR-to-VBR factor of 1.04 is required to achieve the same video quality probability threshold.

FIG. 11AD presents a tabulation of the foregoing for video quality probability thresholds of 95%, 90%, 85%, 80%, and 75% and statmux pool 104 populations of 1, 3, 10, 30, 100 and 300 video streams 102. FIG. 11AD also presents a pot of this tabulation to show how the statmux "CBR-to-VBR factor" depends on the number of programs in the statmux pool 104 and the operational video-quality probability target that a service provider might adopt.

The information shown in FIGS. 11AA-11AD is useful for managing the allocation of video data streams 102 to statmux pools 104. For example, a statmux pool 104 having three video program streams 102 can be expected to produce equal or better video quality than a benchmark 75% of the time using a "CBR-to-VBR factor" of 1.1. By increasing the program count to 30 and keeping the same "CBR-to-VBR factor" of 1.1, the 30-program statmux pool 104 can be expected to produce equal or better video quality than a benchmark 95% of the time. The difference in video-quality probabilities—95% of the time compared to 75% of the time—with no change in total bandwidth usage is significant.

Another use of our methods and models for video-quality and bandwidth planning is illustrated in FIGS. 11A-11AD. FIG. 11AA presents the bit rate of 300-program service made up of 10 independent statmux pools 104 of 30-programs each for a 95% video quality threshold. FIG. 11AB presents the bit rate of the same 300-program service as a single 300-program statmux pool 104 for the same 95% video quality threshold. A relative bandwidth efficiency of the two scenarios can thus be calculated from the ratio of the respective CFB-to-VBR factors. In the illustrated case, the statmux weighting factor for a single statmux pool 104 of 300 data streams is 1.04, while the statmux weighting factor for 10 statmux pools, each with 30 data stream is 1.09. The result is that the 300-program statmux pool 104 could use 5% less bandwidth while achieving the same video quality as the ten individual 30-program pools. If this analysis were repeated for one hundred 3-program statmux pools, the result would be that the 300-program poll could use 15% less total bandwidth while achieving the same 95% video-quality probability target.

A relative efficiency factor may be identified as:

$$\text{Relative Efficiency} = 1 - \frac{\text{Weight Factor }(N \text{ programs})}{\text{Weight Factor }(M \text{ programs})} \quad \text{Equation (2)}$$

$$(\text{for } N > M)$$

In the above example, the 300 data stream statmux pool 104 is about $$1 - \frac{1.04}{1.09}$$

or 5% more efficient than 10 statmux pools 104 of 30 data streams 102 each.

Figure 11B:
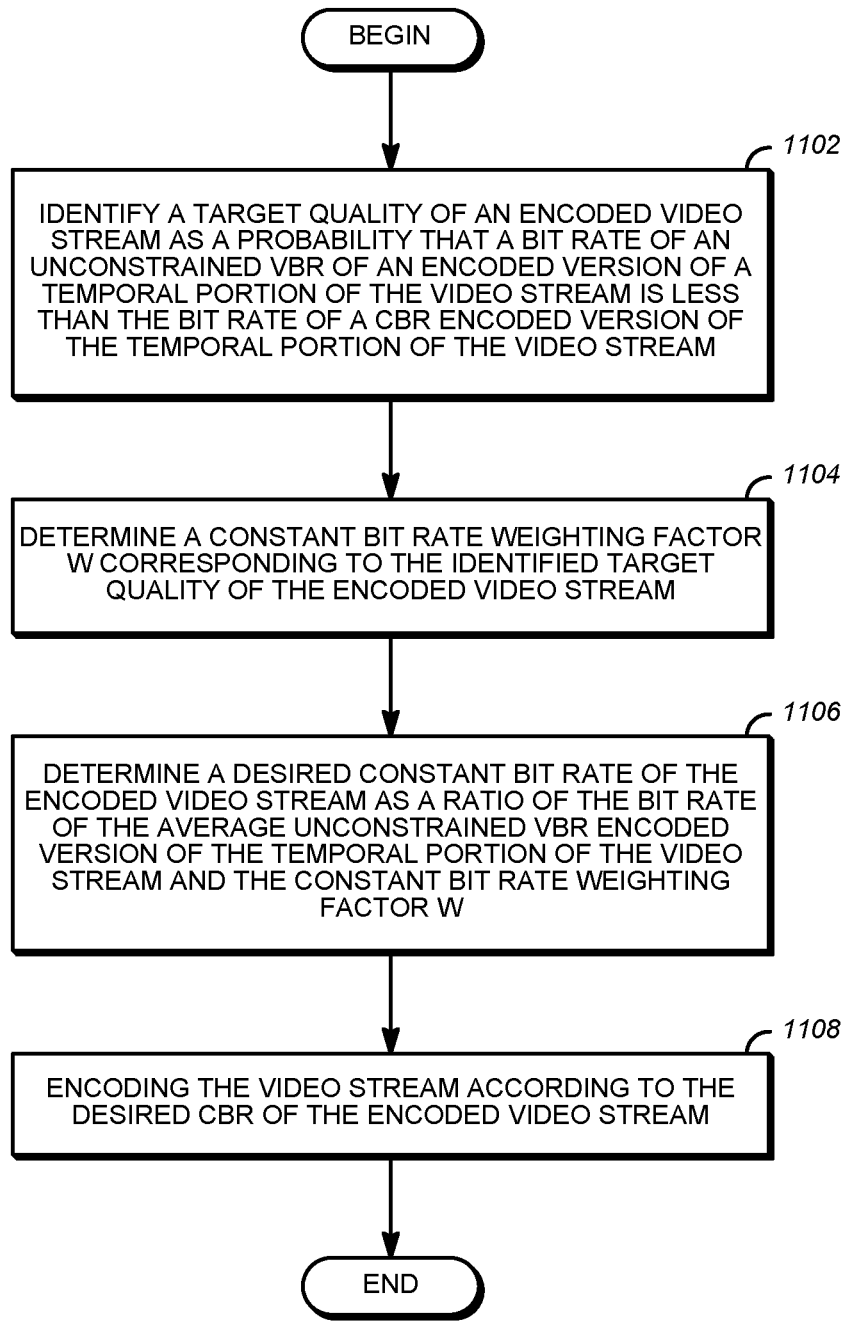
FIG. 11B is a diagram illustrating exemplary method steps for analyzing encoded video streams and for encoding at least one video stream at a constant bit rate according to a target quality.

FIG. 11B is a diagram illustrating exemplary method steps for analyzing encoded video streams 114 and for encoding at least one video stream 102 at a constant bit rate according to a target quality of the encoded video stream 114. A target quality measure for an encoded video stream is identified, as shown in block 1102. In one embodiment, the target quality measure for the encoded video stream is based at least in part on the probability that a bit rate of an unconstrained VBR encoded version of a temporal portion of the video stream is less than the bit rate of a CBR encoded version of the video stream. For example, referring to FIG. 6, a target quality measure may be as described in step ②, that is, that the bit rate of the CBR encoded version of the video stream should be equal to or better than the bit rate of the unconstrained VBR encoded version of the video stream 90% of the time. This is analogous to the situation presented in FIG. 4A in which the illustrated unconstrained VBR is less than or equal to the bit rate for the CBR encoded video stream.

A constant bit rate weighting factor W corresponding to that identified target quality is then determined, as illustrated in block 1104. In one embodiment, this is accomplished by computing a relationship of a cumulative probability that a bit rate of the CBR encoded version of the temporal portion of the video stream is less than the bit rate of the unconstrained VBR version of the temporal portion of the video stream, and determining the constant rate weighting factor W from this computed relationship.

One example of the computation of this cumulative probability relationship is illustrated in FIGS. 5A-5C. FIG. 5A illustrates the bit rate needed for an unconstrained VBR version of the bit stream, while FIG. 5C illustrates a situation where the available bit rate is for a constant video quality bit stream is limited to a particular value. Since the normalized bit rate required for an unconstrained VBR version of the bit stream exceeds the normalized constant video quality normalized bit rate (a value of 1) half of the time, the probability that the required bit rate exceeds the available bit rate is 0.5. If the normalized available bit rate for a constant video quality normalized bit rate is raised to 1.2, the bit rate required for the unconstrained VBR version is exceeded less of the time, resulting in a value of less than 0.5. Plotting these results for different threshold values results in the plot shown in FIG. 5C, which represents a cumulative probability that the bitrate of a CBR encoded version of the temporal portion of the video stream is less than the unconstrained VBR version of the bit stream.

Step ② of FIG. 6 illustrates how the foregoing cumulative probability density function can be used to determine the rate control constant bit rate weighting factor W. In the example shown in FIG. 6, the target quality measure is that the bit rate of the CBR encoded version of the video stream is equal to or better than the VBR encoded version of the video stream 90% of the time (which is analogous to a situation where the bit rate of the CBR encoded version of the video stream is lower than the VBR encoded version no more than 10% (0.1) of the time. Using the cumulative probability relationship illustrated in FIG. 6, it can be determined that the rate control weighting factor W associated with the cumulative probability value of 0.1 is approximately 0.75.

Returning to FIG. 11B, a desired constant bit rate of the encoded video stream is determined as a ratio of the bit rate of the average unconstrained VBR encoded version of the temporal portion of the video stream and the constant bit rate weighting factor W, as shown in block 1106. This weighting factor W is used to determine a change required in the rate control weighting factor $\Delta W_{RC}$ necessary to bring the rate control weighting factor to a value of one, which corresponds to an average unconstrained variable bit rate version of the encoded video stream. This can be expressed as $(1-\Delta W_{RC})$. In the example of FIG. 6, a ratio of the bit rate of the average unconstrained VBR encoded version of the temporal portion of the video stream is normalized at a value of one, and the constant bit rate weighting factor W is 0.75, therefore, the desired constant bit rate of the encoded video stream is 1/0.75 or about 1.33.

Finally, the video stream is encoded according to the desired CBR of the encoded video stream, as shown in block 1108.

Figure 11C:
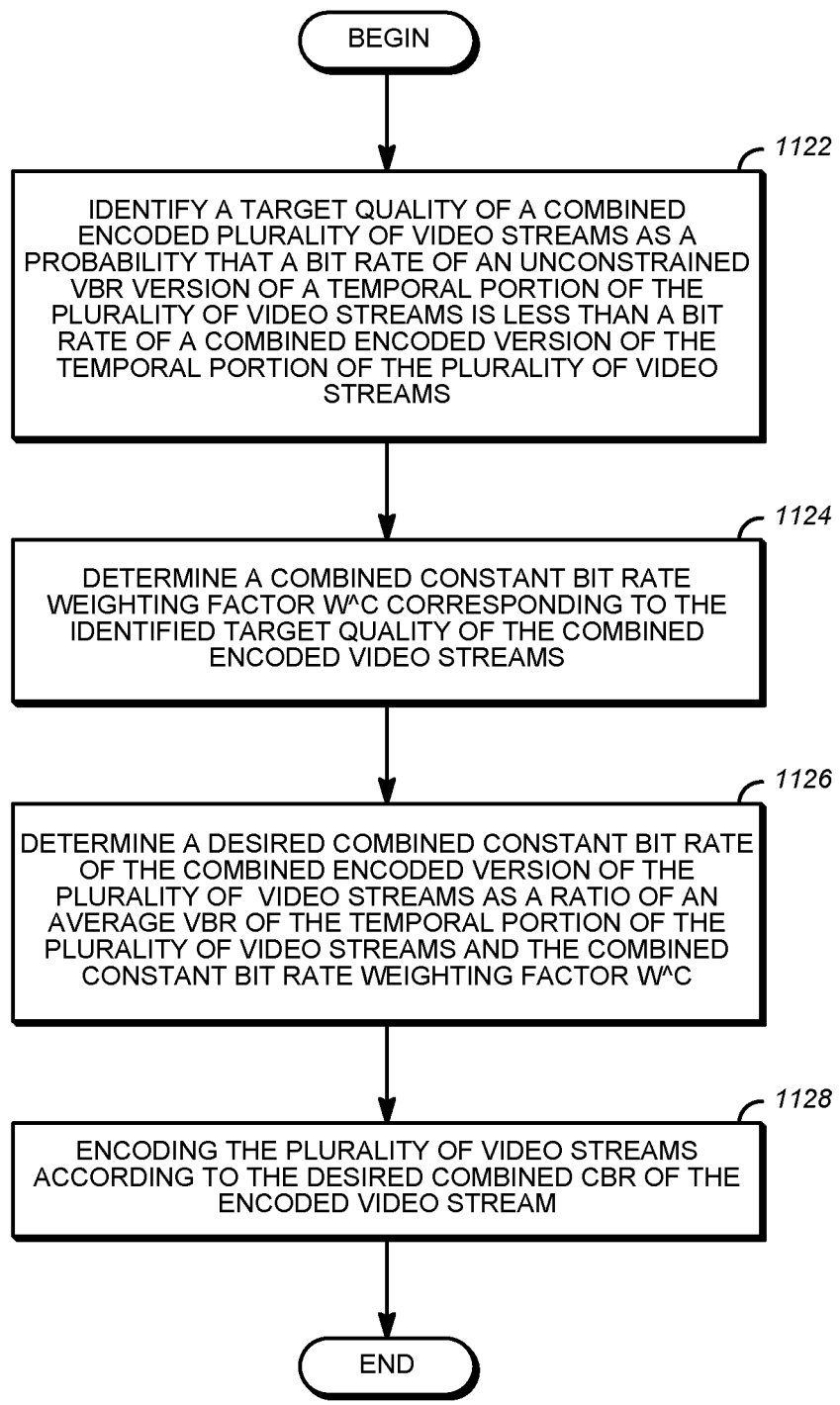
FIG. 11C is a diagram illustrating exemplary method steps for analyzing a plurality of encoded video streams and for encoding the plurality of video streams at a constant bit rate according to a target quality of the combined encoded video streams.

FIG. 11C is a diagram illustrating exemplary method steps for analyzing a plurality of encoded video streams 114 and for encoding the plurality of video streams 102 at a constant bit rate according to a desired target quality of the combined encoded video streams 114. In this embodiment, principles similar to those described above are used to encode a combination of a plurality of video streams. A target quality of the combined encoded plurality of video streams is identified, as shown in block 1122. In this case, the target quality refers to the combined plurality of video streams and is identified as a probability that a bit rate of an unconstrained VBR version of a temporal portion of the combined plurality of video streams is less than a bit rate of the combined encoded version of the temporal portion of the plurality video streams. Next, in block 1124 a combined constant bit rate weighting factor $W_C$ corresponding to the identified target quality of the combined encoded video streams is determined. This can be accomplished as described in FIG. 6, but with the difference that instead of the cumulative probability function illustrated in FIG. 6 (which refers to a single video stream), a cumulative probability function that refers to the plurality of data streams is utilized. Examples of such a cumulative probability function is illustrated in FIG. 10, for different numbers of video streams.

Next, a desired constant bit rate of the combined encoded version of the plurality of video streams is determined, as shown in block 1126. This is determined at least in part as a ratio of an average VBR of the temporal portion of the plurality of video streams and the combined constant bit rate weighting factor $W_C$. This can be accomplished similarly to the procedure for a single video stream (as shown in FIG. 6), but with the cumulative probability function being generated from multiple video streams (for example, as illustrated in FIG. 10). Finally, as shown in block 1128, the plurality of video streams is encoded according to the desired combined CBR.

This desired common CBR for the combined plurality of video streams may be used to define an optimal allocation of the plurality of video streams to be encoded to a plurality of encoders 106 that encode the video streams. This can be accomplished by pooling the encoders 106 so as to minimize average value of the video quality stress factor (inversely related to the constant bit rate weighting factor of the plurality of pools 104. For example, FIGS. 11AA, 11AB and 11AC indicate the CBR-to-VBR factor for statmux pool 104 with 3, 30, and 300 program members, respectively. A statmux pool 104 of 3 members results in a CBR-to-VBR (stress) factor of 1.23, which is greater than the CBR-to-VBR (stress) factor of 1.09, which is the result for a statmux pool 104 of 30 program members. Further, the statmux pool 104 of 300 members has the lowest CBR-to-VBR (stress) factor (1.04) and is therefore the most efficient choice. In cases where it is not possible or advisable to include 300 program members in the statmux pool, less populous statmux pools 104 can be defined, with less resulting efficiency. The best allocation of program streams to encoders 106 may be obtained by minimizing average of the combined CBR or CBR-to-VBR factors of the combined pools 104, and this will depend on the nature of the program streams 102. For example, it may be advisable to combine as many programs having highly variable VBR encoded bit rates into a single statmux pool 104 as possible, as the averaging that inherently occurs in the pool 104 will be most beneficial. Video streams 102 having less variation may be combined into statmux pools 104 in smaller numbers while still maintaining a small CBR or CBR-to-VBR ratio.

Figure 11D:
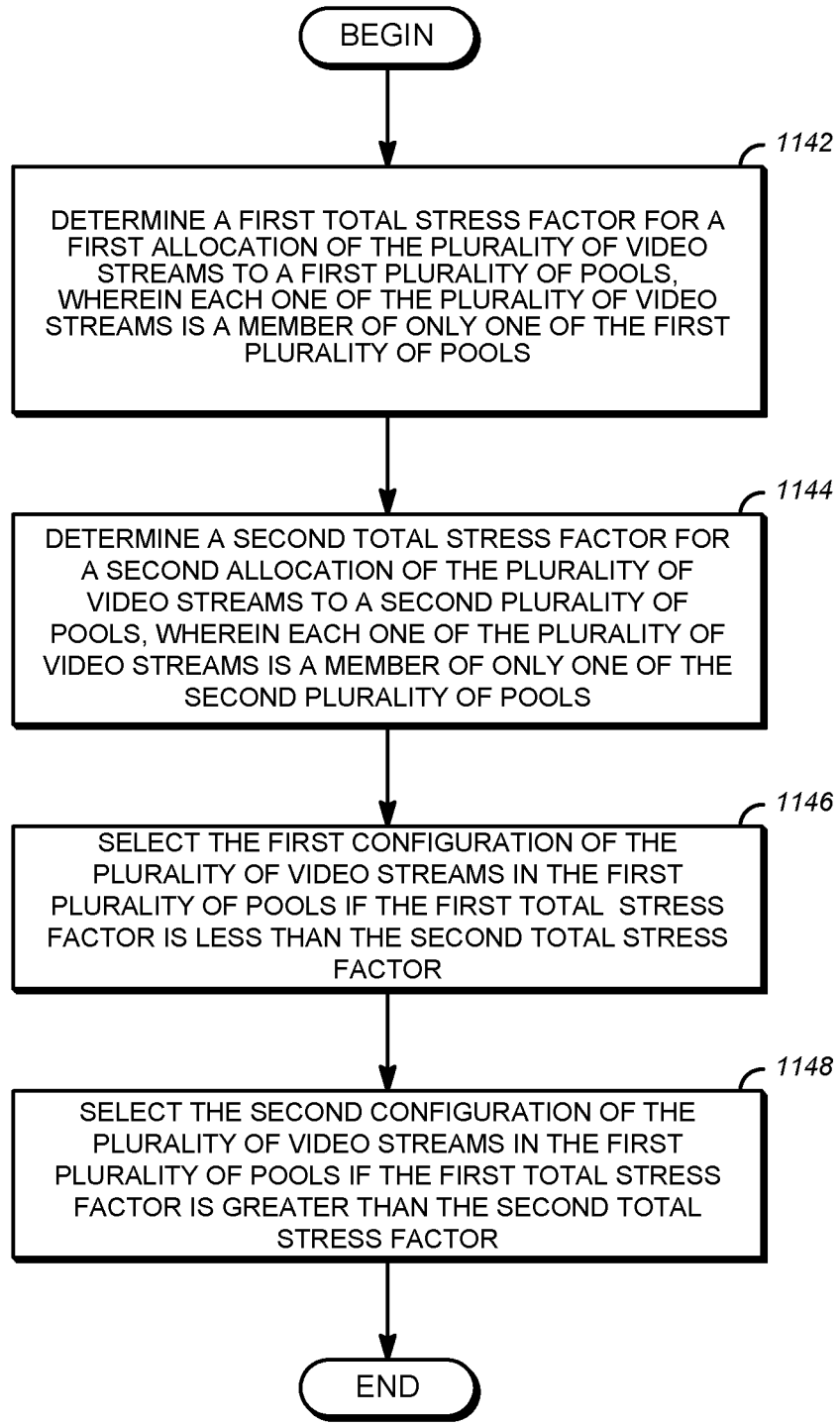
FIG. 11D is a diagram illustrating an exemplary technique for determining an optimal allocation of the plurality of video streams to a plurality of encoder pools.

FIG. 11D is a diagram illustrating an exemplary technique for determining an optimal allocation of the plurality of video streams 102 to a plurality of encoder pools for a given target quality. In block 1142, a first stress factor is determined for a first allocation of the plurality of video streams 102 to a first plurality of encoder pools 104. This may be accomplished by determining a total constant bit rate weighting factor $WT_{C1}$ for the first allocation of the plurality of video streams 102 to a first plurality of encoder pools 104, then using this value to compute the first stress factor. Typically, each one of the plurality of video streams 102 is a member of only one of the first plurality of pools 104 (e.g. the video stream is not encoded by encoders 106 in more than one pool), but a video stream may be encoded by different encoders 106 in different pools 104 if the respective encoders 106 are configured to encode the video stream 102 differently than one another. For example, a video stream 102 may be encoded by encoder A (which is a member of an encoder pool 104) to produce a high definition encoded version of the video stream 102, but encoded by encoder B (which is a member of a different encoder pool 104) to produce a standard definition encoded version of the video stream 102.

Next, the process is repeated for a second allocation of the plurality of video streams 102 to a second plurality of video pools 104 to determine a second stress factor for the second allocation (again, using a total constant bit rate weighting factor $WT_{C2}$) for the second allocation, as shown in block 1144. Next, either the first configuration or the second configuration is selected according to which has the smallest stress factor, as shown in blocks 1146 and 1148.

The foregoing operations were described with respect to a plurality of encoders 106 that are not necessarily controlled by a statmux controller 108. However the same techniques can be applied to situations wherein each of the encoders 106 makes bandwidth requests to the statmux controller 108 (for example, using a measure of the complexity of the video stream 102 to be encoded, and allocated bandwidth by the statmux controller 108.

Figure 11E:
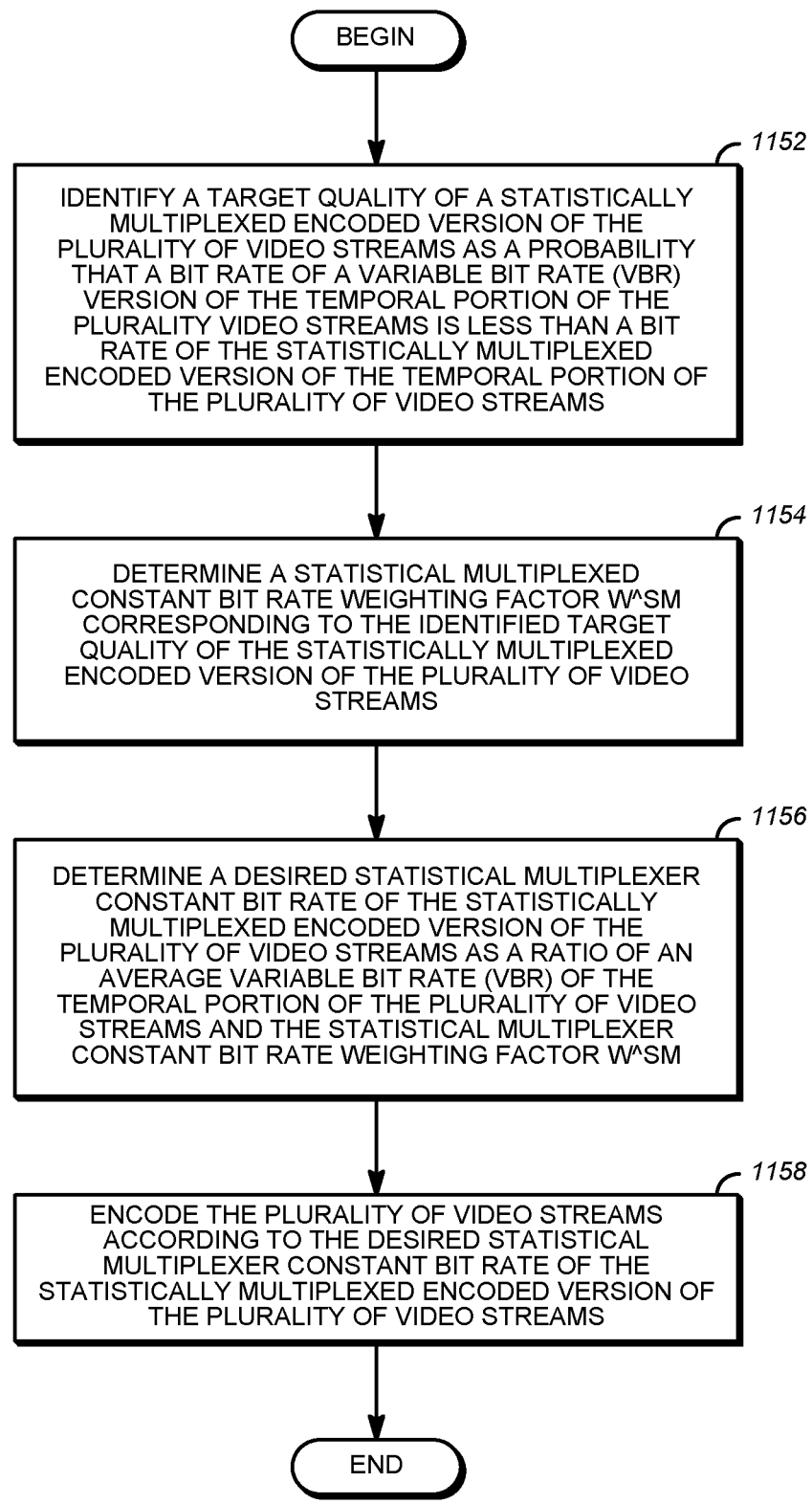
FIG. 11E is a diagram illustrating an exemplary technique for analyzing a plurality of encoded video streams and for encoding the plurality of video streams at a constant bit rate according to a target quality of the combined encoded video streams.

FIG. 11E is a diagram illustrating exemplary method steps for analyzing a plurality of encoded video streams 114 and for encoding the plurality of video streams 102 at a constant bit rate according to a target quality of the combined encoded video streams 114. In this embodiment, principles similar to those described above are used to encode a combination of a plurality of video streams 102, but the plurality of encoders 106 are controlled by a statmux controller 108. Blocks 1152-1158 illustrate operations analogous to those of blocks 1122-1128, respectively, but for statistically multiplexed video streams. In block 1152, a target quality of a statistically multiplexed encoded version of the plurality of video streams is identified as a probability that a bit rate of a variable bit rate (VBR) version of the temporal portion of the plurality video streams is less than a bit rate of the statistically multiplexed encoded version of the temporal portion of the plurality of video streams. In block 1154, a statistical multiplexed constant bit rate weighting factor $W_{SM}$ corresponding to the identified target quality of the statistically multiplexed encoded version of the plurality of video streams is determined. This can be accomplished, for example, by computing a relationship of cumulative probability that the bitrate of the statistically multiplexed encoded version of the plurality of video streams is less than the bitrate of a variable bit rate (VBR) version of the temporal portion of the plurality of video streams and determining the statistical multiplexed constant bit rate weighting factor $W_{SM}$ from the computed relationship of cumulative probability.

In block 1156, a desired statistical multiplexer constant bit rate of the statistically multiplexed encoded version of the plurality of video streams is determined as a ratio of an average unconstrained variable bit rate (VBR) of the temporal portion of the plurality of video streams and the statistical multiplexer constant bit rate weighting factor $W_{SM}$. In block 1158, the plurality of video streams 102 is encoded according to the desired statistical multiplexer constant bit rate.

Figure 11F:
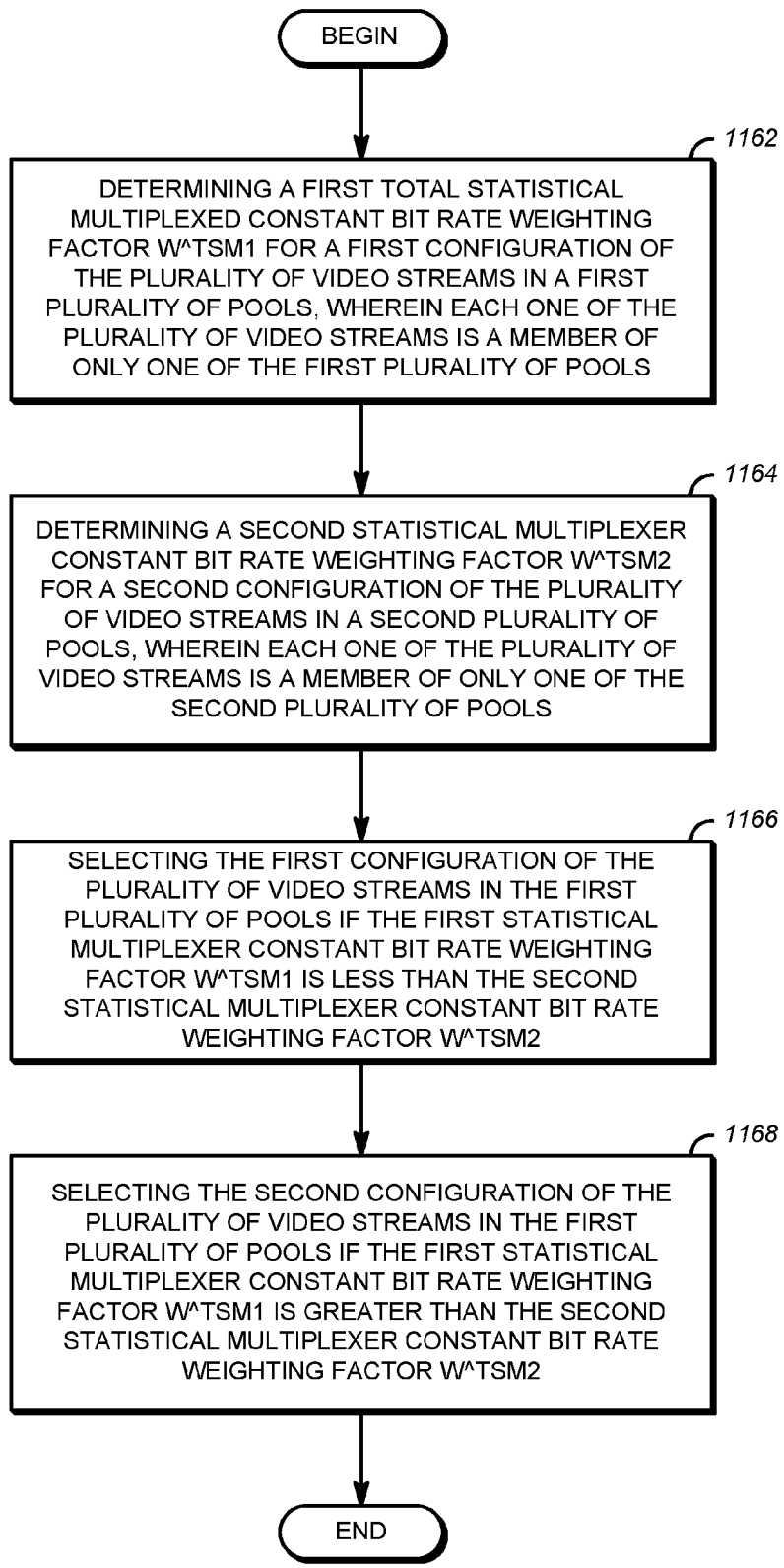
FIG. 11F is a diagram illustrating an exemplary technique for determining an optimal allocation of the plurality of video streams to a plurality of encoder pools.

FIG. 11F is a diagram illustrating an exemplary technique for determining an optimal allocation of the plurality of video streams 102 to a plurality of encoder pools 104 controlled by the statmux controller 108. In block 1162, a first statistical multiplexer stress factor is determined from a first total statistical multiplexed constant bit rate weighting factor $W_{TSM1}$ for a first configuration of the plurality of video streams 102 in a first plurality of pools. In block 1164, a second statistical multiplexer stress factor is determined from a constant bit rate weighting factor $W_{TSM2}$ for a second configuration of the plurality of video streams 102 in a second plurality of pools 104. In block 1166, the first configuration of the plurality of video streams 102 in the first plurality of pools 104 is selected if the first statistical multiplexer stress factor is less than the second statistical multiplexer stress factor, while in block 1168, the second configuration of the plurality of video streams 102 in the first plurality of pools 104 is selected if the first statistical multiplexer stress factor is greater than the second statistical multiplexer stress factor.

Analysis Tool

Figure 12:
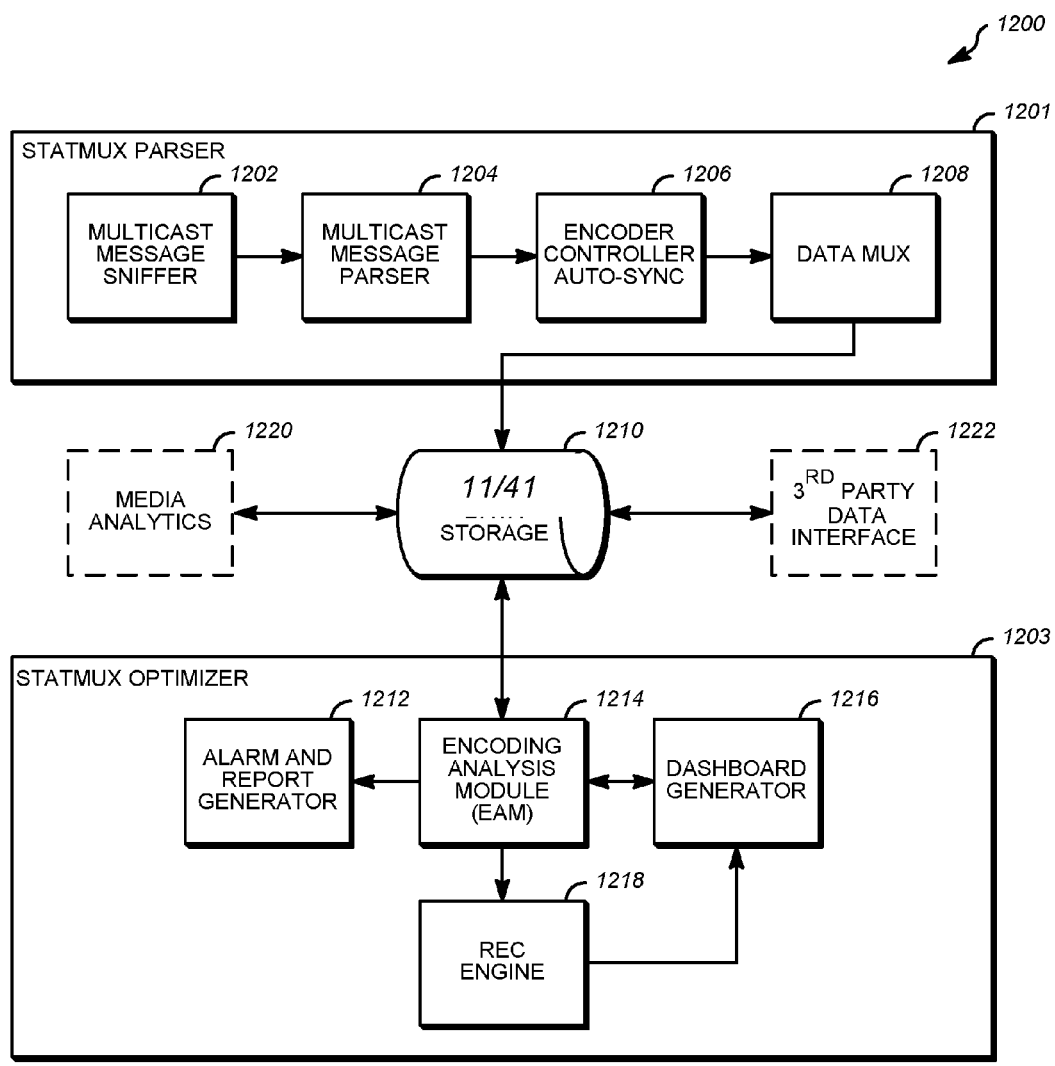
FIG. 12 is a block diagram of an analysis tool that can be used to analyze and manage the encoding of a plurality of video data streams.

FIG. 12 is a diagram of an analysis tool 1200 that can be used to analyze and manage the encoding of plurality of video data streams. The analysis tool 1200 comprises a statmux parser 1201, a statmux optimizer 1203, and data storage 1210. The statmux parser 1201 collects data available from the encoders 106 and the statmux controller 108, and provides that data to the data storage 1210 for later use by the analysis optimizer 1203.

As described above, statistical multiplexing may be accomplished with elements that communicate via IP, allowing elements to be easily modified and reconfigured via software (e.g. by readdressing messages, sources, or destinations), rather than by reconfiguring conductive or optical cables between the elements. Such communications may be conveyed in data messages (which may include video stream 102 to be encoded, the encoded video streams 114, and if the encoded video streams 114 are multiplexed together, the multiplexed encoded video streams 114) and metadata messages (which may include any non-data messages conveying information used by the encoders 106 or the statmux controller 108 in the encoding process). Such multicast messages may include bandwidth requests (or complexity measures) from the encoders 106, and allocated bandwidths from the statmux controller 108.

The encoded video stream data transmitted by the encoders 106 include the encoded video stream 114, and may include:
  a quantization parameter (a measure of how much each picture of the encoded video stream 114 has been compressed);
  prediction bits of the picture image;
  residual bits of the picture image;
  motion vectors;
  picture type (e.g. whether the picture is an I (intra coded) picture which does not rely on other pictures for reconstruction, P (predicted) picture which uses the previous frame for reconstruction, or B (bi-predicted) picture, which uses both previous and following frames for reconstruction);
  coding mode; and
  audio and auxiliary data.

The metadata available from the encoders 106 for each encoded video stream 114 or program (each of which may be provided to a different multicast IP address of a common IP address for the encoders 106 and statmux controller 108 of a statmux pool) includes:
  a program source identifier;
  an encoder packet time stamp; and
  if the encoder is used in conjunction with a statmux controller, a bit rate request (which may be in the form of program complexity or criticality value).

The program source identifier identifies the source of the program, and can be used to identify the video or program data streams 102 being encoded by the encoders 106. The encoder packet timestamp is included with each multicast message packet, and can be used for correlation and synchronization purposes, as described further below. In one embodiment, the encoder packet timestamp is generated based on an NTP clock.

Other metadata data that may optionally be transmitted by the encoders 106 to the appropriate multicast IP address include:
  program priority;
  encoder network time protocol (NTP) clock;
  non-video bit rate;
  encoder fail safe rate;
  encoder identifier (the encoder's IP address may also be used as an identifier);
  program frame number; and
  frame synchronization verification.

The metadata available from the statmux controllers 108 for each encoded video stream 114 or program encoded (each of which may be provided to a different multicast IP address of a common IP address for the encoders 106 and statmux controller 108 of a statmux pool 104) include:
  a program source identifier;
  a statmux packet time stamp; and
  a program bit rate allocation.

The metadata available from the statmux controller 108 for each encoded video stream 114 or program encoded may also include:
  a statmux controller ID (if there is more than one statmux controller 108);
  a statmux controller NTP clock; and
  statmux weighting.

Optional media analytic module 1220 and third party tools using third party interface 1222 may also provide additional data including:
  program identifiers;
  advertisement detection;
  black frame detection;
  scene and program change detection;
  audio analytics;
  logo presence detection;
  repeat pictures; and
  skip pictures.

The statmux optimizer 1203 retrieves data from the data storage 1210 and provides the data to an encoding analysis module (EAM) 1214. The EAM 1214 performs the analytical tasks herein described below and provides the results to an alarm and report generator 1212, a recommendation engine 1218, and a dashboard generator 1216. The dashboard generator 1216 receives the analysis results from the EAM 1214 and generates a user interface for managing the encoding of the plurality of video data streams 102 using the weighting factors and video quality stress factors described above. The output provided by dashboard generator 1216 also includes controls that permit the user to specify the analysis performed by the EAM 1214. The user accomplishes this by selecting the appropriate control, and the dashboard generator 1216 interprets the selection of the control and provides the associated data and commands to the EAM 1214. The EAM 1214 performs the commanded operations, and provides the results to the dashboard generator 1216 for display to the user.

The recommendation engine 1218 determines an optimal or recommended allocation or re-allocation of the plurality of video streams 102 to the plurality of encoder pools, for example, using the VQ stress factor described herein, and provides a description of this allocation or reallocation to the dashboard generator 1216 to display the information to the user.

The alarm and report generator 1212 accepts results from the EAM 1214 and generates appropriate alarms or other notices for the user. For example, if an encoded video stream 114 is no longer present, the EAM 1214 can be configured to detect the loss of the video stream from that encoder 106 and provide a suitable alarm or warning to the alarm and report generator 1212. Similarly, reports summarizing the analytical results from the EAM 1214 may be provided to the alarm and report generator 1212. Further, the alarm and report generator 1212 may interface with the dashboard generator 1216 so that the report configuration or the desired alarms may be specified by the user, and the alarms presented to the user along with other information generated by the dashboard generator 1216.

FIG. 13A-13E are diagrams further illustrating one embodiment of how data describing geographically distributed elements of video encoding system having a plurality of encoders 106 communicatively coupled to a network may be discovered.

Figure 13A:
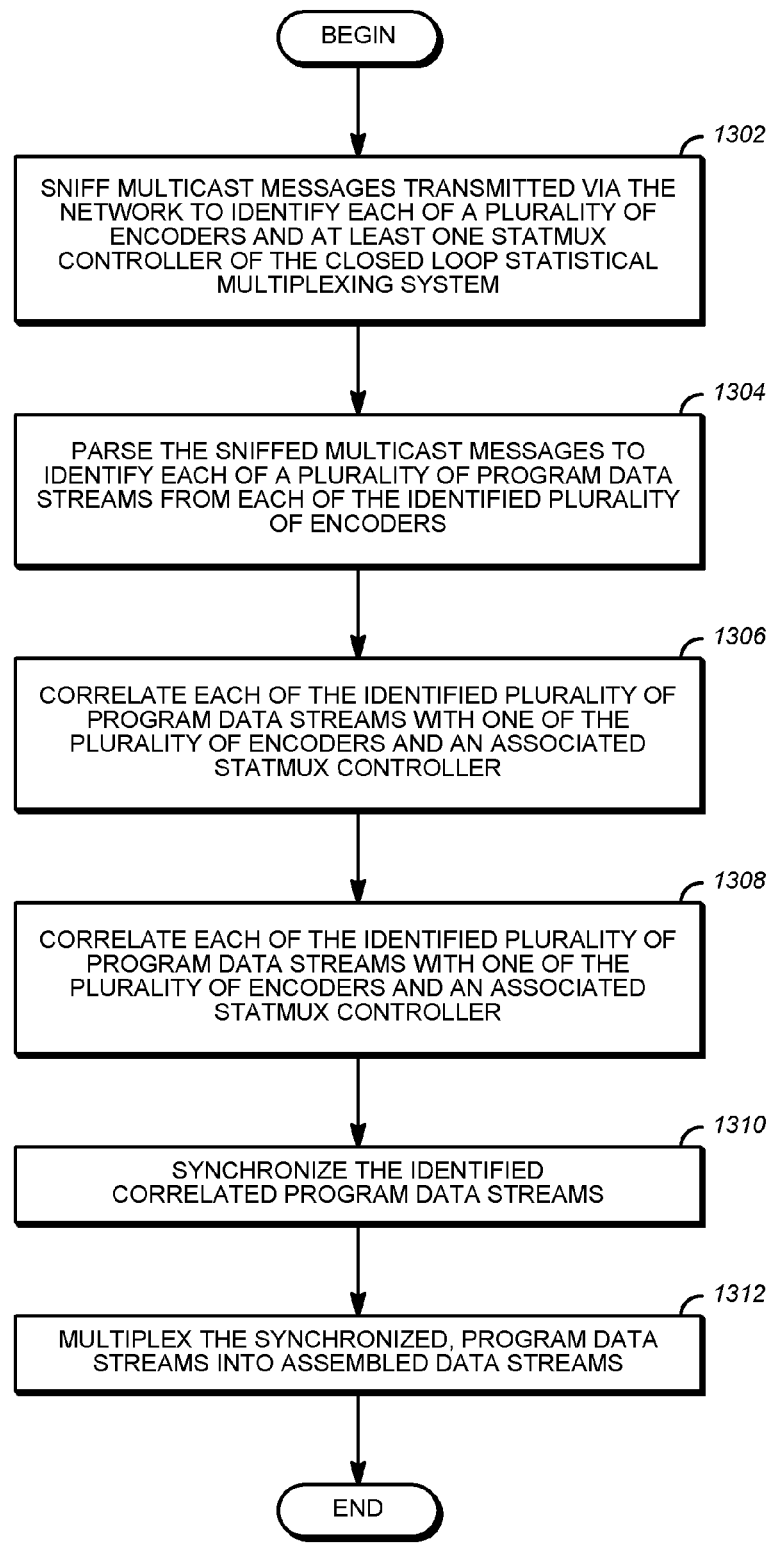
FIGS. 13A-13E are diagrams further illustrating the discovery of geographically distributed elements of video encoding system.

FIG. 13A is a diagram illustrating exemplary operations that can be performed to automatically discover and obtain data from the video encoding system. In block 1302, multicast messages transmitted via the network are sniffed to identify each of the plurality of encoders 106 and at least one statmux controller 108 of the closed loop statistical multiplexing system. This can be accomplished by communicatively coupling a computer or other processor to the network interconnecting the encoders 106 and controller(s) 108 examining the messages transmitted to the multicast IP address that the encoders 106 and statmux controller 108 utilize to transmit metadata. The aforementioned program source identifier or encoder ID that is included in such multicast IP messages transmitted from the encoders 106 can be used to identify each of the encoders 106 transmitting metadata to the multicast IP address.

In one embodiment, the encoders 106 and statmux controllers 108 in the network are configured to transmit such metadata to a single multicast IP address, hence, all of such metadata may be obtained by subscribing to this multicast IP address. The encoders 106 and controllers 108 in the network can be preconfigured to transmit to this single multicast IP address before deployment, or may be configured after deployment.

The network may comprise only one closed loop statistical multiplexing system 100, and thus, include a plurality of encoders 106 but only one statmux controller 108. In this case, all of the elements of the closed loop statistical multiplexing system 100 may communicate metadata on only one IP address. In the case where the network may comprise multiple closed loop statistical multiplexing systems 100 (e.g. with multiple statmux controllers 108), two embodiments are possible: (1) a first embodiment in which each such closed loop statistical multiplexing system use a different multicast IP address than the other closed loop statistical multiplexing systems 100. In this embodiment, the statmux controller 108 need not transmit a statmux controller ID to the multicast IP address, because the identity of the statmux controller 108 is known. (2) a second embodiment in which a plurality of closed loop statistical multiplexing systems 100 (e.g. a plurality of statmux controllers 108 controlling a different pool 104 of encoders 106) in which a single multicast IP address can be used for all of the elements in the system. In this embodiment, the statmux controller 108 must be identified, which can be implemented by including a statmux controller (or pool) ID to the multicast IP address as well, or by using the IP address of the statmux controller 108.

In block 1304, the sniffed multicast messages are parsed to identify each of a plurality of program data streams 114 from each of the identified plurality of encoders 106.

Figure 13B:
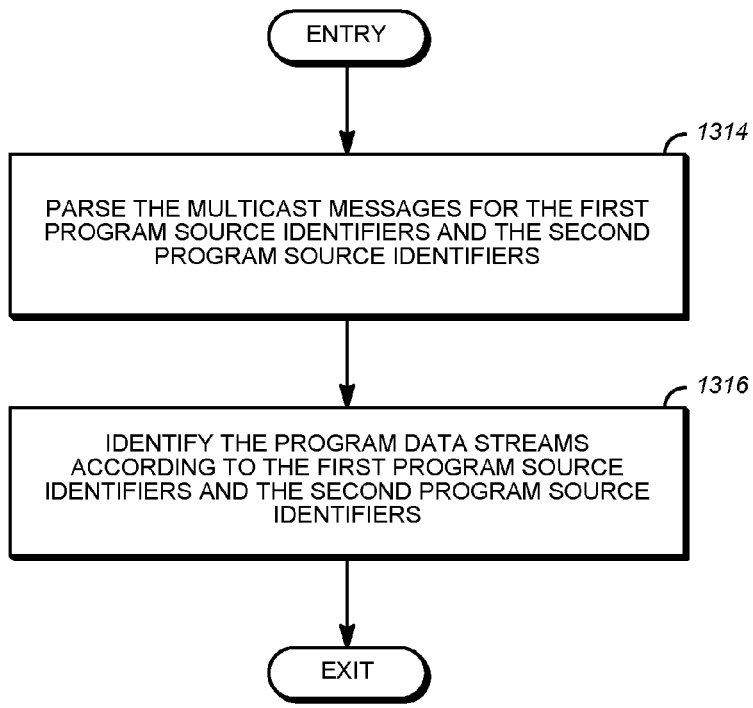

FIG. 13B is a diagram illustrating one embodiment of how the sniffed multicast messages can be parsed to identify the program streams 114 from each of the encoders 106. In block 1314, the multicast messages are parsed for the program identifiers, which include first program identifiers (included in the multicast messages from the encoders 106) and second program identifiers (included in the multicast messages from the statmux controller). In block 1316, the program data streams 114 are identified according to the first program source identifiers and the second program source identifiers.

Returning to FIG. 13A, each of the identified plurality of program data streams 114 are correlated with one of the plurality of encoders 106 and an associated statmux controller 108.

Figure 13C:
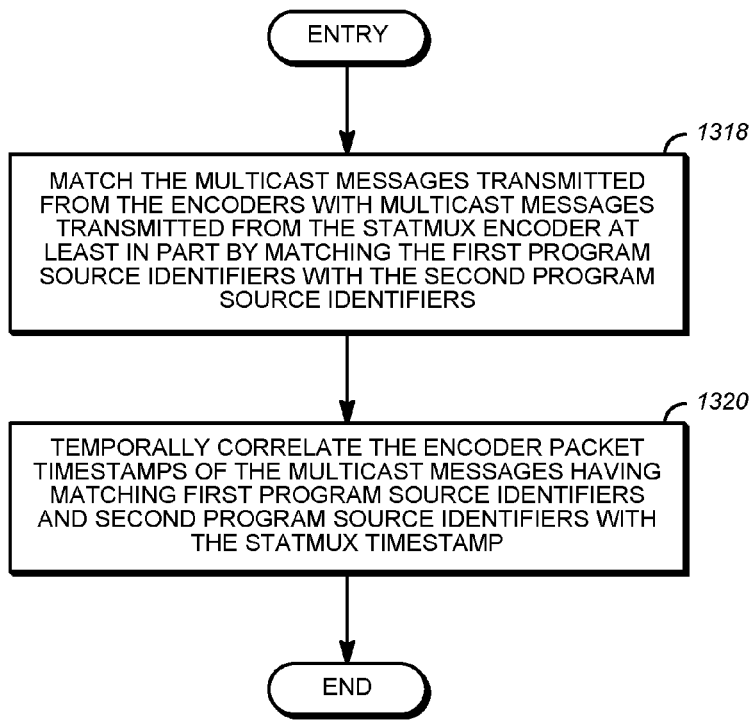

FIG. 13C is a diagram illustrating one embodiment of how the identified program streams 114 can be correlated with one of the plurality of encoders 106 and an associated statmux controller 108. In block 1318, multicast messages transmitted from the encoders 106 are matched with multicast messages transmitted from the statmux controller 108 at least in part by matching the first program source identifiers with the second program source identifiers. In block 1320, the encoder packet timestamps of the multicast messages having matching first program source identifiers and second program source identifiers are temporally correlated with the statmux controller timestamp.

To accomplish the foregoing correlation, the incoming sniffed multicast messages are temporarily stored in a buffer (which may be included within the central data storage 1210, statmux parser 1201, statmux optimizer 1203, or may be a separate entity. The messages are retrieved from the buffer, and their program source identifiers compared with the program source identifiers of the other messages in the buffer. Sniffed multicast messages having the same program source identifiers can be regarded as either coming from the same encoder 106 (along with the bandwidth request) or coming from a statmux controller 108 responding to the bandwidth request (along with the bandwidth allocation). Further correlation can be accomplished by temporally correlating the messages. For example, if a bandwidth request message is timestamped later than a bandwidth allocation message, it can be safely assumed that even though the bandwidth request message and the bandwidth allocation message refer to the same video program stream 114, their non-causality indicates that the bandwidth allocation should not be regarded as a response to the bandwidth request. If, however, a bandwidth request message having a first program source identifier is transmitted to the multicast IP address is followed shortly thereafter by a bandwidth allocation message having a second program source identifier matching the first program source identifier, it can be concluded that the bandwidth allocation message is a response to the bandwidth request message, and hence, the program streams 114 identified in the message are correlated. Time correlation may be required in cases where there might be significant variation of the latency of the messages transmitted to the multicast IP address.

Returning to FIG. 13A, the identified and correlated program data streams 114 are synchronized, as shown in block 1310.

Figure 13D:
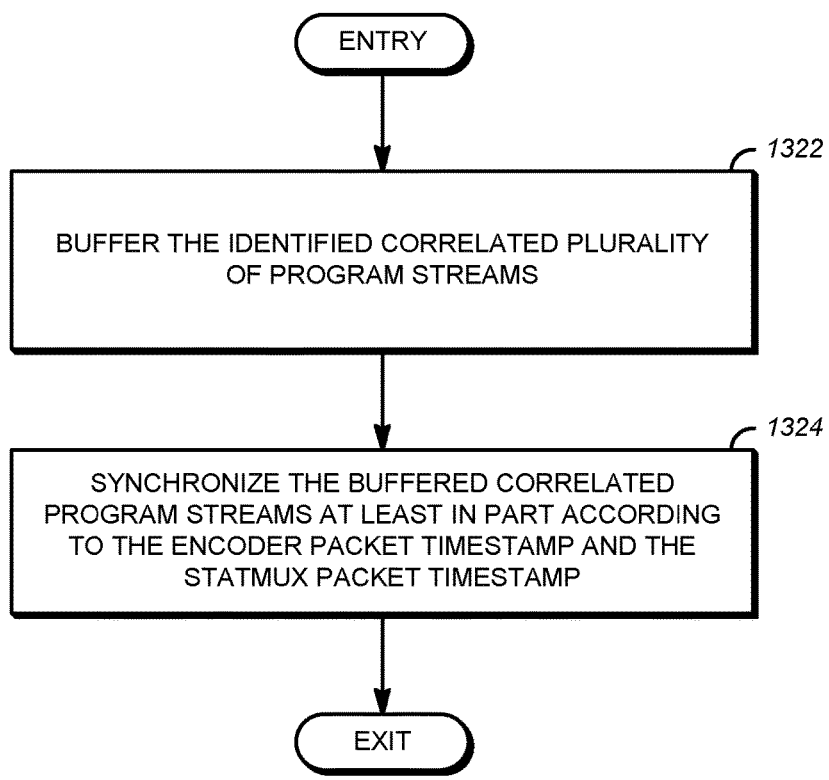

FIG. 13D is a diagram illustrating one embodiment of how the correlated program data streams 114 can be synchronized. In block 1322, the identified correlated plurality of program streams 114 are buffered (if not already buffered during the correlation process described above). Then, the buffered correlated program streams 114 are synchronized at least in part according to the encoder packet timestamp and the statmux packet timestamp. Synchronization involves reordering the messages to present them in the proper time relationship with the other messages before the data in the messages is presented to the user, and assures that data which is presented as a function of time (for example, the bit rate of the encoded video streams 114) accurately reflects the actual bit rate.

Figure 13E:
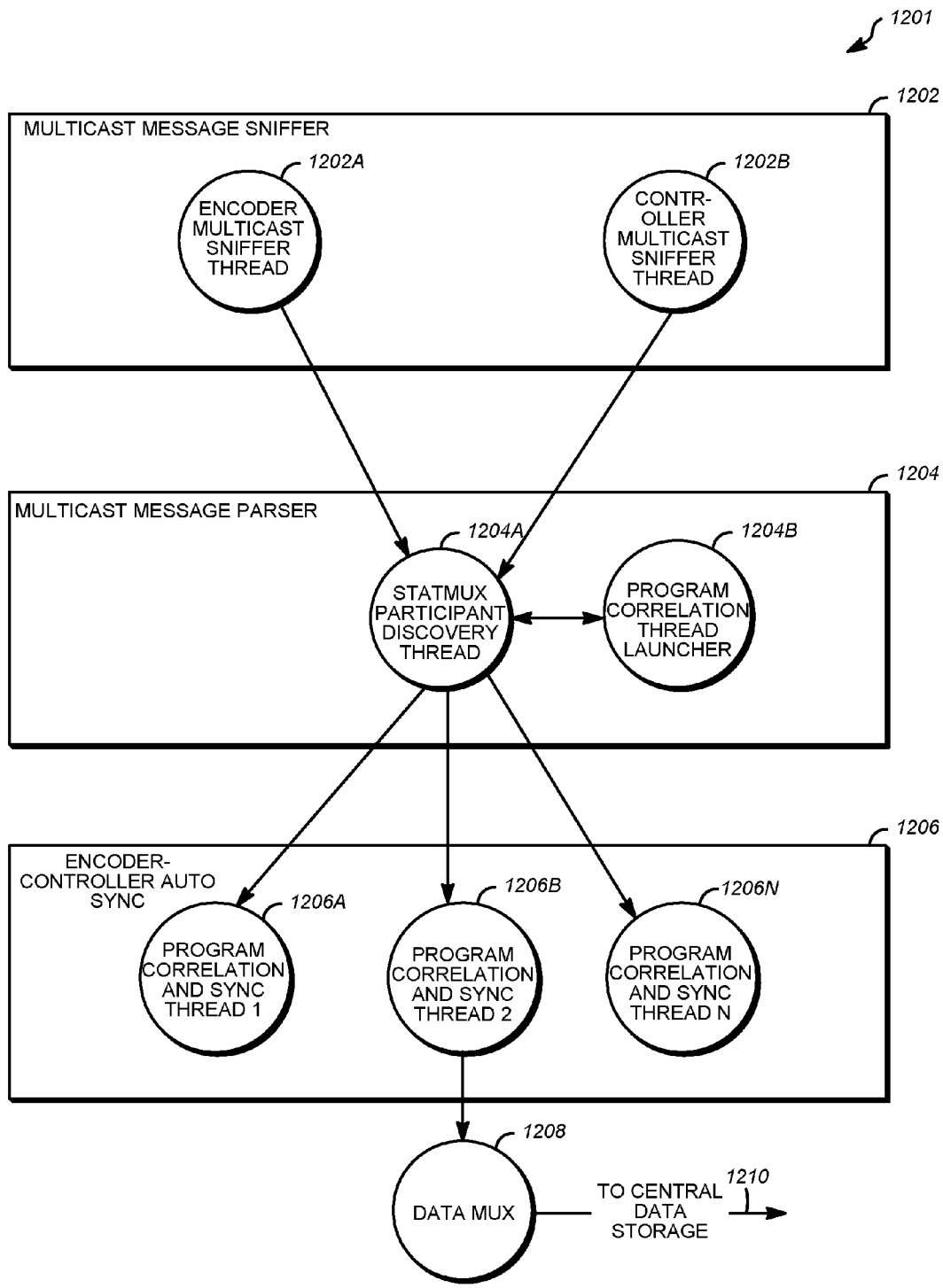

FIG. 13E is a diagram illustrating how the foregoing operations may be implemented. In this embodiment, the multicast message sniffer 1202 which sniffs the multicast messages transmitted via the network is implemented by spawning an encoder multicast sniffer thread 1202A that sniffs the multicast messages for encoder messages transmitted to the multicast IP address, and a statmux controller multicast sniffer thread 1202B that sniffs the multicast messages for statmux controller messages transmitted to the multicast IP address. An advantage of this embodiment of spawning separate threads to sniff for the encoder source multicast sniffer thread and the controller multicast sniffer thread is that each program is synchronized independently of the others, and errors in one synchronization thread will not affect other synchronization threads. Thus, if data for one program is missing or unsynchronized, the data for the remaining threads remain unaffected.

The sniffed multicast messages obtained from the encoder multicast sniffer thread 1202A and the controller multicast sniffer thread 1202B are provided to a statmux participant discovery thread 1204A, which performs the parsing operations described above. When the statmux participant discovery thread 1204A discovers a new encoded video stream 114, new encoder 106, or new controller 108 in the network, it communicates this information to a program correlation thread launcher 1204B, which initiates the launching of a program correlation and synchronization thread 1206A-1206N for the new element. In one embodiment, a thread is spawned for each statmux pool 104, as well as one for each program or video stream in the statmux pool 104. The program correlation and synchronization threads 1206A-1206N perform the synchronization and correlation operations described above, and provide that data to a data multiplexor 1208 which assembles the correlated and synchronized messages before providing them to the central data storage 1210.

User Interface and Analytic Examples

FIGS. 14-21 present diagrams illustrating exemplary embodiments of a user interface or analysis dashboard 1400 generated by the dashboard generator 1216 to present EAM 1214 analysis results and support analysis and management of the operation of the encoders 106 and statmux controller(s) 108. The dashboard comprises a plurality of screens 1400A-1400H, as further described below.

Figure 14:
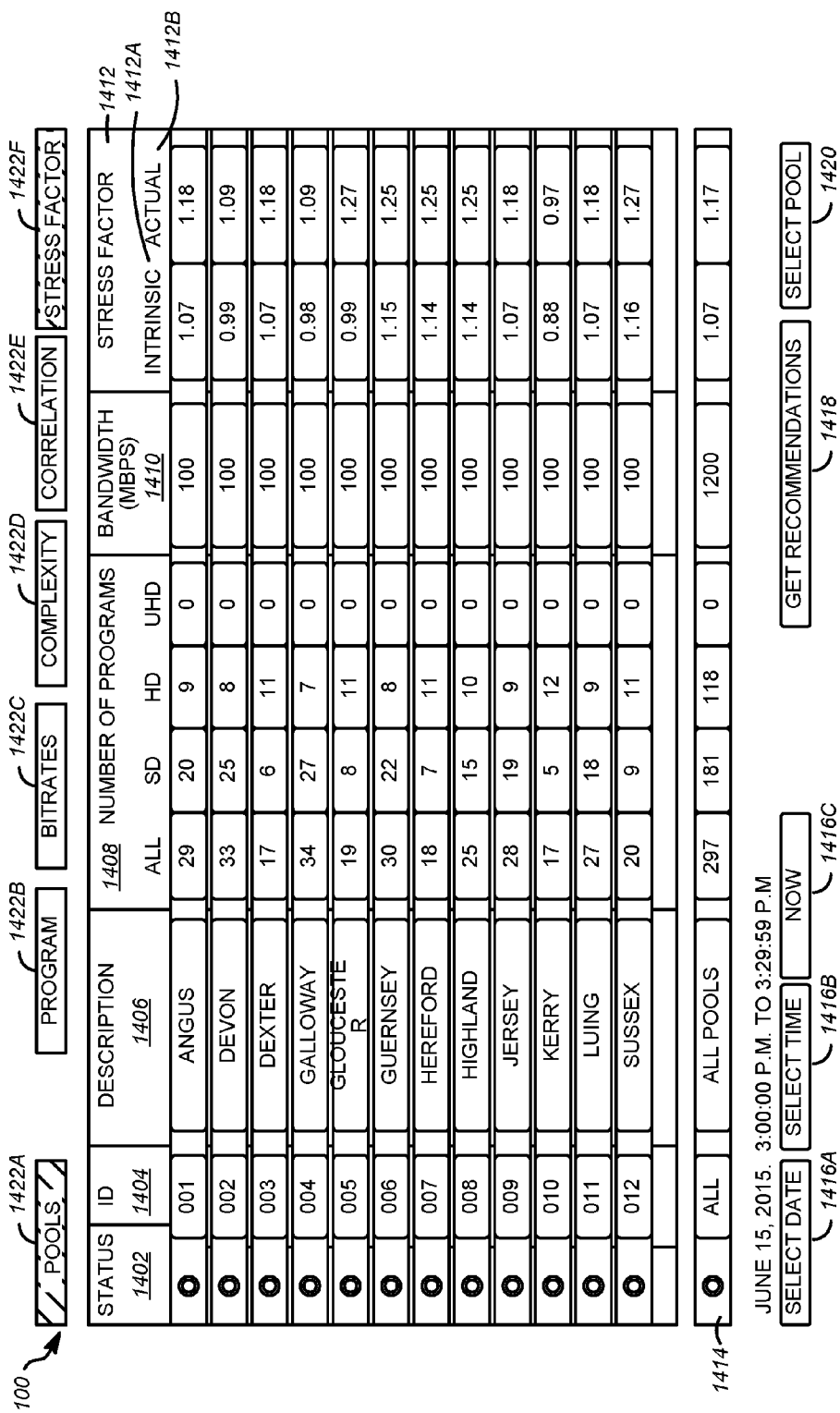

FIG. 14 presents a diagram presenting an exemplary embodiment of a first (home) screen 1400A of the analysis dashboard 1400. In this embodiment, the EAM 1214 has performed an analysis of a plurality of statmux pools, and the result of this analysis is presented in the dashboard 1400. In the illustrated embodiment, the dashboard includes a tabulation or table, with each row of the table corresponding to the analysis results for a particular statmux pool 104 of encoders 106. The status column 1402 indicates the status of the data stream produced by the statmux pool 104 of encoders 106. The identifier column 1404 indicates an identifier of the statmux pool 104 of encoders 106, and description column 1406 indicates a description of the statmux pool 104 of encoders 106. In the illustrated embodiment, the statmux encoder pool 104 have a numerical ID, and are presented in numerical order. Each statmux pool 104 is also described by a name (e.g. Angus, Devon, Dexter, etc.). The program population column 1408 indicates how many independent encoded data streams 114 (each carrying a single program) are included within the encoder pool 104. In the illustrated embodiment, this information is further broken out to indicate the total number of programs, the number of standard definition (SD) programs, the number of high definition (HD) programs, and the number of ultra-high definition (UHD) programs. The bandwidth column 1410 provides the allocated bandwidth of the statmux pool 104. In the illustrated embodiment, all of the statmux pools 104 are allocated 100 Mbps. The stress factor column 1412 presents the VQ stress factor for each of the statmux pools. In one embodiment, the stress factor includes an intrinsic stress factor and an actual stress factor. "Intrinsic stress" refers to stress in the hypothetical situation in which there are no operational constraints on the bandwidth that can be allocated to a particular program or pool. "Intrinsic stress" is the lowest stress that can be achieved for a given average bit rate. "Actual stress" takes into account the common operational situation in which the bandwidth that can be allocated is limited to lie between an upper and lower bound. When operating at the upper bound, the actual stress would be greater than the intrinsic stress because less bandwidth would be available compared to the unconstrained case. When operating at the lower bound, the actual stress would be less than the intrinsic stress because more bandwidth than the unconstrained case would be available. The dashboard 1400 also includes a summary row 1414 which presents the status, total number of programs, total allocated bandwidth and stress factor(s) for all of the monitored statmux pools.

The dashboard 1400 also includes user controls to select which temporal portion of the encoder streams 114 were analyzed to arrive at the stress factor(s). This allows the user to view stress factor(s) and other analysis information as described below for any arbitrary time period of encoder data streams 114. An arbitrary date for the temporal period of analysis may be entered by selecting the select date control 1416A. Thereafter, a time period within the selected date entered by selecting the select time control 1416B. Selection of the now control 1416C selects a time period including the moment that the control 1416 is selected, and extending forward or backward in time by an optionally preselected amount. For example, selection of control 1416C may select analysis of encoder data beginning 3 minutes prior to selection of the control 1416C and extending to the time that the control was selected (an embodiment that supported by the buffering and data storage by the central data storage element 1210) or may select analysis of encoded video data 114 beginning upon selection of the control 1416C and extending for a period of three minutes after selection of the control 1416C.

Selection of the recommendations control 1418 causes the EAM 1214 to generate recommendations regarding the allocation of encoders 106 to statmux pools, as further described below.

Selection of any of columns 1404-1412 reorders the data presented in the columns to ascending order, and reselection of the same column reorders the data presented in descending order. Thus, the user can easily order the results in, for example, decreasing actual stress factor, if desired.

In the illustrated embodiment, the dashboard 1400 includes a navigation portion 1422 that includes controls 1422A-1422F for navigating between different screens 1400A-1400H of the dashboard 1400. These controls include a pool control 1422A for navigating to a screen of the dashboard 1400 that presents the statmux pools. Pool control 1422A is shaded to indicate that is the currently presented screen. Programs control 1422B is used to navigate to a screen in which each individual program stream is presented, similar to the screen discussed in reference to FIG. 15 below. Since the tabular results presented are of the stress factor(s), the stress factor control 1422F is shaded. The operation and resulting screens presented in response to the selection of the bitrate control 1422C, the complexity control 1422D, the correlation control 1422E and the stress factor control 1422F are discussed further below.

The dashboard 1400 also allows the user to drill down and examine similar characteristics for any of the statmux pools 104. In one embodiment, this is accomplished by selecting the pool selection control 1420, which presents a list of the statmux pools 104 for selection, or by simply double clicking the text associated with the desired encoder pool 104. This presents a second dashboard screen in which analogous data for each encoder 106 of an encoder pool 104 is presented. For example, if statmux pool 104, known as the "Galloway" statmux pool 104, is selected, analogous data for the encoders 106 in that statmux pool 104 are displayed.

FIG. 15 is a diagram presenting an exemplary embodiment of second screen 1400B of the analysis dashboard 1400 presenting data EAM 1214 using the dashboard generator 1216. In this embodiment, a particular statmux pool 104 (e.g. the aforementioned statmux pool 104, known as the "Galloway" statmux pool) has been selected and the pool selection control 1420 selected. The user interface 1500 includes a header row 1502 that indicates which statmux pool 104 is being highlighted for further analysis. A table 1504 is presented, which includes the data from the EAM 1214 rows and columns, with each row representing data from an individual encoder 106. The columns include a status column 1506 indicating the status of each encoder 106, an IP address column 1508, indicating the IP address of the associated encoder 106, a description column 1510 indicating a description of the associated encoder 106, a format column 1512 indicating the format of the data stream produced by the encoder 106, one or more bandwidth columns 1514 indicating the bandwidth of the data stream produced by the associated encoder 106, and a stress factor column 1516, indicating the stress factor of the data stream produced by the associated encoder 106. In the illustrated embodiment, the bandwidth column 1514 includes separate columns for the mean, minimum, and maximum bandwidth allocated to the encoder 106 in columns 1514A, 1514B and 1514C, respectively, and the stress factor column includes separate columns for the intrinsic VQ stress factor and the actual VQ stress factor in columns 1516A and 1516B, respectively. The stress factors are analogous to the constant bit rate weighting factor for each of the plurality of encoded video streams 114 in each row, as described earlier with reference to FIG. 6.

Selection of control 1422A returns the user interface to the display of statmux pools 104 illustrated in FIG. 14. Further, more detailed analysis of a particular encoder video stream can be accomplished by selection of one of the row corresponding to the encoder 106 or program of interest, and selecting the select encoder control 1520, or by simply double clicking the row of the desired program stream. Selection of the bitrate control 1422C presents the bitrates for the program streams 114 illustrated in FIG. 16.

Figure 16:
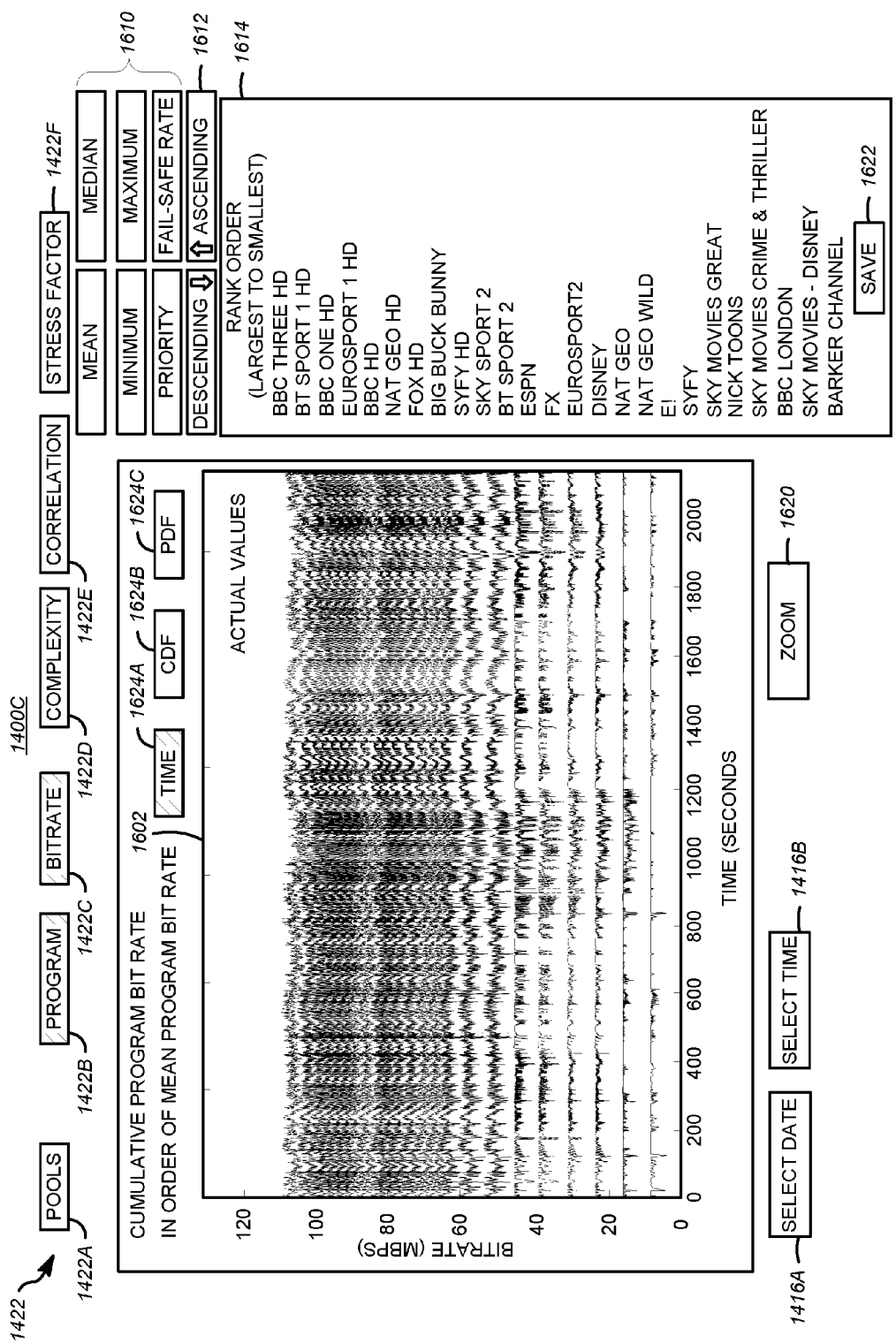

FIG. 16 is a diagram presenting an exemplary embodiment of third screen 1400C of the analysis dashboard 1400 presenting data EAM 1214 using the dashboard generator 1216. The third screen 1400C presents a plot of the cumulative bitrates for the program streams 114 illustrated in FIG. 15 in window 1602. The programs control 1422B of the navigation portion 1422 is shaded to indicate that the bitrate of individual programs is being presented in the third screen 1400C.

In the illustrated embodiment, each program stream is represented by a different color and is stacked with the other program bit streams 114 in the statmux pool 104 so that the cumulative bit rate for the sum of the program streams 114 may be ascertained. In the illustrated embodiment, the programs are presented in order of mean program bit rate. Accordingly, the program stream 114 having the highest mean program bit rate is presented first (on the bottom of the plot), and the program steam 114 having the second highest mean program bit rate is presented next (and above the program stream 114 having the highest mean program bit rate. The plot for the remaining program streams 114 follows the same pattern. The presentation of these results may be changed using display controls 1610, allowing the user to view the cumulative program bit rate for each of the program streams 114 ranked in order of the mean program bit rate, the media program bit rate, the minimum program bit rate, the failsafe rate, or priority. As shown by controls 1610, the user may also present the results for the program streams 114 in ascending or descending order. Panel 1614 presents the name of the program stream (e.g. the description presented in column 1510 of FIG. 15) in selected rank order. In the illustrated example, BBC Three HD is the program stream with the highest mean program bit rate, and is therefore presented first on the list. It is also the program stream presented on the bottom of the plot in window 1602.

Zoom control 1620 zooms in on the display presented in panel 1602, allowing the user to view more detail in both time and bitrate. Different time periods may also be selected by use of the date select and time select controls (1416A and 1416B, respectively). Save control 1622 can be used to save the selected configuration of the third screen 1400C in terms of time, zoom, order of plots, and statistical basis for the illustrated cumulated bit rates (e.g. mean, media, minimum, maximum).

Presentation controls 1624A-1624C allow the user to view the indicated metric (bitrates are currently selected, as indicated by the shading of control 1422C) as a function of time, or a statistical measure. Control 1624A (currently selected) selects a time plot of the bit rates, control 1624B selects a cumulative probability density function of the bit rates, and control 1624C selects a probability density function of the indicated factor.

Figure 17:
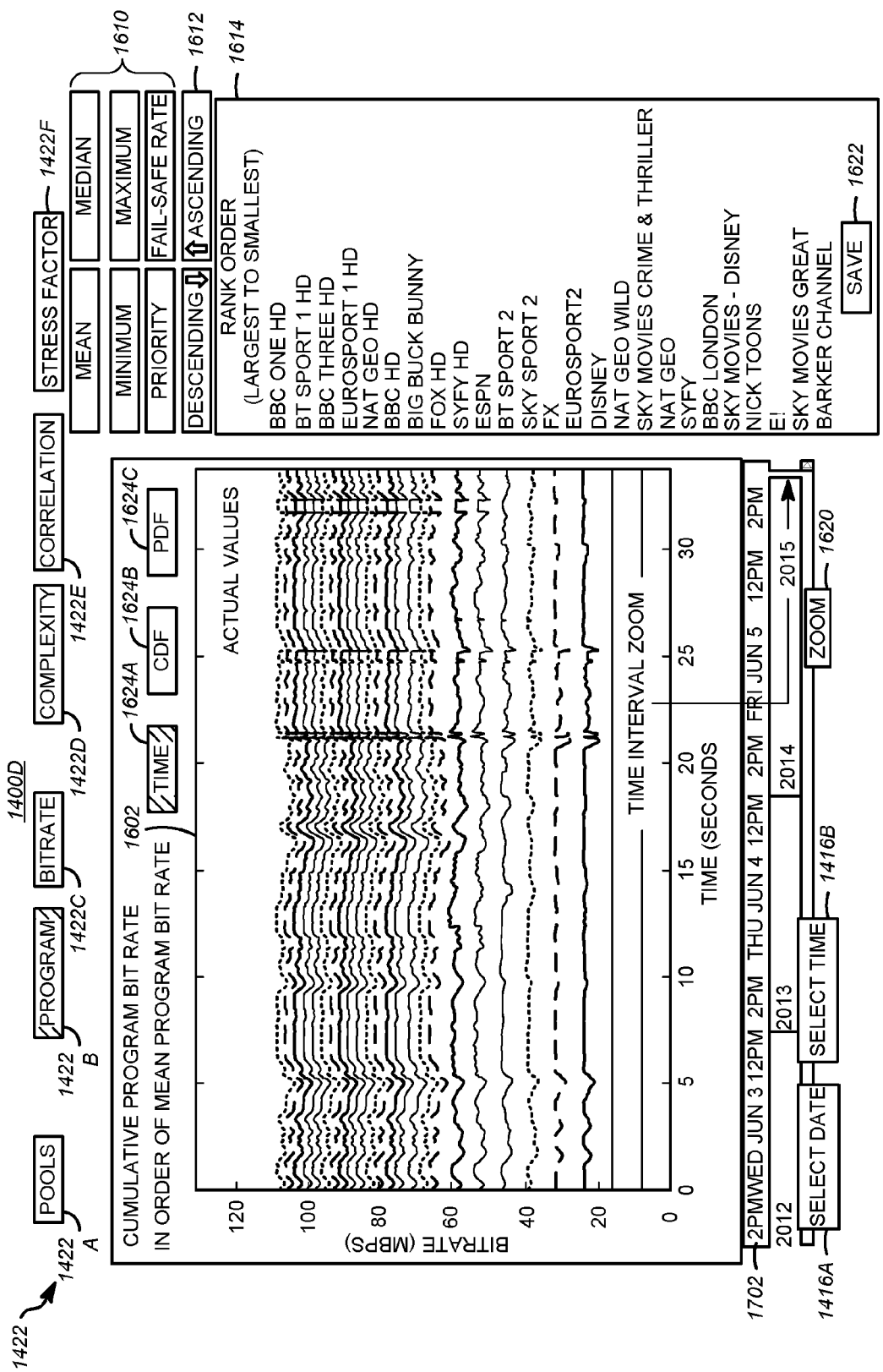

FIG. 17 is a diagram presenting an exemplary embodiment of fourth screen 1400D of the analysis dashboard 1400 presenting data EAM 1214 using the dashboard generator 1216.

FIG. 17 illustrates how the user may use the select time control 1416B to investigate particular time intervals. In this embodiment, selection of the select time control 1416B provides a timeline 1702 having elements that the user can select and drag to select a time window along the timeline 1702. In the illustrated embodiment, the user has selected a time interval of about 35 seconds beginning at about 4 PM local time. Alternatively, the select time control 1416B can present an interface wherein the user may simply enter the time interval of interest.

Figure 18:
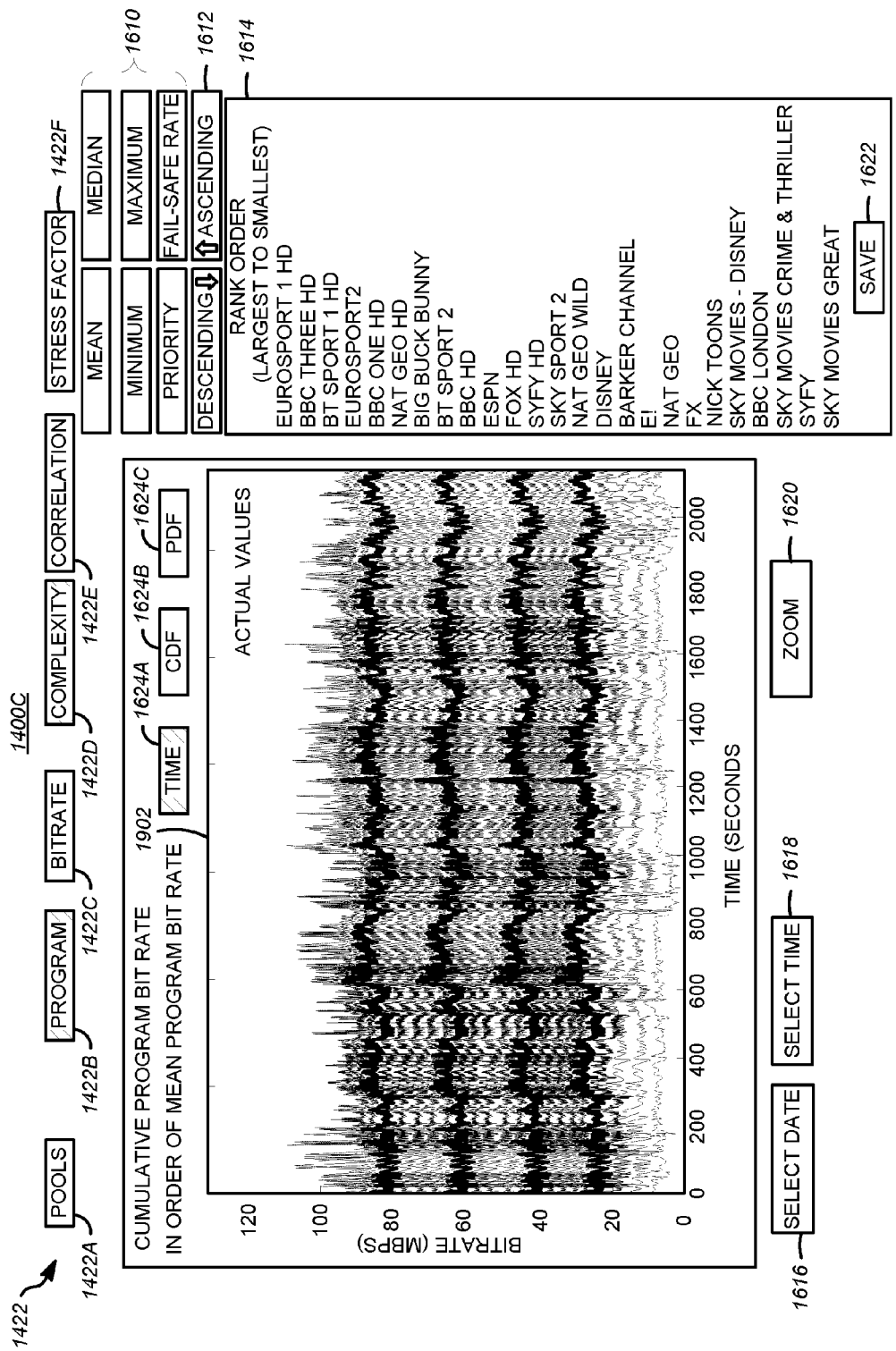

FIG. 18 is a diagram presenting an exemplary embodiment of fourth screen 1400E of the analysis dashboard 1400 presenting data EAM 1214 using the dashboard generator 1216. The fourth screen 1400E presents a plot of the cumulative program complexities for the program streams 114 illustrated in FIG. 16 in window 1602. Program controls 1422B and 1422D of the navigation portion 1422 are shaded to indicate that the complexity of individual programs is being presented. This screen 1400E of the analysis dashboard 1400 may be obtained from the screen 1400C depicted in FIG. 16 by selecting the complexity control 1422D.

Figure 19:
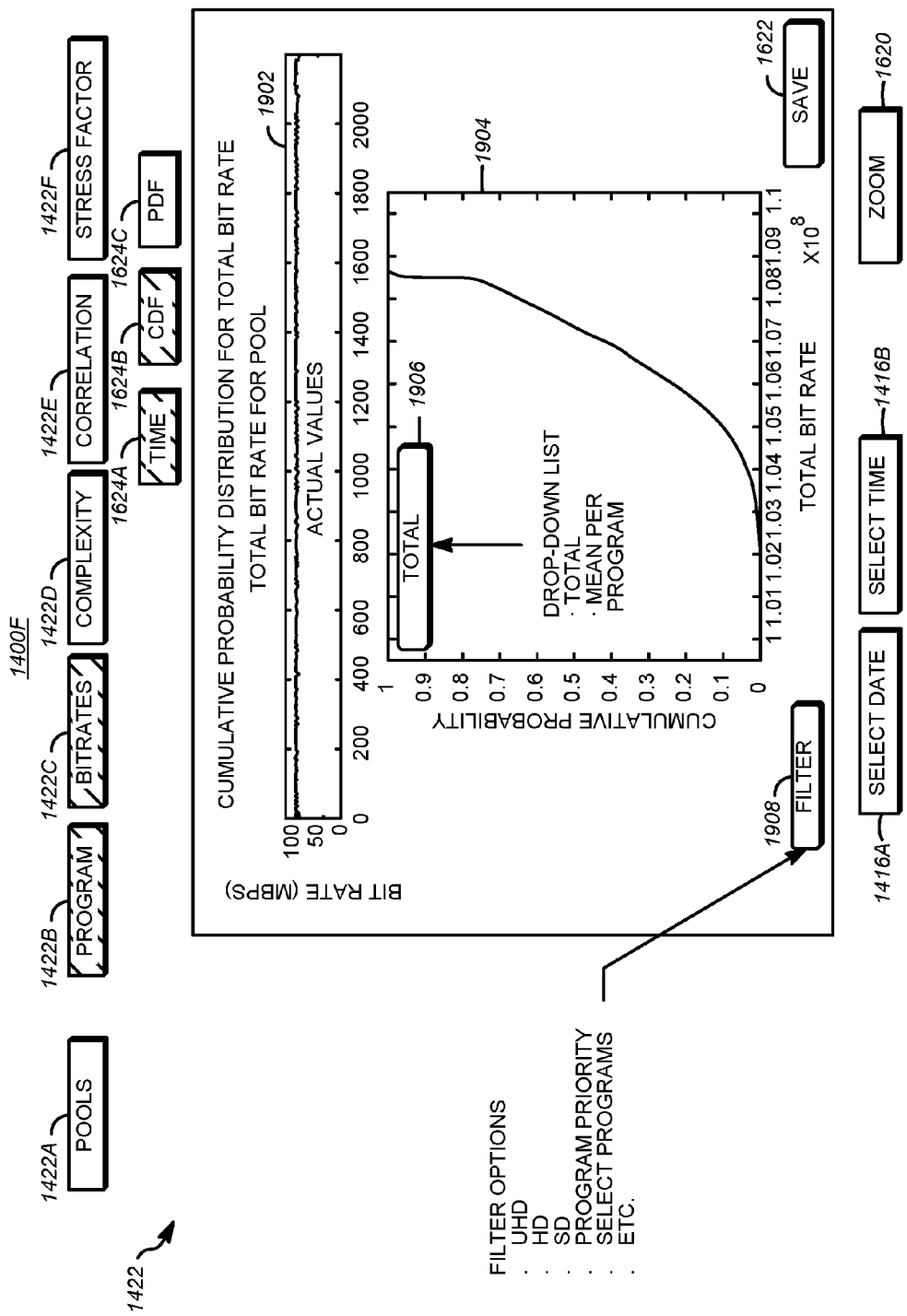

FIG. 19 is a diagram presenting an exemplary embodiment of fourth screen 1400F of the analysis dashboard 1400 presenting data EAM 1214 using the dashboard generator 1216. In FIG. 19, the user has selected to view the bitrates of programs of a particular statmux pool 104 (as indicated by the shading of controls 1422B and 1422C) and has selected a timeline and a cumulative density function for display (as indicated by the shading of controls 1624A and 1624B). The result is that two plots are presented. First plot 1902 presents a total bit rate over the selected time interval, and second plot 1904 presents the cumulative probability function for the total bit rate of all of the encoders 106 in the statmux pool 104. A dropdown control 1906 permits the cumulative density function presented in plot 1904 to depict the total cumulative probability for all of the program streams in the currently selected statmux pool, or the mean bit rate per program stream. Filter control 1908 permits the user to either present the results for all of the program streams 114, select a particular program stream for analysis, or limit presented data to program streams 114 to those within one or more selected categories. For example, the user may select programs that are ultra-high definition (UHD), high definition (HD), or standard definition (SD) or any combination thereof, as well as programs with a particular program priority.

Figure 20:
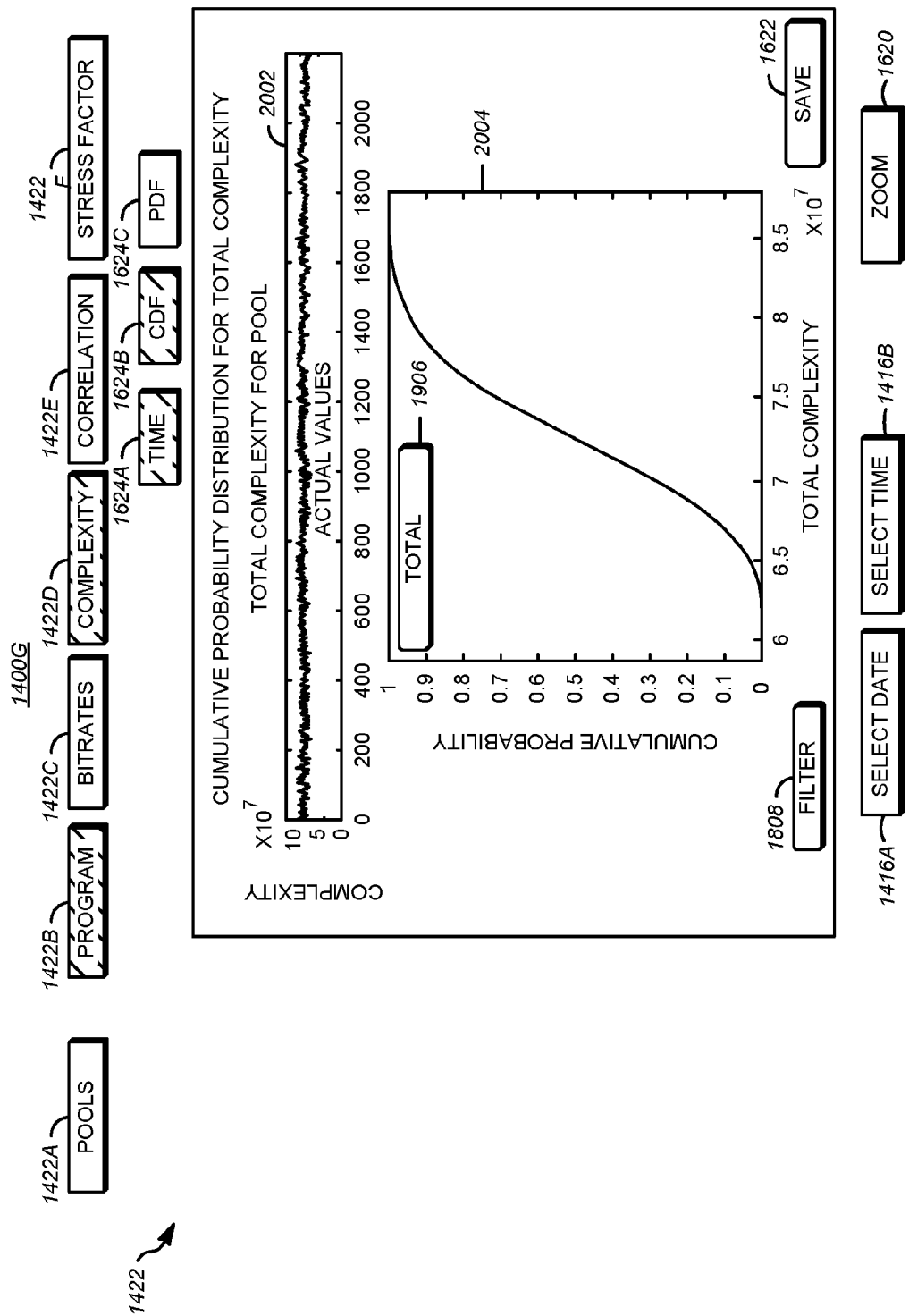

FIG. 20 is a diagram presenting an exemplary embodiment of fifth screen 1400G of the analysis dashboard 1400 presenting data EAM 1214 using the dashboard generator 1216. In FIG. 20, the user has selected to view the complexity of the program streams 114 of a particular statmux pool 104 (as indicated by the shading of controls 1422B and 1422D) and has selected a timeline and a cumulative density function for display (as indicated by the shading of controls 1624A and 1624B. The result is that two plots are presented. First plot 2002 presents a the total complexity over the selected time interval, and second plot 2004 presents the cumulative probability function for the total complexity of all of the encoders 106 in the statmux pool.

Figure 21:
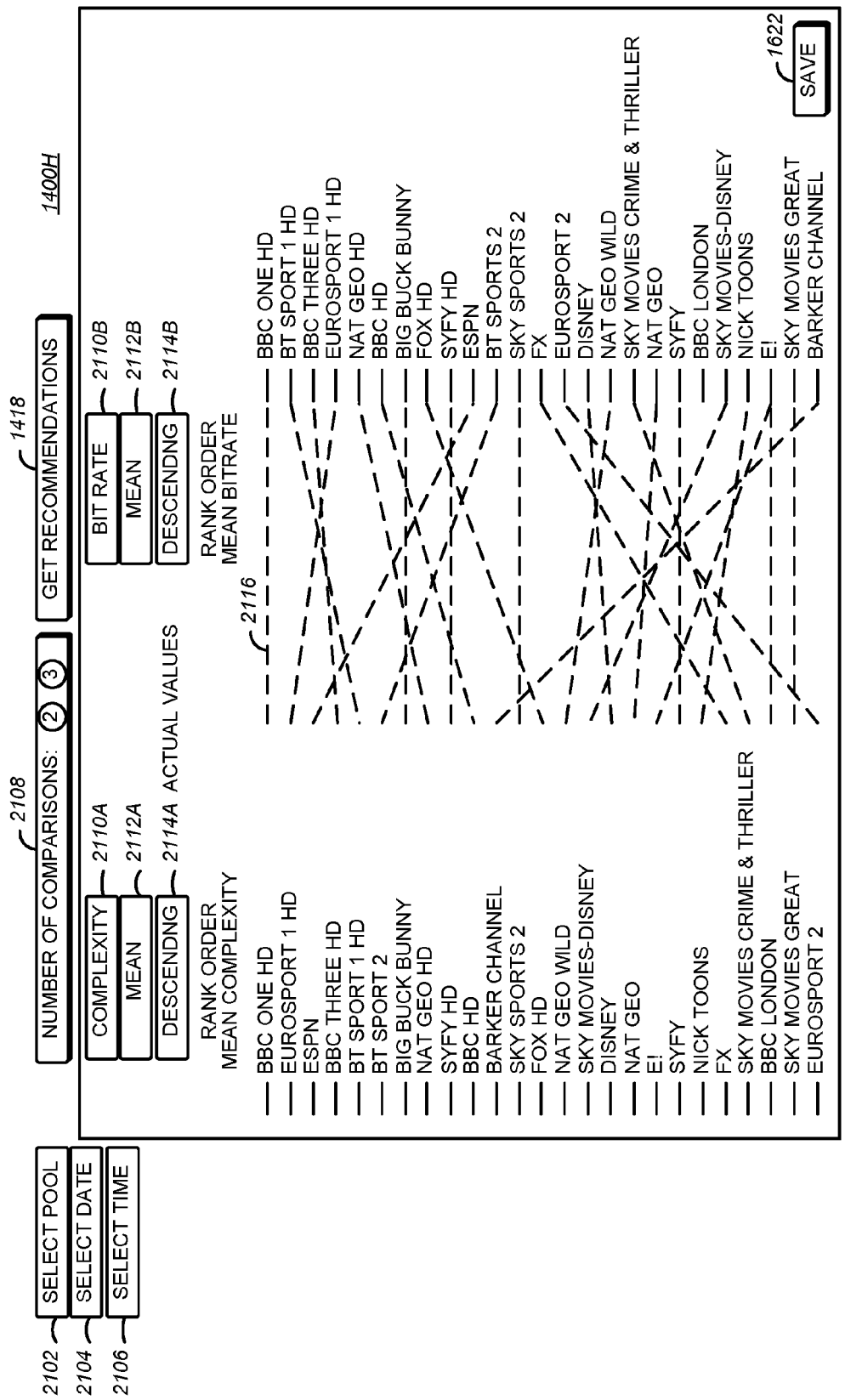

FIG. 21 is a diagram presenting an exemplary embodiment of sixth screen 1400H of the analysis dashboard 1400 presenting data EAM 1214 using the dashboard generator 1216. This screen 1400H is presented in response to user selection of a correlation control on any of the foregoing screens. Control 2102 allows the user to select the encoder pool 104 of program streams 114 that are to be compared. Controls 2104 and 2106 allows the user to select the date and time period for which the data from the encoders 106 in the encoder pool 104 are compared. In the illustrated embodiment, comparisons are made between two metrics for the program streams 114 produced by the encoders 106, but the number of metrics can be controlled to compare three or more metrics by use of comparison number control 2108.

Metric controls 2110A and 2110B allow the user to control which metric of the data streams 114 from the encoders 106 are being compared. Selection of either control 2110A or 2110B presents a drop down list of selectable metrics, including complexity, bit rate, correlation and stress factor(s). In the illustrated embodiment, control 2110A has been used to select the complexity of the data stream from the encoder 106 as the first metric, and control 2110B has been used to select the bit rate of the data stream from the encoder 106 as the second metric. After selection, each control 2110 is labeled with the selected metric.

Statistic controls 2112A and 2112B allow the user to control which statistic of the metric is presented. Again, selection of the control provides a drop down menu from which the desired statistic is selected. Desired statistics include, for example the mean, median, minimum, maximum, and standard deviation of the metric. In the illustrated embodiment, the user has selected the mean value of the complexity of the encoded data stream 114 by use of control 2112A and the mean value for the bit rate of the encoded data stream by use of control 2112B.

Presentation controls 2114A and 2114B allow the user to control how the results are presented. Selecting controls 2114A and 2114B present dropdown menus that allow the user organize the presentation in the comparison window 2116. In one embodiment, the user can select whether the data streams 114 are presented in ascending or descending order of the selected metric. In the illustrated embodiment, the metric for each data stream is presented in descending order. Hence, the left portion of the comparison window 2116 presents the complexity of the data streams 114 from the encoders 106 in descending rank order of mean complexity, while the right portion of the comparison window presents bit rate of the encoders 106 in descending rank order of mean bit rate.

The foregoing comparison can be used to identify issues regarding the assignment of data streams 102 to encoders 106, and encoders 106 to encoder pools. For example, it is reasonable to expect a correlation between complexity and bit rate (e.g. all things equal, a bit stream having a higher mean complexity is expected to have a higher bit rate as well). Hence one would expect that a list of encoder streams 114 presented in order of mean complexity would correlate well with a list of encoder streams 114 presented in order of mean bit rate.

Comparison window 2116 presents both ordered lists side by side, with a line drawn between representations of an encoder stream in both lists. For example, in FIG. 21, the encoder 106 processing the BBC One HD data stream has the highest complexity, and as expected, the highest bit rate. Therefore, a line drawn from the BBC One HD representation in the first list to the BBC One HD representation of the second list is horizontal. Lines drawn from a representation on one list to the associated representation on the other list indicate that there is a significant difference between the complexity of that data stream and the bit rate of that data stream. For example, one of the encoders 106 is producing a bit stream for a Barker Channel. That bit stream has is about in the middle of the list, indicating its complexity is more than about half of the other encoder bit streams 114 and less than the remaining encoders 106. However, the actual bit rate of the Barker Channel bit stream is less than any of the other bit streams 114, and this discrepancy is visually clear from the angled line drawn between the mean complexity entry for the Barker Channel to the mean bit rate entry for the Barker Channel. This discrepancy may be the result of an expected or unexpected band limiting setting in the encoder 106 devoted to the Barker Channel, or may be a peculiarity of the particular time interval of the encoded data streams 114 that was analyzed. The user may then choose to investigate longer temporal periods of the data streams 114 to determine if the discrepancy is reduced, or perhaps review and compare a different statistic or metric of the encoder data streams 114. For example, the autocorrelation or variance of the data streams 114 can be compared to determine if the discrepancy can be explained, or a probability density function or cumulative probability density function of the bitrate can be investigated to see if the encoded data from the encoder 106 includes bitrates that are greater or less than normal, particularly when compared to the same statistics for the complexity of the same encoder data streams 114.

Figure 22:
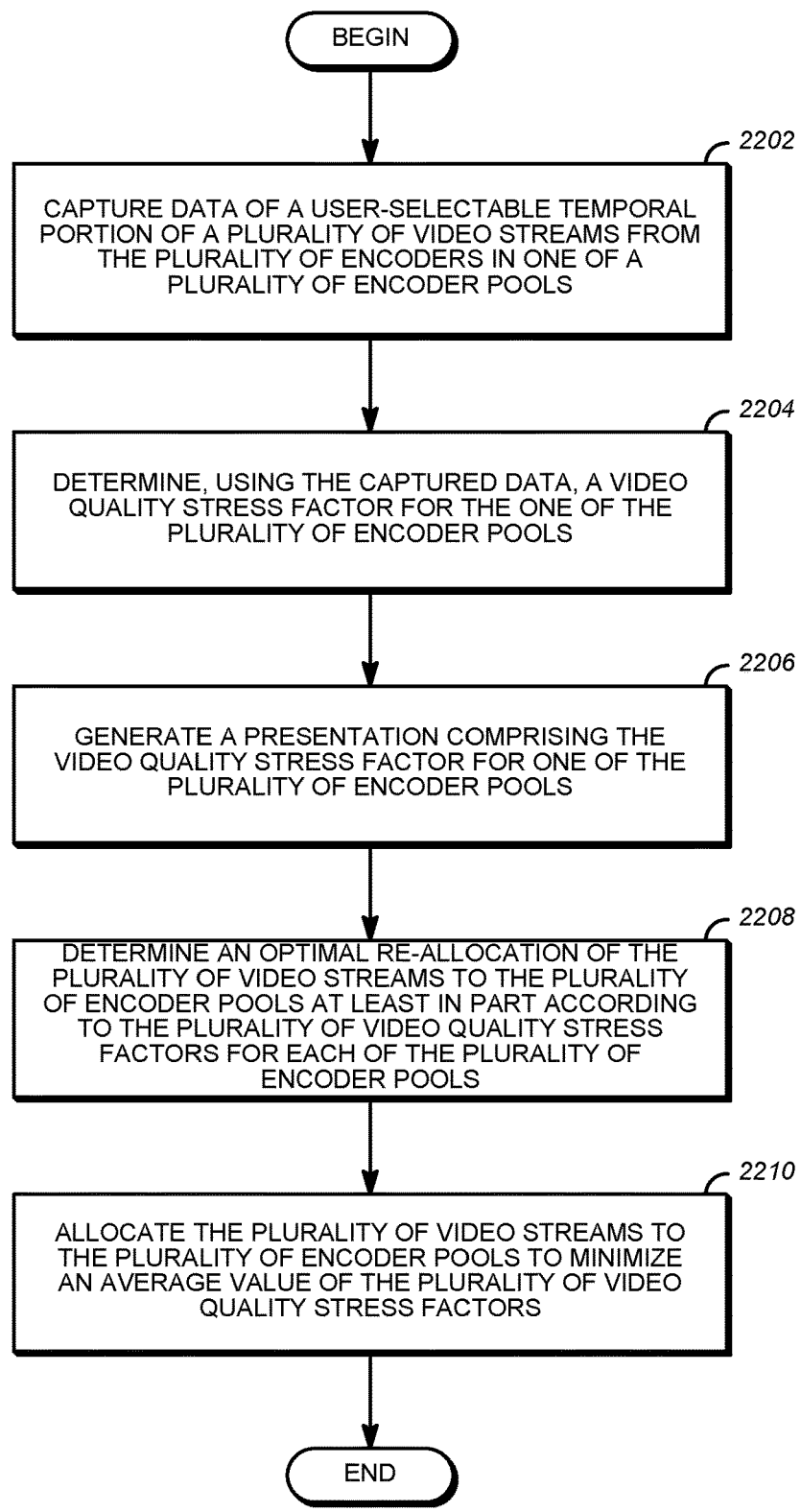
FIG. 22 is a flow chart illustrating exemplary operations that can be used to allocate a plurality of video streams to a plurality of encoder pools.

FIG. 22 is a flow chart illustrating exemplary operations that can be used to allocate a plurality of video streams 102 to a plurality of encoder pools 104. In block 2202, data is captured from a user-selectable temporal portion of the plurality of video streams 114 from the plurality of encoders 106 in one or more of a plurality of encoder pools 104. In block 2204, a video quality stress factor is determined for the one or more of the plurality of encoder pools 104. In block 2206, a presentation comprising the video quality stress factor for each of the at least one of the plurality of encoder pools 104 is generated. A recommended or optimal allocation or reallocation of the plurality of video streams 102 to the plurality of encoder pools 104 is then determined, as shown in block 2208. This is accomplished at least in part using the video quality stress factor for each of the plurality of encoder pools 104. Finally, the plurality of video streams 102 are allocated or reallocated to the plurality of encoder pools 104 to minimize the plurality of video quality stress factors, as shown in block 2210. In one embodiment, the allocation is based on minimizing the average value of the plurality of video quality stress factors of each pool, but other optimization criteria may be used. For example, it may instead be beneficial to minimize the variance of the stress factor among the encoder pools 104, or to minimize a weighted value of the encoder pools 104. Such weighted value may be based upon the priority of each program encoded by the encoders 106 or other factors.

Hardware Environment

Figure 23:
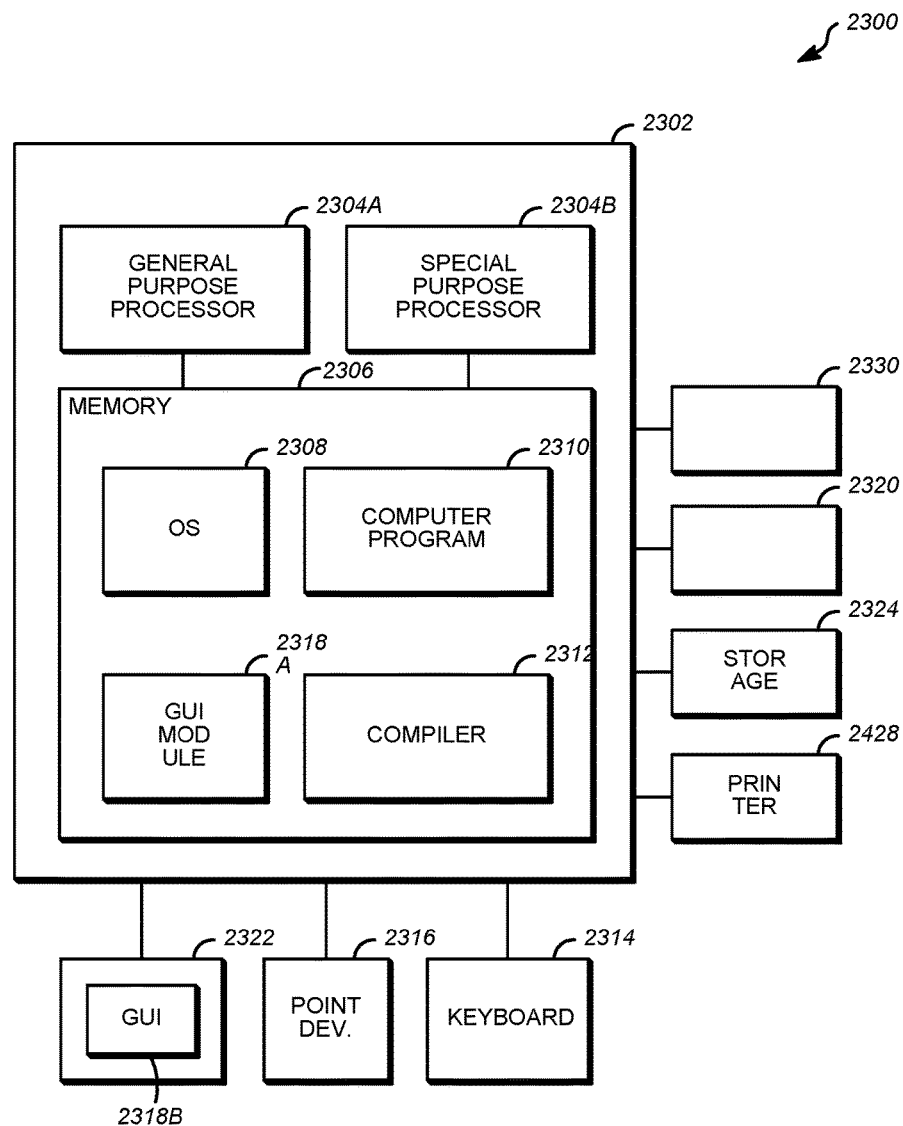
FIG. 23 is a diagram illustrating an exemplary computer system that could be used to implement elements of the present invention.

FIG. 23 is a diagram illustrating an exemplary computer system 2300 that could be used to implement elements of the present invention, including the statmux parser 1201, the statmux optimizer 1203 and the central data storage 1210 and related interfaces. The computer 2302 comprises a general purpose hardware processor 2304A and/or a special purpose hardware processor 2304B (hereinafter alternatively collectively referred to as processor 2304) and a memory 2306, such as random access memory (RAM). The computer 2302 may be coupled to other devices, including input/output (I/O) devices such as a keyboard 2314, a mouse device 2316 and a printer 2328.

In one embodiment, the computer 2302 operates by the general purpose processor 2304A performing instructions defined by the computer program 2310 under control of an operating system 2308. The computer program 2310 and/or the operating system 2308 may be stored in the memory 2306 and may interface with the user and/or other devices to accept input and commands and, based on such input and commands and the instructions defined by the computer program 2310 and operating system 2308 to provide output and results.

Output/results may be presented on the display 2322 or provided to another device for presentation or further processing or action. In one embodiment, the display 2322 comprises a liquid crystal display (LCD) having a plurality of separately addressable pixels formed by liquid crystals. Each pixel of the display 2322 changes to an opaque or translucent state to form a part of the image on the display in response to the data or information generated by the processor 2304 from the application of the instructions of the computer program 2310 and/or operating system 2308 to the input and commands. Other display 2322 types also include picture elements that change state in order to create the image presented on the display 2322. The image may be provided through a graphical user interface (GUI) module 2318A. Although the GUI module 2318A is depicted as a separate module, the instructions performing the GUI functions can be resident or distributed in the operating system 2308, the computer program 2310, or implemented with special purpose memory and processors.

Some or all of the operations performed by the computer 2302 according to the computer program 2310 instructions may be implemented in a special purpose processor 2304B. In this embodiment, some or all of the computer program 2310 instructions may be implemented via firmware instructions stored in a read only memory (ROM), a programmable read only memory (PROM) or flash memory within the special purpose processor 2304B or in memory 2306. The special purpose processor 2304B may also be hardwired through circuit design to perform some or all of the operations to implement the present invention. Further, the special purpose processor 2304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 2302 may also implement a compiler 2312 which allows an application program 2310 written in a programming language such as COBOL, C++, FORTRAN, or other language to be translated into processor 2304 readable code. After completion, the application or computer program 2310 accesses and manipulates data accepted from I/O devices and stored in the memory 2306 of the computer 2302 using the relationships and logic that was generated using the compiler 2312.

The computer 2302 also optionally comprises an external communication device such as a modem, satellite link, Ethernet card, or other device for accepting input from and providing output to other computers.

In one embodiment, instructions implementing the operating system 2308, the computer program 2310, and/or the compiler 2312 are tangibly embodied in a computer-readable medium, e.g., data storage device 2320, which could include one or more fixed or removable data storage devices, such as a zip drive, floppy disc drive 2324, hard drive, CD-ROM drive, tape drive, or a flash drive. Further, the operating system 2308 and the computer program 2310 are comprised of computer program instructions which, when accessed, read and executed by the computer 2302, causes the computer 2302 to perform the steps necessary to implement and/or use the present invention or to load the program of instructions into a memory, thus creating a special purpose data structure causing the computer to operate as a specially programmed computer executing the method steps described herein. Computer program 2310 and/or operating instructions may also be tangibly embodied in memory 2306 and/or data communications devices 2330, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 2302.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. An apparatus for managing the encoding of a plurality of video streams, each of the plurality of video streams encoded by an associated one of a plurality of encoders, each of the plurality of encoders being a member of one of a plurality of encoder pools, comprising:
    a parser, for capturing data of a plurality of encoded video streams from the plurality of encoders;
    an encoding analysis module, for determining, using a user-selectable temporal portion of the captured data:
        a video quality stress factor for each of the plurality of encoder pools, each video quality stress factor corresponding to an identified target video quality measure for a temporal portion of the plurality of encoded video streams from each of the plurality of encoder pools, the video quality measure identified as a probability that a bit rate of an unconstrained variable bit rate (VBR) version of the temporal portion of the plurality of encoded video streams from the plurality of encoders in each encoder pool is less than a bit rate of an encoded and statistically multiplexed version of the temporal portion of the plurality of encoded video streams from the plurality of encoders in each encoder pool;
    a dashboard generator, for generating a user interface for managing the encoding of the plurality of video streams at least in part according to the determined video quality stress factor; and
    a recommendation engine for determining an optimal re-allocation of the plurality of video bitstreams to the plurality of encoder pools at least in part according to the video quality stress factor for each of the plurality of encoder pools,
    wherein the recommendation engine further comprises: allocating the plurality of video streams to the plurality of encoder pools to minimize an average value of the video quality stress factor.

2. The apparatus of claim 1 wherein the recommendation engine further comprises: providing the optimal reallocation of the plurality of video streams to the plurality of encoder pools to the dashboard generator.

3. The apparatus of claim 2, wherein the user interface comprises a tabulation identifying each of the plurality of encoder pools and its video quality stress factor.

4. The apparatus of claim 3, wherein the tabulation includes a bandwidth of the temporal portion of the plurality of encoded video streams from the plurality of encoders for each of the plurality of encoder pools.

5. The apparatus of claim 2, wherein:
    the user interface comprises one or more controls for specifying the temporal portion of the plurality of encoded data streams.

6. The apparatus of claim 3, wherein:
    the user interface comprises one or more controls for selecting one of the plurality of encoder pools;
    upon selection of the one of the one or more selected encoder pools, the encoding analysis module, further determines, using the captured data:
        a video quality stress factor for each of the plurality encoded video streams of the selected encoder pool, each video quality stress factor corresponding to a second identified target video quality measure for a temporal portion of each of the plurality of encoded video streams of the selected encoder pool,
        the second identified target video quality measure identified as a probability that a bit rate of a variable bit rate (VBR) version of the temporal portion of each of the plurality of encoded video streams from the plurality of encoders in the selected encoder pool is less than a bit rate of a constant bit rate (CBR) encoded version of the temporal portion of the associated one of the plurality of encoded video streams from the plurality of encoders in the selected one or more encoder pool; and
    the user interface further presents a tabulation identifying each of the encoded video streams and its associated weighting factor.

7. The apparatus of claim 1, wherein the user interface generated by the dashboard generator comprises a user-selectable statistic of a user-selectable metric of the user-selectable temporal portion of any of the plurality of encoder pools, wherein the user-selectable metric is one of a plurality of metrics including the video quality stress factor.

8. The apparatus of claim 1, wherein the user interface generated by the dashboard generator comprises a user-selectable statistic of a user-selectable metric of the user selectable temporal portion of a user-selectable any of the plurality of encoded video streams, wherein the user-selectable metric is one of a plurality of metrics including the video quality stress factor.

9. The apparatus of claim 1, wherein the user interface generated by the dashboard generator comprises comparison of a plurality user-selectable statistics of user-selectable metrics of the user selectable temporal portion of any of the plurality of encoded video streams with any of the other of the plurality of encoded video streams, wherein the user selectable metrics includes the video quality stress factor.

10. A method of managing the encoding of a plurality of video streams, each of the plurality of video streams encoded by an associated one of a plurality of encoders in one of a plurality of encoder pools, comprising:
(a) capturing data of a user-selectable temporal portion of a plurality of encoded video streams from the plurality of encoders in the one of the plurality of encoder pools; and
(b) determining, using the captured data, a video quality stress factor for each of the plurality of encoder pools, each video quality stress factor corresponding to an identified target video quality measure for a temporal portion of the plurality of encoded video streams from each of the plurality of encoder pools, the video quality measure identified as a probability that a bit rate of an unconstrained variable bit rate (VBR) version of the temporal portion of the plurality of encoded video streams from the plurality of encoders in each encoder pool is less than a bit rate of an encoded and statistically multiplexed version of the temporal portion of the plurality of encoded video streams from the plurality of encoders in each encoder pool;
(c) generating a presentation comprising the video quality stress factor for the one of the plurality of encoder pools; and
(d) managing the encoding of the plurality of video streams at least in part according to the determined video quality stress factor using the presentation,
wherein managing the encoding of the plurality of video streams at least in part according to the determined video quality stress factor comprises:
managing the encoding of the plurality of video streams at least in part according to determined video quality stress factors for each of the plurality of encoder pools,
determining an optimal re-allocation of the plurality of video streams to the plurality of encoder pools at least in part according to the plurality of video quality stress factors for each of encoder pools,
allocating the plurality of video streams to the plurality of encoder pools to minimize an average value of the plurality of video quality stress factors.

11. The method of claim 10,
wherein: the method further comprises:
performing (a)-(c) for each remaining video stream of the plurality of video streams allocated to the plurality of encoder pools to generate a video quality stress factor for each of the plurality of encoder pools;
wherein generating a presentation comprising the video quality stress factor for the one of the plurality of encoder pools comprises:
generating a presentation of the video quality stress factor for each of the plurality of encoder pools.

12. The method of claim 11, wherein the presentation further comprises a tabulation identifying each of the plurality of encoder pools and its video quality stress factor.

13. The method of claim 11, wherein the tabulation includes a bandwidth of the temporal portion of the plurality of encoded video streams from the plurality of encoders for each of the plurality of encoder pools.

14. The method of claim 11, wherein the presentation further comprises a user-selectable statistic of a user-selectable metric of the user-selectable temporal portion of any of the plurality of encoder pools, wherein the user-selectable metric is one of a plurality of metrics including the video quality stress factor.

15. The method of claim 11, wherein the presentation further comprises a user-selectable statistic of a user-selectable metric of the user selectable temporal portion of a user-selectable any of the plurality of encoded video streams, wherein the user-selectable metric is one of a plurality of metrics including the video quality stress factor.

16. The method of claim 11, wherein the presentation further comprises comparison of a plurality user-selectable statistics of user-selectable metrics of the user selectable temporal portion of any of the plurality of encoded video streams with any of the other of the plurality of encoded video streams, wherein the user selectable metrics includes the video quality stress factor.

* * * * *